(12) United States Patent  (10) Patent No.: US 8,376,558 B2
Jung et al.  (45) Date of Patent: *Feb. 19, 2013

(54) SYSTEMS AND METHODS FOR PROJECTING IN RESPONSE TO POSITION CHANGE OF A PROJECTION SURFACE

(75) Inventors: Edward K. Y. Jung, Bellevue, WA (US); Eric C. Leuthardt, St. Louis, MO (US); Royce A. Levien, Lexington, MA (US); Robert W. Lord, Seattle, WA (US); Mark A. Malamud, Seattle, WA (US); John D. Rinaldo, Jr., Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/217,135

(22) Filed: Jun. 30, 2008

(65) Prior Publication Data

US 2009/0326681 A1  Dec. 31, 2009

Related U.S. Application Data

(63) Continuation-in-part of application No. 12/214,422, filed on Jun. 17, 2008, and a continuation-in-part of application No. 12/217,118, filed on Jun. 30, 2008, and a continuation-in-part of application No. 12/217,116, filed on Jun. 30, 2008, and a (Continued)

(51) Int. Cl.
*G03B 21/00* (2006.01)

(52) U.S. Cl. ......................... 353/122; 353/121

(58) Field of Classification Search .................. 353/69, 353/70, 79, 121, 122
See application file for complete search history.

(56) References Cited

U.S. PATENT DOCUMENTS

| | | | |
|---|---|---|---|
| 3,622,223 A | 11/1971 | Brakell | |
| 4,012,133 A | 3/1977 | Burton | |
| 4,320,664 A | 3/1982 | Rehn et al. | |
| 4,684,136 A | 8/1987 | Turner | |
| 4,739,567 A * | 4/1988 | Cardin | ........................... 40/471 |
| 4,779,240 A | 10/1988 | Dorr | |
| 5,026,152 A | 6/1991 | Sharkey | |
| 5,469,258 A | 11/1995 | Grasso | |
| 5,515,079 A | 5/1996 | Hauck | |
| 5,581,783 A | 12/1996 | Ohashi | |

(Continued)

FOREIGN PATENT DOCUMENTS

JP  2005-165129 A  6/2005
WO  WO 2006/027855 A1  3/2006

(Continued)

OTHER PUBLICATIONS

U.S. Appl. No. 12/291,025, Jung et al.

(Continued)

*Primary Examiner* — Thanh Luu

(57) ABSTRACT

The present disclosure relates to systems and methods that are related to projection. For example, in some embodiments, a method includes obtaining information associated with one or more changes in one or more positions associated with one or more projection surfaces; coordinating one or more changes in one or more positions associated with one or more projection surfaces with one or more commands; and projecting in response to the information associated with one or more changes in one or more positions associated with one or more projection surfaces. In further embodiments, content for projection is selected in response to the coordinating.

49 Claims, 23 Drawing Sheets

Related U.S. Application Data continuation-in-part of application No. 12/217,115, filed on Jun. 30, 2008, now Pat. No. 8,262,236, and a continuation-in-part of application No. 12/217,123, filed on Jun. 30, 2008, and a continuation-in-part of application No. 12/217,117, filed on Jun. 30, 2008.

U.S. PATENT DOCUMENTS

| Patent No. | Date | Inventor |
|---|---|---|
| 5,635,725 A | 6/1997 | Cooper |
| 5,747,690 A | 5/1998 | Park et al. |
| 5,757,490 A | 5/1998 | Martin |
| 5,793,470 A | 8/1998 | Haseltine et al. |
| 5,838,889 A | 11/1998 | Booker |
| 5,902,030 A | 5/1999 | Blanchard |
| 5,914,756 A | 6/1999 | Maeda et al. |
| 5,951,015 A | 9/1999 | Smith et al. |
| 6,002,505 A | 12/1999 | Kraenert et al. |
| 6,115,022 A | 9/2000 | Mayer, III et al. |
| 6,266,048 B1 | 7/2001 | Carau, Sr. |
| 6,272,231 B1 | 8/2001 | Maurer et al. |
| 6,310,650 B1 | 10/2001 | Johnson et al. |
| 6,310,988 B1 | 10/2001 | Flores et al. |
| 6,334,063 B1 | 12/2001 | Charlier et al. |
| 6,340,976 B1 | 1/2002 | Oguchi et al. |
| 6,362,797 B1 | 3/2002 | Dehmlow |
| 6,414,672 B2 | 7/2002 | Rekimoto et al. |
| 6,424,998 B2 | 7/2002 | Hunter |
| 6,456,339 B1 | 9/2002 | Surati et al. |
| 6,489,934 B1 | 12/2002 | Klausner |
| 6,498,651 B1 | 12/2002 | Loil |
| 6,516,666 B1 | 2/2003 | Li |
| 6,527,395 B1 | 3/2003 | Raskar et al. |
| 6,549,487 B2 | 4/2003 | Gualtieri |
| 6,550,331 B2 | 4/2003 | Fujii et al. |
| 6,551,493 B2 | 4/2003 | Mori et al. |
| 6,554,431 B1 | 4/2003 | Binsted et al. |
| 6,563,504 B1 | 5/2003 | Rose et al. |
| 6,573,887 B1 | 6/2003 | O'Donnell, Jr. |
| 6,577,496 B1 | 6/2003 | Gioscia et al. |
| 6,595,644 B2 | 7/2003 | Kostrzewski et al. |
| 6,601,037 B1 | 7/2003 | Kolls |
| 6,611,252 B1 | 8/2003 | DuFaux |
| 6,611,253 B1 | 8/2003 | Cohen |
| 6,614,422 B1 | 9/2003 | Rafii et al. |
| 6,626,543 B2 | 9/2003 | Derryberry |
| 6,665,100 B1 | 12/2003 | Klug et al. |
| 6,675,630 B2 | 1/2004 | Challoner et al. |
| 6,695,451 B1 | 2/2004 | Yamasaki et al. |
| 6,708,087 B2 | 3/2004 | Matsumoto |
| 6,710,754 B2 | 3/2004 | Oliver et al. |
| 6,710,770 B2 | 3/2004 | Tomasi et al. |
| 6,727,864 B1 | 4/2004 | Johnson et al. |
| 6,733,138 B2 | 5/2004 | Raskar |
| 6,750,849 B2 | 6/2004 | Potkonen |
| 6,755,537 B1 | 6/2004 | Raskar et al. |
| 6,760,075 B2 | 7/2004 | Mayer, III et al. |
| 6,764,185 B1 | 7/2004 | Beardsley et al. |
| 6,793,350 B1 | 9/2004 | Raskar et al. |
| 6,798,401 B2 | 9/2004 | DuFaux |
| 6,802,614 B2 | 10/2004 | Haldiman |
| 6,811,264 B2 | 11/2004 | Raskar et al. |
| 6,840,627 B2 | 1/2005 | Olbrich |
| 6,844,893 B1 | 1/2005 | Miller et al. |
| 6,857,746 B2 | 2/2005 | Dyner |
| 6,909,670 B1 | 6/2005 | Li |
| 6,919,892 B1 | 7/2005 | Cheiky et al. |
| 6,955,297 B2 | 10/2005 | Grant |
| 6,984,039 B2 | 1/2006 | Agostinelli |
| 6,997,563 B1 | 2/2006 | Wang et al. |
| 7,013,029 B2 | 3/2006 | Keskar et al. |
| 7,016,711 B2 | 3/2006 | Kurakane |
| 7,036,936 B2 | 5/2006 | Hattori et al. |
| 7,043,987 B2 | 5/2006 | Jeong et al. |
| 7,071,924 B2 | 7/2006 | Wilbrink et al. |
| 7,088,352 B2 | 8/2006 | Wampler |
| 7,088,440 B2 | 8/2006 | Buermann et al. |
| 7,103,313 B2 | 9/2006 | Heinonen et al. |
| 7,134,078 B2 | 11/2006 | Vaarala |
| 7,151,530 B2 | 12/2006 | Roeber et al. |
| 7,151,764 B1 | 12/2006 | Heinonen et al. |
| 7,155,978 B2 | 1/2007 | Lo et al. |
| 7,159,441 B2 | 1/2007 | Challoner et al. |
| 7,173,605 B2 | 2/2007 | Fong et al. |
| 7,191,653 B2 | 3/2007 | Park et al. |
| 7,193,241 B2 | 3/2007 | Hayashi et al. |
| 7,195,170 B2 | 3/2007 | Matsumoto et al. |
| 7,209,569 B2 | 4/2007 | Boesen |
| 7,216,799 B2 | 5/2007 | Amemiya |
| 7,231,063 B2 | 6/2007 | Naimark et al. |
| 7,232,700 B1 | 6/2007 | Kubena |
| 7,239,445 B2 | 7/2007 | Pouslen |
| 7,242,388 B2 | 7/2007 | Lieberman et al. |
| 7,245,381 B2 | 7/2007 | Marino et al. |
| 7,248,151 B2 | 7/2007 | McCall |
| 7,252,002 B2 | 8/2007 | Zerbini et al. |
| 7,256,923 B2 | 8/2007 | Liu et al. |
| 7,257,255 B2 | 8/2007 | Pittel |
| 7,259,658 B2 | 8/2007 | Noguchi et al. |
| 7,266,391 B2 | 9/2007 | Warren |
| 7,270,003 B2 | 9/2007 | Sassolini et al. |
| 7,282,712 B2 | 10/2007 | Shibayama |
| 7,284,866 B2 | 10/2007 | Buchmann |
| 7,287,428 B2 | 10/2007 | Green |
| 7,290,885 B2 | 11/2007 | Salvatori et al. |
| 7,301,648 B2 | 11/2007 | Foxlin |
| 7,305,368 B2 | 12/2007 | Lieberman et al. |
| 7,328,616 B2 | 2/2008 | Won et al. |
| 7,330,269 B2 | 2/2008 | Zurn et al. |
| 7,332,717 B2 | 2/2008 | Murata et al. |
| 7,336,271 B2 | 2/2008 | Ozeki et al. |
| 7,337,669 B2 | 3/2008 | Nozoe |
| 7,350,923 B2 | 4/2008 | Olson et al. |
| 7,355,583 B2 | 4/2008 | Beardsley et al. |
| 7,355,584 B2 | 4/2008 | Hendriks et al. |
| 7,355,796 B2 | 4/2008 | Robinson |
| 7,358,986 B1 | 4/2008 | Knighton et al. |
| 7,361,899 B2 | 4/2008 | Iida |
| 7,363,816 B2 | 4/2008 | Judy et al. |
| 7,373,833 B2 | 5/2008 | Hopper et al. |
| 7,379,630 B2 | 5/2008 | Lagakos et al. |
| 7,382,599 B2 | 6/2008 | Kikuiri et al. |
| 7,460,185 B2 | 12/2008 | Saletta |
| 7,484,855 B2 | 2/2009 | Kobayashi et al. |
| 7,549,754 B2 | 6/2009 | Furui |
| 7,595,809 B2 | 9/2009 | Widdowson |
| 7,630,522 B2 | 12/2009 | Popp et al. |
| 7,742,949 B2 | 6/2010 | Evangelist et al. |
| 7,783,892 B2 | 8/2010 | Russell et al. |
| 7,810,114 B2 | 10/2010 | Flickinger et al. |
| 7,870,592 B2 | 1/2011 | Hudson et al. |
| 7,874,679 B2 | 1/2011 | Stonier |
| 7,891,826 B2 | 2/2011 | Fujinawa et al. |
| 7,936,943 B2 | 5/2011 | Way et al. |
| 7,967,445 B2 | 6/2011 | Hamano et al. |
| 7,980,707 B2 | 7/2011 | Murphy |
| 8,024,762 B2 | 9/2011 | Britt |
| 8,049,721 B2 | 11/2011 | Tagawa |
| 8,055,907 B2 | 11/2011 | Deem et al. |
| 2001/0000300 A1 | 4/2001 | Haile-mariam |
| 2001/0012001 A1 | 8/2001 | Rekimoto et al. |
| 2001/0024231 A1 | 9/2001 | Nakamura et al. |
| 2002/0105624 A1 | 8/2002 | Quori |
| 2002/0154091 A1 | 10/2002 | Uchida et al. |
| 2003/0017846 A1 | 1/2003 | Estevez et al. |
| 2003/0038925 A1 | 2/2003 | Choi |
| 2003/0038927 A1 | 2/2003 | Alden |
| 2003/0038928 A1 | 2/2003 | Alden |
| 2003/0051256 A1 | 3/2003 | Uesaki et al. |
| 2003/0061607 A1 | 3/2003 | Hunter et al. |
| 2003/0098957 A1 | 5/2003 | Haldiman |
| 2004/0003398 A1 | 1/2004 | Donian et al. |
| 2004/0012849 A1 | 1/2004 | Cruz-Uribe et al. |
| 2004/0027539 A1 | 2/2004 | Plunkett |
| 2004/0075820 A1 | 4/2004 | Chu et al. |
| 2004/0158865 A1 | 8/2004 | Kubler et al. |
| 2004/0184010 A1 | 9/2004 | Raskar et al. |

| | | |
|---|---|---|
| 2004/0184013 A1 | 9/2004 | Raskar et al. |
| 2004/0222983 A1 | 11/2004 | Kakemura |
| 2004/0239884 A1 | 12/2004 | Nagashima et al. |
| 2005/0030486 A1 | 2/2005 | Lee et al. |
| 2005/0036117 A1 | 2/2005 | Kobayashi |
| 2005/0046803 A1 | 3/2005 | Akutsu |
| 2005/0060210 A1 | 3/2005 | Levi et al. |
| 2005/0068501 A1 | 3/2005 | Nonaka et al. |
| 2005/0076372 A1 | 4/2005 | Moore et al. |
| 2005/0091671 A1 | 4/2005 | Deem et al. |
| 2005/0117130 A1 | 6/2005 | Bohn et al. |
| 2005/0153759 A1 | 7/2005 | Varley |
| 2005/0153760 A1 | 7/2005 | Varley |
| 2005/0179875 A1 | 8/2005 | Aoyanagi |
| 2005/0184958 A1 | 8/2005 | Gnanamgari et al. |
| 2005/0219467 A1 | 10/2005 | Nomizo et al. |
| 2005/0237492 A1 | 10/2005 | Shinozaki |
| 2005/0240417 A1 | 10/2005 | Savage |
| 2005/0253776 A1 | 11/2005 | Lee et al. |
| 2005/0259084 A1 | 11/2005 | Popovich et al. |
| 2005/0259231 A1 | 11/2005 | Salvatori et al. |
| 2005/0280628 A1 | 12/2005 | Adams et al. |
| 2006/0001543 A1 | 1/2006 | Raskar et al. |
| 2006/0015375 A1 | 1/2006 | Lee et al. |
| 2006/0017890 A1 | 1/2006 | Inazumi |
| 2006/0020481 A1 | 1/2006 | Lee et al. |
| 2006/0020515 A1 | 1/2006 | Lee et al. |
| 2006/0028624 A1 | 2/2006 | Kaise et al. |
| 2006/0038814 A1 | 2/2006 | Rivera |
| 2006/0038965 A1* | 2/2006 | Hennes ............... 353/94 |
| 2006/0044513 A1 | 3/2006 | Sakurai |
| 2006/0059002 A1 | 3/2006 | Shibata et al. |
| 2006/0066564 A1 | 3/2006 | Yee et al. |
| 2006/0075019 A1 | 4/2006 | Donovan et al. |
| 2006/0095515 A1 | 5/2006 | Forstadius |
| 2006/0103811 A1 | 5/2006 | May et al. |
| 2006/0109237 A1 | 5/2006 | Morita et al. |
| 2006/0129551 A1 | 6/2006 | Teicher |
| 2006/0158425 A1 | 7/2006 | Andrews et al. |
| 2006/0158623 A1* | 7/2006 | Kobayashi et al. ........... 353/122 |
| 2006/0164526 A1 | 7/2006 | Suzuki et al. |
| 2006/0170875 A1 | 8/2006 | Falck et al. |
| 2006/0170885 A1 | 8/2006 | Kitahara |
| 2006/0171008 A1 | 8/2006 | Mintz et al. |
| 2006/0184977 A1 | 8/2006 | Mueller et al. |
| 2006/0187421 A1 | 8/2006 | Hattori et al. |
| 2006/0198550 A1 | 9/2006 | Jung et al. |
| 2006/0234784 A1 | 10/2006 | Reinhorn |
| 2006/0256076 A1 | 11/2006 | Liou et al. |
| 2006/0266135 A1 | 11/2006 | Nishikawa et al. |
| 2006/0271486 A1 | 11/2006 | Cross et al. |
| 2007/0005450 A1 | 1/2007 | Krishnamoorthy et al. |
| 2007/0005809 A1 | 1/2007 | Kobayashi et al. |
| 2007/0024580 A1* | 2/2007 | Sands et al. ............. 345/156 |
| 2007/0024763 A1 | 2/2007 | Chung |
| 2007/0064208 A1 | 3/2007 | Giegerich et al. |
| 2007/0075982 A1 | 4/2007 | Morrison et al. |
| 2007/0085977 A1* | 4/2007 | Fricke et al. ............. 353/79 |
| 2007/0091278 A1 | 4/2007 | Zakoji et al. |
| 2007/0103652 A1 | 5/2007 | Nijim et al. |
| 2007/0106950 A1 | 5/2007 | Hutchinson et al. |
| 2007/0109500 A1 | 5/2007 | Kobori et al. |
| 2007/0109505 A1 | 5/2007 | Kubara et al. |
| 2007/0109509 A1 | 5/2007 | Lee |
| 2007/0115440 A1 | 5/2007 | Wiklof |
| 2007/0178973 A1 | 8/2007 | Camhi |
| 2007/0188450 A1 | 8/2007 | Hernandez et al. |
| 2007/0199108 A1 | 8/2007 | Angle et al. |
| 2007/0218432 A1 | 9/2007 | Glass et al. |
| 2007/0220575 A1 | 9/2007 | Cooper et al. |
| 2007/0242033 A1 | 10/2007 | Cradick et al. |
| 2007/0242233 A1 | 10/2007 | Sokeila et al. |
| 2007/0247422 A1 | 10/2007 | Vertegaal et al. |
| 2007/0266412 A1 | 11/2007 | Trowbridge et al. |
| 2007/0273842 A1 | 11/2007 | Morrison et al. |
| 2007/0273848 A1 | 11/2007 | Fan et al. |
| 2007/0282564 A1 | 12/2007 | Sprague et al. |
| 2008/0036969 A1 | 2/2008 | Otsuka et al. |
| 2008/0060014 A1 | 3/2008 | Bentley et al. |
| 2008/0066111 A1 | 3/2008 | Ellis et al. |
| 2008/0079752 A1 | 4/2008 | Gates et al. |
| 2008/0121701 A1 | 5/2008 | Gabriel |
| 2008/0129647 A1 | 6/2008 | Canova |
| 2008/0168523 A1 | 7/2008 | Ansari et al. |
| 2008/0183820 A1 | 7/2008 | Golovchinsky et al. |
| 2008/0192017 A1 | 8/2008 | Hildebrandt et al. |
| 2008/0212039 A1 | 9/2008 | Taylor |
| 2008/0224251 A1 | 9/2008 | Troost et al. |
| 2008/0256453 A1 | 10/2008 | Fein et al. |
| 2008/0291213 A1 | 11/2008 | Bhogal et al. |
| 2008/0319857 A1 | 12/2008 | Dobbins et al. |
| 2009/0019078 A1 | 1/2009 | Chisholm et al. |
| 2009/0037382 A1 | 2/2009 | Ansari et al. |
| 2009/0051961 A1 | 2/2009 | Ohsawa |
| 2009/0070276 A1 | 3/2009 | Kodimer et al. |
| 2009/0070881 A1 | 3/2009 | Yellepeddy et al. |
| 2009/0079945 A1 | 3/2009 | Klosowiak et al. |
| 2009/0088204 A1 | 4/2009 | Culbert et al. |
| 2009/0091714 A1* | 4/2009 | Aufranc et al. ............. 353/70 |
| 2009/0096994 A1 | 4/2009 | Smits |
| 2009/0117846 A1 | 5/2009 | Mavrakakis |
| 2009/0136212 A1 | 5/2009 | Klein |
| 2009/0149246 A1 | 6/2009 | Opaluch |
| 2009/0150947 A1 | 6/2009 | Soderstrom |
| 2009/0181645 A1 | 7/2009 | Chan et al. |
| 2009/0186700 A1 | 7/2009 | Konkle |
| 2009/0217320 A1 | 8/2009 | Aldrey |
| 2009/0295712 A1 | 12/2009 | Ritzau |
| 2009/0310099 A1 | 12/2009 | Jung et al. |
| 2009/0310101 A1 | 12/2009 | Jung et al. |
| 2009/0310102 A1 | 12/2009 | Jung et al. |
| 2009/0311965 A1 | 12/2009 | Jung et al. |
| 2009/0316671 A1 | 12/2009 | Rolf et al. |
| 2010/0082743 A1 | 4/2010 | Zeng et al. |
| 2011/0255059 A1 | 10/2011 | Furui |

FOREIGN PATENT DOCUMENTS

WO WO 2006/040725 AI 4/2006
WO WO 2007/111382 A1 10/2007

OTHER PUBLICATIONS

U.S. Appl. No. 12/291,024, Jung et al.
U.S. Appl. No. 12/291,023, Jung et al.
U.S. Appl. No. 12/291,019, Jung et al.
U.S. Appl. No. 12/290,241, Jung et al.
U.S. Appl. No. 12/290,240, Jung et al.
U.S. Appl. No. 12/286,750, Jung et al.
U.S. Appl. No. 12/286,731, Jung et al.
U.S. Appl. No. 12/229,536, Jung et al.
U.S. Appl. No. 12/229,534, Jung et al.
U.S. Appl. No. 12/229,519, Jung et al.
U.S. Appl. No. 12/229,518, Jung et al.
U.S. Appl. No. 12/229,508, Jung et al.
U.S. Appl. No. 12/229,505, Jung et al.
U.S. Appl. No. 12/220,906, Jung et al.
U.S. Appl. No. 12/218,269, Jung et al.
Harding, Margaret; "Futuristic Windshield Helps Drivers See the Road"; Siliconvalley.com; Bearing a date of Jul. 18, 2008; pp. 1-2; located at: http://www.siliconvalley.com/ci_9919977?IADID=Search-www.siliconvalley.com-www.siliconvalley.com; printed on Aug. 18, 2008.
U.S. Appl. No. 12/218,268, Jung et al.
U.S. Appl. No. 12/218,267, Jung et al.
U.S. Appl. No. 12/218,266, Jung et al.
Menon, Anuradha; "Flexible Computers Conform to Any Shape"; The Future of Things; Bearing a date of Jul. 3, 2008; pp. 1-3; located at: http://thefutureofthings.com/news/1222/flexible-computers-able-to-conform-any-shape.html; printed on Jul. 9, 2008.
"Mint V 10: World's Smallest Pocket Projector"; Gizmodo; Bearing a date of Aug. 18, 2008; pp. 1-3; located at: http://gizmodo.com/5031873/mint-v10-worlds-smallest-pocket-projector; printed on Aug. 18, 2008.
Murph, Darren; "3M Reveals MPro1 10 Pocket Projector: Ships This Month"; Engadget; Bearing a date of Sep. 13, 2008; pp. 1-5;

Weblogs, Inc.; located at: http://www.engadget.com/2008/09/13/3m-reveals-mpro110-pocket-projector-ships-this-month/; printed on Sep. 22, 2008.

"Projectors: LG Projector Phone is Like a Media-Throwing Web Shooter"; Gizmodo; Bearing a date of Jul. 9, 2008; pp. 1-3; located at: http://gizmodo.com/5022626/lg-projector-phone-is-like-a-media+throwing-web-shooter; printer on Jul. 9, 2008.

"Projectors: 18 Super Small Projectors"; Gizmodo; Bearing a date of Aug. 18, 2008; pp. 1-3; located at: http://gizmodo.com/5031238/18-super-small-projectors; printed on Aug. 18, 2008.

Ricker, Thomas; "Video: Camera-Based Concept Turns Any Surface into a DJ Deck"; Engadget; Bearing a date of Jul. 31, 2008; pp. 1-5; Weblogs, Inc.; located at: http://www.engadget.com/2008/07/31/video-camera-based-concept-turns-any-surface-into-a-dj-deck/; printed on Aug. 18, 2008.

Topolsky, Joshua; "SenseSurface Sticks Knobs Onto Screens, Turns Virtual Controls Physical"; Engadget; Bearing a date of Jul. 16, 2008; pp. 1-7; Weblogs, Inc.; located at: http://www.engadget.com/2008/07/16/sensesurface-sticks-knobs-onto-screens-turns-virtual-controls-p/; printed on Aug. 18, 2008.

Allen, Danny; "Before Nikon's S1000pj: The Cine-Twin Was the First Camera/Projector Hybrid"; printed on Nov. 25, 2009; pp. 1-2; gizmodo.com; located at http://gizmodo.com/5347564/before-nikons-s1000pj-the-cine+twin-was-the-first-cameraprojector-hybrid.

Allen, Danny; "Ericsson's Spider PC Concept Projects the Keyboard and Screen"; printed on Nov. 25, 2009; pp. 1-3;gizmodo.com; located at http://gizmodo.com/5392667/ericssons-spider-pc-concept-projects-the-keyboard-and-screen.

Herrman, John; "Nikon 51000pj Projector Camera Review: Screw You All, I Love This Thing"; printed on Nov. 25, 2009; pp. 1-5; gizmodo.com; located at http://gizmodo.com/5402528/nikon-s1000pj-projector-camera-review-screw-you-all-i-love-this-thing.

Miller, Paul; "Optoma's screen-in-a-bag actually makes a lot of sense"; bearing a date of Nov. 12 2009; printed on Nov. 25, 2009; pp. 1-5; engadget.com; located at http://www.engadget.com/2009/11/12/optomas-screen-in-a-bag-actually-makes-a-lot-of-sense.

Diaz, Jesus; "Is There an iPad Cinema in Your Future?"; Bearing a date of Mar. 16, 2010, printed on Mar. 19, 2010; pp. 1-2; Gizmodo.com; located at http://gizmodo.com/5494787/is-there-an-ipad-cinema-in-your-future.

Hannaford, Kat; "Pico Projector From Light Blue Optics Throws Up a 10-inch Touchscreen Laser Projection"; Bearing a date of Jan. 5, 2010, printed on Jan. 19, 2010; pp. 1-2; Gizmodo.com; located at http://gizmodo.com/5440651/pico-projector-from-light-blue-optics-throws-up-a-10+inch-touchscreen-laser-projection.

Loftus, Jack; "Dell Froot Concept Design Does Away with Keyboard, Monitor"; Bearing a date of Jan. 17, 2010, printed on Jan. 19, 2010; pp. 1-2; Gizmodo.com; located at http://gizmodo.com/5450176/dell-froot-concept-design-does-away-with-keyboard-monitor.

Blass, Evan; "Hands-On With Texas Instruments' Cellphone Projector"; Engadget; Bearing a date of Sep. 20, 2007; pp. 1-7; Weblogs, Inc.; located at: http://www.engadget.com/2007/09/20/hands-on-with-texas-instruments-cellphone-projector/; printed on Apr. 10, 2008.

Browne et al.; "Using Motion Control to Guide Augmented Reality Manufacturing Systems"; Motion Control Technology; Bearing a date of 2006; pp. 1-4; ABP International, Inc.; located at: http://www.nasatech.com/motion/features/feat_1007.html; printed on May 8, 2008.

"Cell Phone With Built-in Projector"; Physorg; Bearing a date of Mar. 24, 2005; p. 1; located at: http://www.physorg.com/news3505.html; printed on Apr. 10, 2008.

"Concepts: Cellphone Projector Concept Allows Impromptu Sales Meetings"; Gizmodo; pp. 1-3; located at: http://gizmodo.com/gadgets/concepts/cellphone-projector-concept-allows-impromptu-sales-meetings-311590.php; printed on Apr. 10, 2008.

"Hybrid Technology"; InterSense; p. 1; InterSense, Inc.; located at: http://www.isense.com/products.aspx?id=43; printed on May 8, 2008.

"6-DOF Tracking (IS-900, IS-1200 Product Families)"; InterSense; p. 1; InterSense, Inc.; located at: http://www.isense.com/products.aspx?id=45&; printed on May 8, 2008.

"Precision Motion Tracking Solutions"; InterSense; p. 1; InterSense, Inc.; located at: http://www.isense.com/; printed on May 8, 2008.

"Is That a Projector in Your Pocket or a . . . Cell Phone?"; Gadget Review; Bearing a date of Mar. 27, 2007; pp. 1-6; located at: http://www.gadgetreview.com/2007/03/is-that-a-projector-in-your-pocket-or-acell-phone.html; printed on Apr. 10, 2008.

Kanellos, Michael; "TI Demos Its Movie Projector in a Phone"; CNET News; Bearing a date of Mar. 26, 2007; pp. 1-2; CNET Networks, Inc.; located at: http://earthlink.com.com/TI+demos+its+movie+projector+in+a+phone/2100-1041_3-6170619.html; printed on Apr. 10, 2008.

Lagorio, Christine; "Weird Science! NYU Student Invents Virtual Girlfriend"; New York Magazine; Bearing a date of May 14, 2008; pp. 1-2; New York Media LLC; located at: http://nymag.com/daily/intel/2008/05/weird_science_nyu_student_inve.html; printed on May 15, 2008.

"LCD Projector Cell Phone Next April"; Gadget Review; Bearing a date of Apr. 13, 2006; pp. 1-6; located at: http://www.gadgetreview.com/2006/04/lcd-project-cell-phone-next-april.html; printed on Apr. 10, 2008.

"Micro Piezo Gyro"; Heli-Max Performance Parts; Bearing a date of 1998; pp. 1-2; located at: http://manuals.hobbico.com/hmx/hmxm1010-manual.pdf.

Mooney, Allison; "Mobile Phone Projectors"; PSFK; Bearing a date of Oct. 22, 2007; pp. 1-6; located at: http://www.psfk.com/2007/10/mobile-phone-projectors.html; printed on Apr. 10, 2008.

"Nano Projector Now in Cellphones"; Ubergizmo; Bearing a date of Jul. 2, 2007; pp. 1-4; located at: http://www.ubergizmo.com/15/archives/2007/07/nano_projector_now_in_cellphones.html; printed on Apr. 10, 2008.

"PicoP: Mobile Phone Projector From Microvision"; Planet Cell Phone Blog; Bearing a date of Sep. 23, 2006; pp. 1-9; located at : http://blog.planet-cell-phone.com/2006/09/23/picop-mobile-phone-projector-from-microvision/; printed on Apr. 10, 2008.

"Pico: Optoma to Launch 'World's First' Pico Projector in 2008"; Gizmodo; Bearing a date of Jun. 18, 2008; pp. 1-3; located at: http://gizmodo.com/5017516/optoma-to-launch-worlds-first-pico-projector-in-2008; printed on Jun. 23, 2008.

Sakata et al.; "Digital Annotation System for Printed Paper Documents Using Camera-Projector Systems"; ACTA Press; Bearing a date of 2007; p. 1; located at: http://www.actapress.com/Abstract.aspx?paperId=27986; printed on May 2, 2008 (Abstract Only).

"Silicon Gyroscopes"; Boeing; pp. 1-3; located at: http://www.boeing.com/defense-space/space/bss/factsheets/gyro/gyro.html; printed on Apr. 25, 2008.

Svensson, Peter; "Projectors to Magnify Cell-Phone Cinema"; Physorg; Bearing a date of Apr. 3, 2008; pp. 1-2; The Associated Press; located at: http://www.physorg.com/news126457642.html; printed on Apr. 10, 2008.

"Technology: Micro Projectors:: Nice and Steady: Vibration-Compensated Mini Projectors"; Symbian-freak: Bearing a date of Jun. 14, 2007; pp. 1-3; Symbian Freak; located at: http://www.symbian-freak.com/news/007/06/tiny_projector_nice_and_steady.htm; printed on Apr. 28, 2008.

U.S. Appl. No. 12/459,581, Jung et al.
U.S. Appl. No. 12/459,580, Jung et al.
U.S. Appl. No. 12/454,184, Jung et al.
U.S. Appl. No. 12/380,595, Jung et al.
U.S. Appl. No. 12/380,582, Jung et al.
U.S. Appl. No. 12/380,571, Jung et al.
U.S. Appl. No. 12/322,876, Jung et al.
U.S. Appl. No. 12/322,875, Jung et al.
U.S. Appl. No. 12/322,063, Jung et al.

"2010 Toyota Prius Touch Tracer Display"; KickingTires; printed on Mar. 4, 2009; pp. 1-5; located at http://blogs.cars.com/kickingtires/2009/03/2010-toyota-prius-touch-tracer-display.html.

Foo, Juniper; "MIT's 6$^{th}$ Sense device could trump Apple's multitouch"; Crave; bearing a date of Feb. 9, 2009; printed on Feb. 19, 2009; pp. 1-4; located at http://news.cnet.com/8301-17938_105-10159601-1.html.

Frucci, Adam; "MiLi Pro Turns Your iPhone Into a Projector"; GIZMODO; bearing a date of Jun. 26, 2009; printed on Jul. 8, 2009;

pp. 1-3; located at http://gizmodo.com/5302942/mili-pro-turns-your-iphone-into-a-projector/gallery/.

Hereld, Mark et al.; "Introduction to Building Projection-based Tiled Display Systems"; pp. 1-9; Computer Science Department, University of Chicago.

June, Laura; "Toshiba announces TDP-F10U pico projector"; Engadget; bearing a date of Jan. 7, 2009; printed on Jan. 15, 2009; pp. 1-2; Weblogs, Inc.; located at: http://www.engadget.com/2009/01/07/toshiba-announces-tdp-f10u-pico-projector/.

Lam, Brian; "Bug Labs Open Source Gadgets Getting Pico Projector, 3G modules and More"; Gizmodo; bearing a date of Jan. 7, 2009; printed on Jan. 15, 2009; pp. 1-2; located at: http://i.gizmodo.com/5125563/bug-labs-open-source-gadgets-getting-pico-projector-3g-modules-and-more.

U.S. Appl. No. 12/217,123, Jung et al.
U.S. Appl. No. 12/217,118, Jung et al.
U.S. Appl. No. 12/217,117, Jung et al.
U.S. Appl. No. 12/217,116, Jung et al.
U.S. Appl. No. 12/217,115, Jung et al.
U.S. Appl. No. 12/214,422, Jung et al.

Melanson, Donald; "Apple patent filing suggests a safer in-car touchscreen"; ENGADGET; bearing a date of Mar. 30, 2009; printed on Apr. 10, 2009; pp. 1-8; located at http://www.engadget.com/2009/03/30/apple-patent-filing-suggests-a-safer-in-car-touchscreen/.

Melanson, Donald; "Light Blue Optics promises tough-interface pico projectors"; Engadget; bearing a date of Jun. 3, 2009; printed on Jun. 8, 2009; pp. 1-4; located at http://www.engadget.com/2009/06/03/light-blue-optics-promises-touch-interface-pico-projectors/.

Miller, Ross; "WowWee Cinemin Swivel, Stick, and Station pico PJs hands-on"; Engadget; bearing a date of Jan. 7, 2009; printed on Jan. 15, 2009; pp. 1-3; Weblogs, Inc.; located at: http:www.engadget.com/2009/01/07/wowwee-cinemin-swivel-stick-and-station-pico-pjs-hands-on/.

Murph, Darren; "TI's DLP Pico technology unveiled in new round of pico projectors"; Engadget; bearing a date of Jan. 7, 2009; printed on Jan. 15, 2009; pp. 1- 2; Weblogs, Inc.; located at: http://www.engadget.com/2009/01/07/tis-dip-pico-technology-unveiled-in-new-round-of-pico-projector/.

Nosowitz, Dan; "Official Specs and Prices for New Nikon Coolpix Line, Including Mutant Projector-Camera"; Gizmodo; bearing a date of Aug. 4, 2009; printed on Aug. 4, 2009; pp. 1-4; located at http://gizmodo.com/5329376/official-specs-and-prices-for-new-nikon-coolpix-line-including-mutant-projector+camera.

Oliver, Sam; "Apple may add micro projectors to iPhones, iPod touches"; AppleInsider; bearing a date of Jul. 6, 2009; printed on Jul. 8, 2009; pp. 1-8; located at http://www.appleinsider.com/articles/09/07/06/apple_may_add_micro_projectors_toiphones_ipodtouches.html/.

"Rear Projection Products and Technology"; Christie Digital; printed on Feb. 13, 2009; pp. 1-2; located at http://controlrooms.christiedigital.com/Products/RearScreenTilingProjectors/.

"What is Science on a Sphere® (SOS)?"; Science on a Sphere®; printed on Mar. 4, 2009; pp. 1-2; NOAA; located at http://sos.noaa.gov/about/.

Wilson, Mark; "Logic Bolt: The US's First Projecting Cellphone"; Gizmodo; bearing a date of Jan. 8, 2009; printed on Jan. 15, 2009; pp. 1-3; located at: http://i.gizmodo.com/5126754/logic-bolt-the-uss-first-projecting-cellphone.

Wilson, Mark; "New Pico Projectors Offer DVD-Quality Resolution"; Gizmodo; bearing a date of Feb. 17, 2009; printed on Feb. 19, 2009; pp. 1; located at http://i.gizmodo.com/5155132/new-pico-projectors-offer-dvd+quality-resolution.

Diaz, Jesus; "Rear-Projection Urinal Lets You Pee Over Football Games or Bill O'Reilly"; GIZMODO; bearing a date of Aug. 10, 2009; pp. 1; located at: http://gizmodo.com/5333854/; printed on Aug. 10, 2009.

Wilson, Andrew D.; Benko, Hrvoje; "Combining Multiple Depth Cameras and Projectors for Interactions On, Above, and Between Surfaces"; UIST'10; 10 total pages; bearing a date of Oct. 3-6, 2010; ACM.

Lee et al.; "Automatic Projector Calibration with Embedded Light Sensors"; UIST '04; dates of Oct. 24-27, 2004; pp. 1-4; ACM.

U.S. Appl. No. 60/990,851, Klein, Scott V.

"Panasonic—Electronic Print Board (Interactive Panaboard) Operating Instructions with Installation Manual (for qualified service personnel), Model No. KX-BP800"; Panasonic; Bearing a date of 2001; pp. 1-86; Kyushu Matsushita Electric Co., Ltd.

* cited by examiner

SYSTEMS AND METHODS FOR PROJECTING IN RESPONSE TO POSITION CHANGE OF A PROJECTION SURFACE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/214,422, entitled SYSTEMS AND DEVICES, naming Edward K. Y. Jung, Royce A. Levien, Robert W. Lord, Mark A. Malamud, John D. Rinaldo, Jr., and Lowell L. Wood, Jr. as inventors, filed 17 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,118, entitled MOTION RESPONSIVE DEVICES AND SYSTEMS, naming Edward K. Y. Jung, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,116, entitled SYSTEMS AND METHODS FOR PROJECTING, naming Edward K. Y. Jung, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,115, entitled SYSTEMS AND METHODS FOR TRANSMITTING INFORMATION ASSOCIATED WITH PROJECTING, naming Edward K. Y. Jung, Royce A. Levien, Robert W. Lord, Mark A. Malamud, John D. Rinaldo, Jr., and Lowell L. Wood, Jr. as inventors, filed 30 Jun. 2008, now U.S. Pat. No. 8,262,236 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,123, entitled SYSTEMS AND METHODS FOR RECEIVING INFORMATION ASSOCIATED WITH PROJECTING, naming Edward K. Y. Jung, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/217,117, entitled SYSTEMS AND METHODS FOR PROJECTING IN RESPONSE TO CONFORMATION, naming Edward K. Y. Jung, Royce A. Levien, Robert W. Lord, Mark A. Malamud, John D. Rinaldo, Jr., and Lowell L. Wood, Jr. as inventors, filed 30 Jun. 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates to systems and methods that are related to projection.

SUMMARY

In one aspect, a method includes but is not limited to obtaining information associated with one or more changes in one or more positions associated with one or more projection surfaces and projecting in response to the information associated with one or more changes in one or more positions associated with one or more projection surfaces. The method may optionally include coordinating one or more changes in one or more positions associated with one or more projection surfaces with one or more commands. The method may optionally include projecting in response to the coordinating one or more changes in one or more positions associated with one or more projection surfaces with one or more commands. In addition to the foregoing, other aspects are described in the claims, drawings, and text forming a part of the present disclosure.

In one aspect, a system includes but is not limited to circuitry for obtaining information associated with one or more changes in one or more positions associated with one or more projection surfaces and circuitry for projecting that is responsive to the circuitry for obtaining information associated with one or more changes in one or more positions associated with one or more projection surfaces. The system may optionally include circuitry for coordinating one or more changes in one or more positions associated with one or more projection surfaces with one or more commands. The system may optionally include circuitry for projecting in response to the circuitry for coordinating one or more changes in one or more positions associated with one or more projection surfaces with one or more commands. In addition to the foregoing, other system aspects are described in the claims, drawings, and text forming a part of the present disclosure.

In one aspect, a system includes but is not limited to means for obtaining information associated with one or more changes in one or more positions associated with one or more projection surfaces and means for projecting that is responsive to the means for obtaining information associated with one or more changes in one or more positions associated with one or more projection surfaces. The system may optionally include means for coordinating one or more changes in one or more positions associated with one or more projection surfaces with one or more commands. The system may optionally include means for projecting in response to the means for coordinating one or more changes in one or more positions associated with one or more projection surfaces with one or more commands. In addition to the foregoing, other system aspects are described in the claims, drawings, and text forming a part of the present disclosure.

In one aspect, a system includes but is not limited to a signal-bearing medium bearing one or more instructions for obtaining information associated with one or more changes in one or more positions associated with one or more projection surfaces and one or more instructions for projecting in response to the information associated with one or more changes in one or more positions associated with one or more projection surfaces. The system may optionally include one or more instructions for coordinating one or more changes in one or more positions associated with one or more projection surfaces with one or more commands. The system may optionally include one or more instructions for projecting in response to the coordinating one or more changes in one or more positions associated with one or more projection surfaces with one or more commands. In addition to the foregoing, other system aspects are described in the claims, drawings, and text forming a part of the present disclosure.

In one or more various aspects, means include but are not limited to circuitry and/or programming for effecting the herein referenced functional aspects; the circuitry and/or programming can be virtually any combination of hardware, software, and/or firmware configured to effect the herein referenced functional aspects depending upon the design choices of the system designer. In addition to the foregoing, other system aspects means are described in the claims, drawings, and/or text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein referenced method aspects depending upon the design choices of the system designer. In addition to the foregoing, other system aspects are described in the claims, drawings, and/or text forming a part of the present application.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 1:
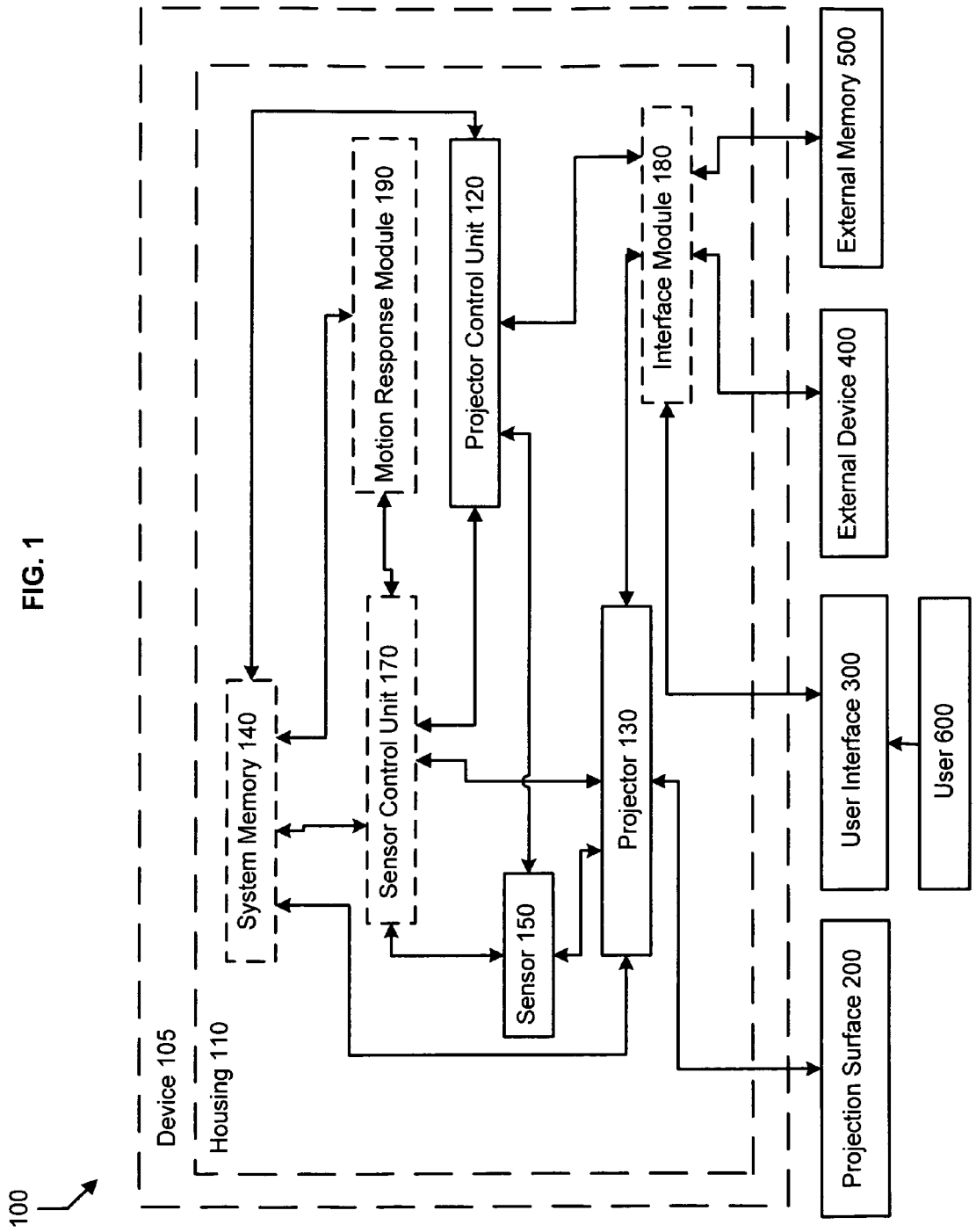
FIG. 1 illustrates an example system 100 in which embodiments may be implemented.
Figure 1A:
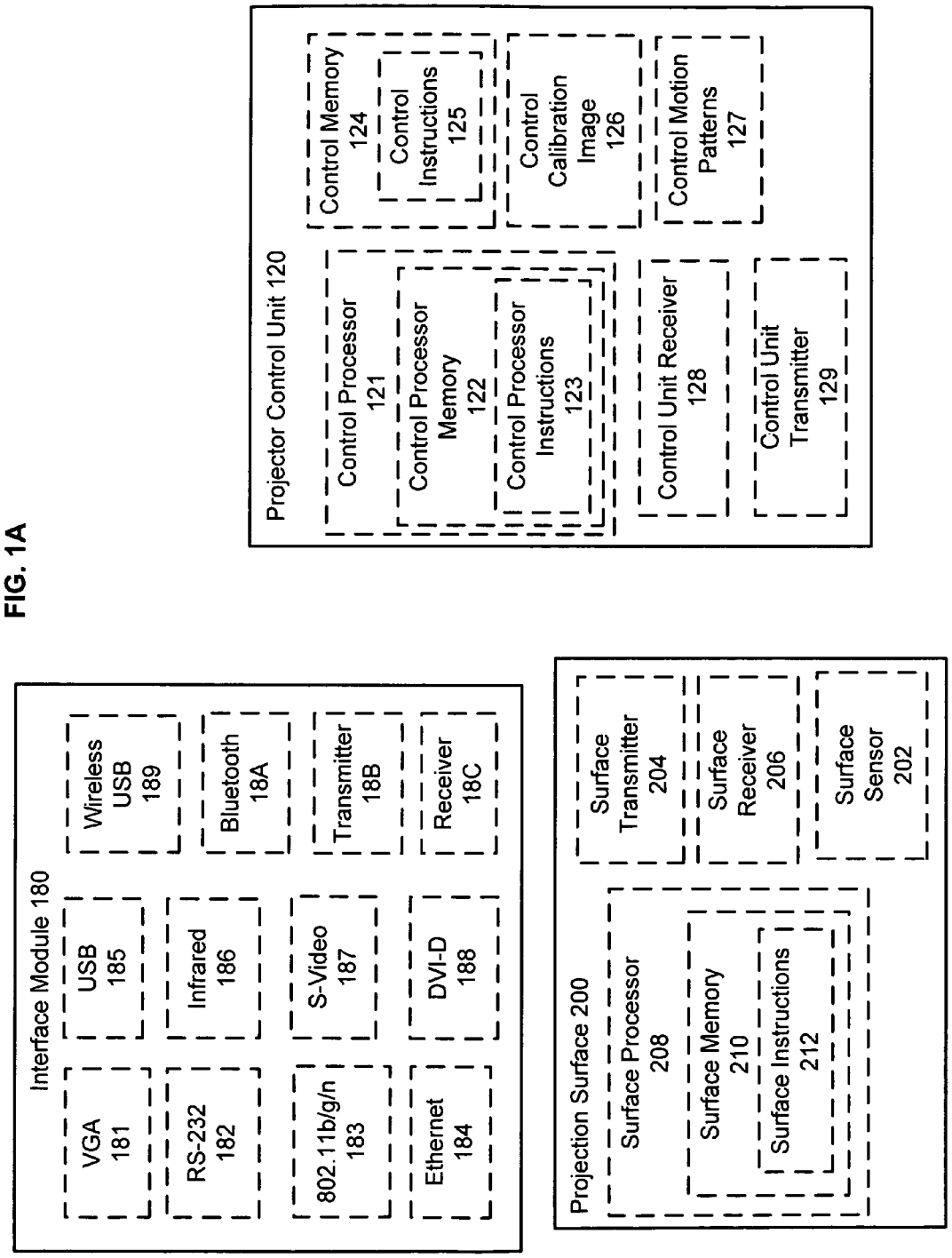
FIG. 1A illustrates example components that may be implemented within example system 100.
Figure 1B:
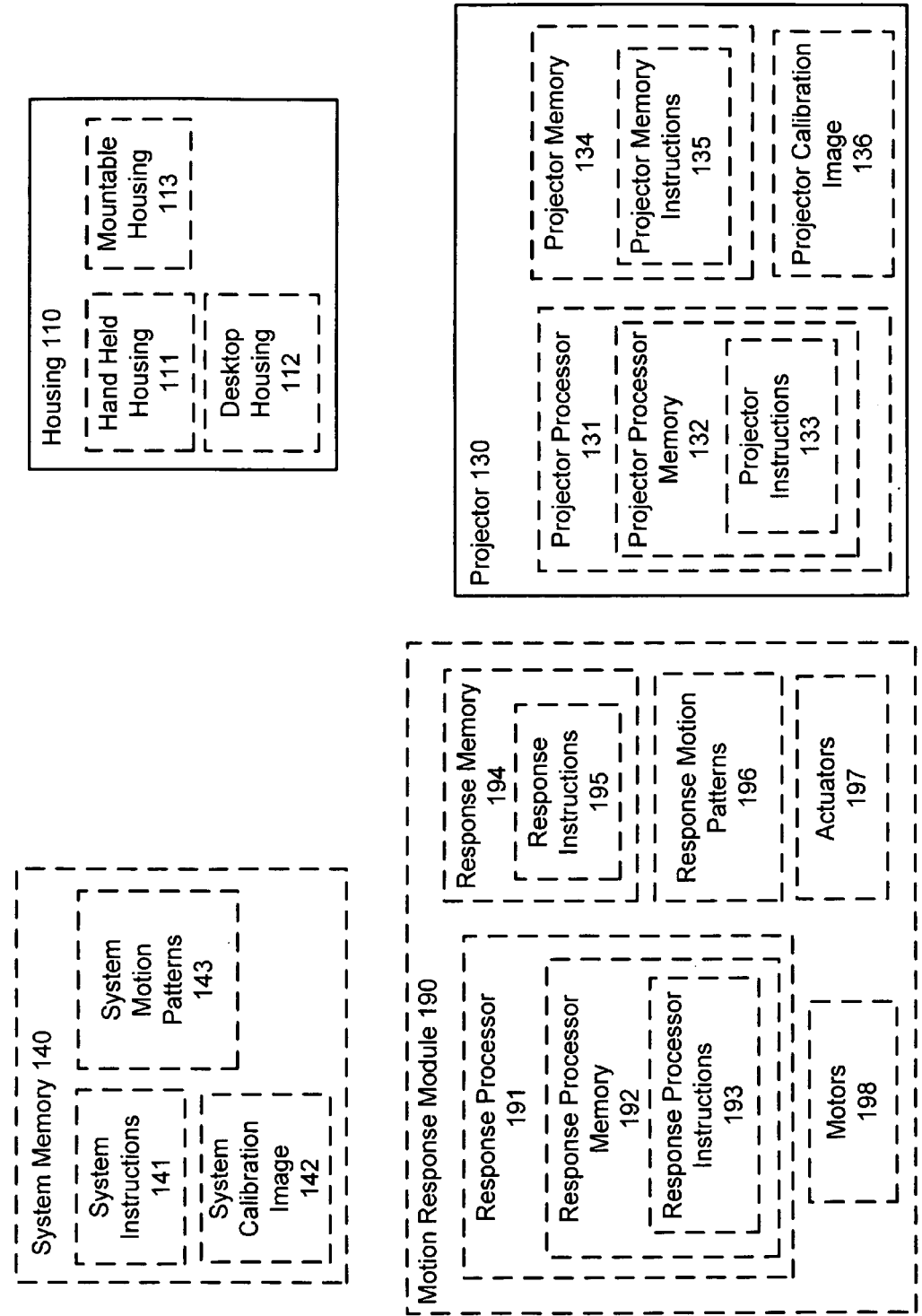
FIG. 1B illustrates example components that may be implemented within example system 100.
Figure 1C:
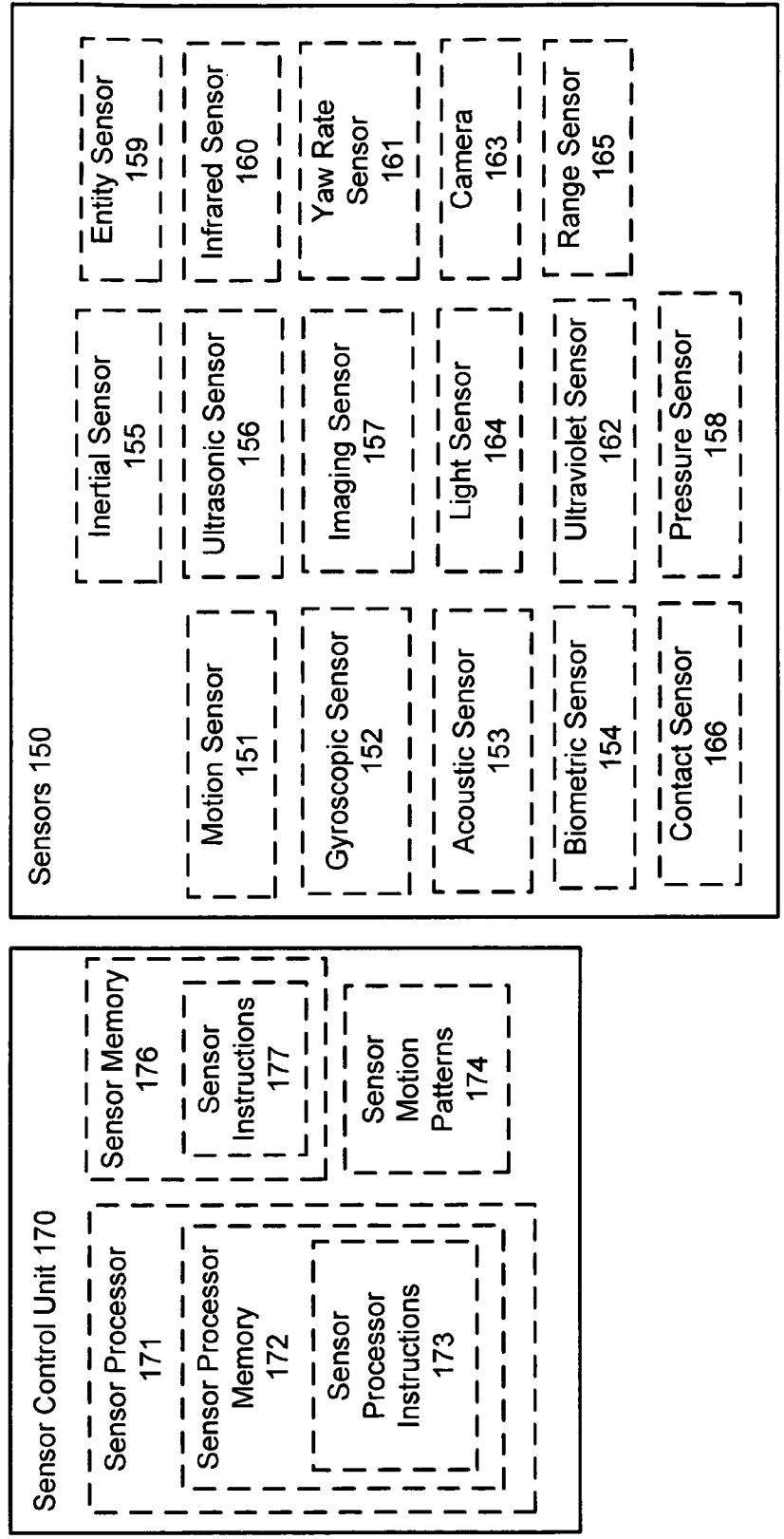
FIG. 1C illustrates example components that may be implemented within example system 100.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

FIG. 1 illustrates an example system 100 in which embodiments may be implemented. In some embodiments, system 100 may include one or more devices 105. In some embodiments, system 100 may include one or more housings 110. In some embodiments, system 100 may include system memory 140. In some embodiments, system 100 may include one or more projectors 130. In some embodiments, system 100 may include one or more projector control units 120. In some embodiments, system 100 may include one or more motion response modules 190. In some embodiments, system 100 may include one or more sensor control units 170. In some embodiments, system 100 may include one or more sensors 150. In some embodiments, system 100 may include one or more interface modules 180. In some embodiments, system 100 may include one or more projection surfaces 200. In some embodiments, system 100 may include one or more user interfaces 300. In some embodiments, system 100 may include one or more external devices 400. In some embodiments, system 100 may include external memory 500. In some embodiments, system 100 may provide for user 600 interaction. In some embodiments, system 100 may include two or more projectors 130 that project in a coordinated manner. For example, in some embodiments, two or more projectors 130 may project the same content such that the projections are registered together to create a continuous projection.

Device

A system may include one or more devices 105. A device 105 may be configured to have numerous conformations. In some embodiments, a device 105 may be configured as a hand held device. For example, in some embodiments, a device 105 may be configured as a computer mouse. In some embodiments, a device 105 may be configured as a hand held projector. In some embodiments, a device 105 may be configured as a hand held projector 130 and laser pointer. In some embodiments, a device 105 may be configured as a mountable device 105. For example, in some embodiments, a device 105 may be configured as a device 105 that may be mounted to a ceiling. In some embodiments, a device 105 may be configured as a ceiling mounted device 105 that may be configured to project content onto one or more portions of one or more substantially vertical surfaces. In some embodiments, a device 105 may be configured as a ceiling mounted device 105 that may be configured to project content onto one or more portions of one or more substantially horizontal surfaces. In some embodiments, a device 105 may be configured as a ceiling mounted device 105 that may be configured to project content onto one or more portions of one or more substantially vertical surfaces and onto one or more portions of one or more substantially horizontal surfaces. In some embodiments, a device 105 may be configured to project content onto one or more portions of one or more tabletops. For example, in some embodiments, a device 105 may be mounted onto a wall and configured to project content onto one or more tabletops. In some embodiments, a device 105 may be mounted and/or positioned onto a desk and configured to project content onto one or more desktops. In some embodiments, a device 105 may be mounted to or otherwise contained within another system, such as a desktop or mobile computer, PDA, cellular phone, camera 163, video player, or other system, for the display of content associated with that system. Accordingly, a device 105 may be configured in numerous ways to project content onto numerous types of projection surfaces 200.

In some embodiments, a device 105 may be configured to project in response to motion imparted to the device 105. In some embodiments, a device 105 may be configured to project content in manner that is dependent upon one or more substantially specific motions that are imparted to the device 105. For example, in some embodiments, a device 105 may be configured to project content contained on pages of a book in a manner that is motion dependent. Accordingly, in some embodiments, a device 105 may be configured to project content contained on the next page in a series upon rotation of the device 105 in a clockwise direction. In some embodiments, a device 105 may be configured to project content contained on the preceding page in a series upon rotation of the device 105 in a counterclockwise direction. In some embodiments, a device 105 may be configured to project content on the next page in a series upon being moved to the left from a starting position and then moved substantially back to the starting position. In some embodiments, the device 105 may be configured to project content on the preceding page in a series upon being moved to the right from a starting position and then moved substantially back to the starting position. In some embodiments, a device 105 may select content to be projected in response to motion imparted to the device 105. For example, in some embodiments, a device 105 may be configured to project content associated with a newspaper when the device 105 is positioned in a first orientation and be configured to project content associated with a news magazine when positioned in a second orientation. In some embodiments, a device 105 may be configured to correlate substantially specific motions with projection commands to select content in a motion dependent manner. In some embodiments, a device 105 may be configured to correlate substantially specific motions with projection commands to project content in a motion dependent manner. In some embodiments, a device 105 may be configured to correlate substantially specific motions with projection commands to select and project content in a motion dependent manner.

In some embodiments, a device 105 may be configured to project content in a manner that is dependent upon a person who is associated with the device 105. For example, in some embodiments, a device 105 may be configured to project children's content if used by a child. In some embodiments, a device 105 may be configured to project the statistics associated with various sports teams when associated with a first person and configured to project stock quotes when associated with a second person. Accordingly, a device 105 may be configured to project content that is selected in accordance with specific persons or classes of persons.

Housing

System 100 may include one or more devices 105 that include one or more housings 110. In some embodiments, a housing 110 may be configured to include one or more projectors 130, one or more projector control units 120, one or more motion response modules 190, one or more sensor control units 170, one or more sensors 150, one or more interface modules 180, or substantially any combination thereof. In some embodiments, a housing 110 may be configured for use in a handheld device 105. In some embodiments, a housing 110 may be configured for use in a mountable device 105. Accordingly, a housing 110 may be configured to have numerous conformations. A housing 110 may be constructed from numerous types of materials and combinations of materials. Examples of such materials include, but are not limited to, plastics, metals, papers, ceramics, and the like. In some embodiments, a housing 110 may include electrical connections to provide for operable association of components associated with the housing 110. In some embodiments, a housing 110 may include optical connections to provide for operable association of components associated with the housing 110.

Memory

System 100 may include numerous types of system memory 140. Examples of system memory 140 include, but are not limited to, flash memory, random access memory, read-only memory, hard drives, optical storage, external memory 500, and the like. In some embodiments, the system memory 140 may be dedicated for access from one or more individual components (e.g., one or more processors) contained within system 100. In some embodiments, the system memory 140 may be included within one or more devices 105. In some embodiments, the system memory 140 may be included within one or more devices 105 and may be dedicated for access from one or more individual components (e.g., one or more processors) included within the device 105. In some embodiments, the system memory 140 that is included within the device 105 may be configured for system wide access. System memory 140 may be configured in numerous ways. Examples of such configurations include, but are not limited to, projector processor memory 132, projector memory 134, control processor memory 122, control memory 124, response processor memory 192, response memory 194, sensor processor memory 172, sensor memory 176, and substantially any combination thereof.

Projector

System 100 may include one or more projectors 130. In some embodiments, a projector 130 may be operably associated with one or more projector control units 120. In some embodiments, a projector 130 may be operably associated with one or more motion response modules 190. In some embodiments, a projector 130 may be operably associated with one or more interface modules 180. In some embodiments, a projector 130 may be operably associated with one or more sensors 150. In some embodiments, a projector 130 may be operably associated with one or more sensor control units 170. In some embodiments, a projector 130 may be operably associated with system memory 140. In some embodiments, a projector 130 may be operably associated with one or more projector processors 131. In some embodiments, a projector 130 may be operably associated with projector processor memory 132. In some embodiments, a projector 130 may be operably associated with one or more projector instructions 133. In some embodiments, a projector 130 may be operably associated with projector memory 134. In some embodiments, a projector 130 may be operably associated with projector memory instructions 135. In some embodiments, a projector 130 may be operably associated with one or more projector calibration images 136. In some embodiments, a projector 130 may be operably associated with one or more control motion patterns 127. In some embodiments, a projector 130 may be operably associated with one or more user interfaces 300. In some embodiments, a projector 130 may be operably associated with one or more external devices 400. In some embodiments, a projector 130 may be operably associated with external memory 500. In some embodiments, a projector 130 may be operably associated with one or more housings 110. In some embodiments, a projector 130 may be an image stabilized projector 130.

System 100 may include numerous types of image stabilized projectors 130. In some embodiments, a projector 130 may include inertia and yaw rate sensors 161 that detect motion and provide for adjustment of projected content to compensate for the detected motion. In some embodiments, a projector 130 may include an optoelectronic inclination sensor and an optical position displacement sensor to provide for stabilized projection (e.g., U.S. Published Patent Application No.: 2003/0038927). In some embodiments, a projector 130 may include an optoelectronic inclination sensor, an optical position sensitive detector, and a piezoelectric accelerometer that provide for stabilized projection (e.g., U.S. Published Patent Application No.: 2003/0038928). Image stabilized projectors 130 have been described (e.g., U.S. Pat. No. 7,284,866; U.S. Published Patent Application Nos.: 20050280628; 20060103811, and 2006/0187421). In some embodiments, one or more projectors 130 may be modified to become image stabilized projectors 130. Examples of such projectors 130 have been described (e.g., U.S. Pat. Nos. 6,002,505; 6,764,185; 6,811,264; 7,036,936; 6,626,543; 7,134,078; 7,355,584; U.S. Published Patent Application No.: 2007/0109509).

Projectors 130 may be configured to project numerous wavelengths of light. In some embodiments, a projector 130 may be configured to project ultraviolet light. In some embodiments, a projector 130 may be configured to project visible light. In some embodiments, a projector 130 may be configured to project infrared light. In some embodiments, a projector 130 may be configured to project numerous combinations of light. For example, in some embodiments, a projector 130 may project one or more infrared calibration images and one or more visible images.

Motion Response Module

In some embodiments, system 100 may include one or more motion response modules 190. In some embodiments, one or more motion response modules 190 may be operably associated with one or more projectors 130. In some embodiments, one or more motion response modules 190 may be operably associated with one or more projector control units 120. In some embodiments, one or more motion response modules 190 may be operably associated with one or more sensors 150. In some embodiments, one or more motion response modules 190 may be operably associated with one or more sensor control units 170. In some embodiments, one or more motion response modules 190 may be operably associated with one or more response processors 191. In some embodiments, one or more motion response modules 190 may be operably associated with response processor memory 192. In some embodiments, one or more motion response modules 190 may be operably associated with one or more response processor instructions 193. In some embodiments, one or more motion response modules 190 may be operably associated with response memory 194. In some embodiments, one or more motion response modules 190 may be operably associated with one or more response instructions 195. In some embodiments, one or more motion response modules 190 may be operably associated with one or more response motion patterns 196. In some embodiments, a motion response module 190 may be configured to modulate output from a projector 130 in response to motion that is imparted to a device 105 that includes the projector 130. For example, in some embodiments, a motion response module 190 may include one or more motors 198 that are operably coupled to one or more actuators 197 that control one or more lenses. Accordingly, in some embodiments, one or more motion response modules 190 may focus output from a projector 130 in response to motion imparted to a device 105 that includes the image stabilized projector 130. Motion response modules 190 may be configured in numerous conformations to modulate output from an operably associated projector 130.

Projector Control Unit

System 100 may include one or more projector control units 120. In some embodiments, one or more projector control units 120 may be operably associated with one or more projectors 130. In some embodiments, one or more projector control units 120 may be operably associated with one or more motion response modules 190. In some embodiments, one or more projector control units 120 may be operably associated with one or more projectors 130 and one or more motion response modules 190. In some embodiments, a projector control unit 120 may be operably associated with one or more control processors 121. In some embodiments, a projector control unit 120 may be operably associated with control processor memory 122. In some embodiments, a projector control unit 120 may be operably associated with one or more control processor instructions 123. In some embodiments, a projector control unit 120 may be operably associated with control memory 124. In some embodiments, a projector control unit 120 may be operably associated with one or more control instructions 125. In some embodiments, a projector control unit 120 may be operably associated with one or more control calibration images 126. In some embodiments, a projector control unit 120 may be operably associated with one or more control motion patterns 127. In some embodiments, a projector control unit 120 may be configured to modulate output projected by one or more projectors 130. In some embodiments, one or more projector control units 120 may be configured to select one or more wavelengths of light that will be projected by one or more projectors 130. For example, in some embodiments, one or more projector control units 120 may select one or more wavelengths of ultraviolet light that will be projected by one or more projectors 130. In some embodiments, one or more projector control units 120 may select one or more wavelengths of visible light that will be projected by one or more projectors 130. In some embodiments, one or more projector control units 120 may select one or more wavelengths of infrared light that will be projected by one or more projectors 130. Accordingly, in some embodiments, one or more projector control units 120 may select numerous wavelengths of light that will be projected by one or more projectors 130.

In some embodiments, one or more projector control units 120 may select content that is to be projected by one or more projectors 130. In some embodiments, one or more projector control units 120 may select content that is to be projected in response to one or more features associated with one or more projection surfaces 200. For example, in some embodiments, one or more projector control units 120 may select content that is to be projected in response to motion. In some embodiments, one or more projector control units 120 may select content that is to be projected in response to motion associated with one or more projection surfaces 200. In some embodiments, one or more projector control units 120 may select content that is not to be projected by one or more projectors 130. In some embodiments, one or more projector control units 120 may select content that is not to be projected in response to one or more features associated with one or more projection surfaces 200. For example, in some embodiments, one or more projector control units 120 may select content that is not to be projected in response to motion. In some embodiments, one or more projector control units 120 may select content that is not to be projected in response to motion associated with one or more projection surfaces 200.

In some embodiments, one or more projector control units 120 may modulate output that is projected by one or more projectors 130. In some embodiments, one or more projector control units 120 may modulate the intensity of light that is projected by one or more projectors 130. In some embodiments, one or more projector control units 120 may modulate the brightness of light that is projected by one or more projectors 130. In some embodiments, one or more projector control units 120 may modulate the contrast of light that is projected by one or more projectors 130. In some embodiments, one or more projector control units 120 may modulate the sharpness of light that is projected by one or more projectors 130.

In some embodiments, one or more projector control units 120 may modulate the direction of output that is projected by one or more projectors 130. In some embodiments, one or more projector control units 120 may direct output from one or more projectors 130 onto one or more moving projection surfaces 200. In some embodiments, one or more projector control units 120 may direct output from one or more projectors 130 onto one or more stationary projection surfaces 200. In some embodiments, one or more projector control units 120 may direct output from one or more projectors 130 onto one or more moving projection surfaces 200 and onto one or more stationary projection surfaces 200. In some embodiments, one or more projector control units 120 may direct output from one or more projectors 130 onto multiple projection surfaces 200. For example, in some embodiments, one or more projector control units 120 may direct output from one or more projectors 130 onto a first projection surface 200 and direct output from one or more projectors 130 onto a second projection surface 200.

In some embodiments, one or more projector control units 120 may dynamically modulate output from one or more projectors 130. For example, in some embodiments, one or more projectors 130 may be carried from room to room such that one or more projector control units 120 modulate output from the one or more projectors 130 in response to the available projection surface 200. In some embodiments, one or more projector control units 120 may dynamically modulate output from one or more projectors 130 in an outdoor environment. For example, in some embodiments, one or more projectors 130 may be configured to project one or more images in response to changing terrain.

In some embodiments, one or more projector control units 120 may be configured to respond to one or more substantially defined motions. In some embodiments, a user 600 may program one or more projector control units 120 to correlate one or more substantially defined motions with one or more projection commands. For example, in some embodiments, a user 600 may program one or more projector control units 120 to correlate clockwise motion of device 105 with a command to advance a projected slide presentation by one slide. Accordingly, in some embodiments, a device 105 may be configured to project in response to substantially defined motions that are programmed according to the preferences of an individual user 600.

Sensor Control Unit

System 100 may include one or more sensor control units 170. In some embodiments, one or more sensor control units 170 may be operably associated with one or more devices 105. In some embodiments, one or more sensor control units 170 may be operably associated with one or more sensors 150. In some embodiments, one or more sensor control units 170 may be operably associated with one or more projectors 130. In some embodiments, one or more sensor control units 170 may be operably associated with system memory 140. In some embodiments, one or more sensor control units 170 may be operably associated with one or more sensor processors 171. In some embodiments, one or more sensor control units 170 may be operably associated with sensor processor memory 172. In some embodiments, one or more sensor control units 170 may be operably associated with one or more sensor processor instructions 173. In some embodiments, one or more sensor control units 170 may be operably associated with sensor memory 176. In some embodiments, one or more sensor control units 170 may be operably associated with one or more sensor instructions 177. In some embodiments, one or more sensor control units 170 may be operably associated with one or more sensor motion patterns 174.

In some embodiments, one or more sensor control units 170 may signal a change in sensor response to one or more associated systems. For example, in some embodiments, a change in ambient light signal from one or more ambient light sensors 164, range sensors 165, motion sensors 151, or other sensors 150 alone or in combination can be stored in memory for future use and/or be signaled to one or more image stabilized projectors 130 where the change in ambient light may trigger a change in projector 130 output intensity. In some embodiments, one or more sensor control units 120 may use prior sensor response, user input, or other stimulus, to activate or deactivate one or more sensors 150 or other subordinate features contained within one or more sensor control units 170. In some embodiments, one or more sensor control units 170 may use prior sensor response, user input, or other stimulus, to activate or deactivate one or more sensors 150 or other subordinate features contained within one or more sensor control units 170.

Sensor

System 100 may include one or more sensors 150. In some embodiments, one or more sensors 150 may be operably associated with one or more devices 105. In some embodiments, one or more sensors 150 may be operably associated with one or more sensor control units 170. In some embodiments, one or more sensors 150 may be operably associated with system memory 140. In some embodiments, one or more sensors 150 may be operably associated with one or more user interfaces 300. In some embodiments, one or more sensors 150 may be operably associated with one or more projectors 130. In some embodiments, one or more sensors 150 may be operably associated with one or more projector control units 120. In some embodiments, one or more sensors 150 may be operably associated with one or more motion response modules 190. In some embodiments, one or more sensors 150 may be operably associated with one or more housings 110.

A device 105 may include many types of sensors 150 alone or in combination. Examples of sensors 150 include, but are not limited to, cameras 163, light sensors 164, range sensors 165, contact sensors 166, entity sensors 159, infrared sensors 160, yaw rate sensors 161, ultraviolet sensors 162, inertial sensors 155, ultrasonic sensors 156, imaging sensors 157, pressure sensors 158, motion sensors 151, gyroscopic sensors 152, acoustic sensors 153, biometric sensors 154, and the like.

In some embodiments, one or more sensors 150 may be configured to detect motion. In some embodiments, one or more sensors 150 may be configured to detect motion that is imparted to one or more projection surfaces 200. In some embodiments, one or more sensors 150 may be configured to detect motion that is imparted to one or more devices 105 that include the one or more sensors 150. Accordingly, in some embodiments, one or more sensors 150 that are configured to detect motion may be operably associated with one or more projectors 130 to facilitate modulation of projection output in response to motion. In some embodiments, one or more sensors 150 may be associated with one or more projectors 130 through one or more projector control units 120. In some embodiments, one or more sensors 150 may be associated with one or more projectors 130 through one or more motion response modules 190. In some embodiments, one or more sensors 150 may be associated with one or more projectors 130 through or independent of one or more sensor control units 170.

Interface Module

System 100 may include one or more interface modules 180. In some embodiments, one or more interface modules 180 may be operably associated with one or more devices 105. In some embodiments, one or more interface modules 180 may be operably associated with one or more projectors 130. In some embodiments, one or more interface modules 180 may be operably associated with one or more projector control units 120. In some embodiments, one or more interface modules 180 may be operably associated with one or more motion response modules 190. In some embodiments, one or more interface modules 180 may be operably associated with one or more sensors 150. In some embodiments, one or more interface modules 180 may be operably associated with one or more sensor control units 170. In some embodiments, one or more interface modules 180 may be operably associated with one or more external devices 400. In some embodiments, one or more interface modules 180 may be operably associated with external memory 500. In some embodiments, one or more interface modules 180 may be operably associated with one or more user interfaces 300.

An interface module 180 may communicate with other components of system 100 through use of numerous communication formats and combinations of communications formats. Examples of such formats include, but are not limited to, VGA 181, USB 185, wireless USB 189, RS-232 182, infrared 186, Bluetooth 18A, 802.11b/g/n 183, S-video 187, Ethernet 184, DVI-D 188, and the like. In some embodiments, an interface module 180 may include one or more transmitters 18B. In some embodiments, an interface module 180 may include one or more receivers 18C.

External Device

System 100 may be able to interact with one or more external devices 400. Examples of such external devices 400 include, but are not limited to, projectors 130, recording devices, projection surfaces 200, image acquiring surfaces, image printing surfaces (e.g., a projection surface 200 that facilitates the printing or other recordation of content projected on the surface), networks, the internet, wireless devices (e.g., personal digital assistant, cellular telephones, telephones, television transmissions, etc.), receivers, transmitters, and the like.

External Memory

System 100 may be operably associated with external memory 500. Examples of such external memory 500 include, but are not limited to, USB flash drives, memory cards, external hard drives, networked storage, and the like. In some embodiments, display content may be retrieved from external memory 500. In some embodiments, sensor data, operational parameters, usage information, or other device or subsystem information can be stored on external memory 500.

Projection Surface

System 100 may include one or more projection surfaces 200. In some embodiments, nearly any surface may be utilized as a projection surface 200. In some embodiments, a projection surface 200 may be portable. In some embodiments, a projection surface 200 may be carried by an individual person. For example, in some embodiments, a projection surface 200 may be configured as a sheet of material, a tablet, two or more sheets of material that may be separated from each other, and the like. Accordingly, in some embodiments, a projection surface 200 may be configured as a sheet of material that a user 600 may unfold and place on a surface, such as a desk, wall, floor, ceiling, etc.

In some embodiments, a projection surface 200 may include one or more surface sensors 202 that are associated with the projection surface 200. In some embodiments, a projection surface 200 may include one or more magnetic surface sensors 202. For example, in some embodiments, a projection surface 200 may include magnetic surface sensors 202 that are configured to detect magnetic ink that is applied to the projection surface 200. In some embodiments, a projection surface 200 may include one or more pressure surface sensors 202. For example, in some embodiments, a projection surface 200 may include pressure surface sensors 202 that are configured to detect pressure that is applied to the projection surface 200 (e.g., contact of a stylus with the projection surface, contact of a pen with the projection surface, contact of a pencil with the projection surface, etc.). In some embodiments, a projection surface 200 may include one or more motion surface sensors 202. For example, in some embodiments, a projection surface 200 may include motion surface sensors 202 that are configured to detect movement associated with the projection surface 200. In some embodiments, a projection surface 200 may include one or more strain surface sensors 202. For example, in some embodiments, a projection surface 200 may include strain surface sensors 202 that are configured to detect changes in conformation associated with the projection surface 200. In some embodiments, a projection surface 200 may include one or more positional surface sensors 202 (e.g., global positioning surface sensors 202). For example, in some embodiments, a projection surface 200 may include positional surface sensors 202 that are configured to detect changes in position associated with the projection surface 200.

A projection surface 200 may be constructed from numerous types of materials and combinations of materials. Examples of such materials include, but are not limited to, cloth, plastic, metal, ceramics, paper, wood, leather, glass, and the like. In some embodiments, one or more projection surfaces 200 may exhibit electrochromic properties. In some embodiments, one or more projection surfaces 200 may be coated. For example, in some embodiments, a projection surface 200 may be coated with paint. In some embodiments, a projection surface 200 may include one or more materials that alter light. For example, in some embodiments, a projection surface 200 may convert light (e.g., up-convert light, down-convert light).

In some embodiments, a projection surface 200 may be associated with one or more fiducials. For example, in some embodiments, one or more fluorescent marks may be placed on a projection surface 200. In some embodiments, one or more phosphorescent marks may be placed on a projection surface 200. In some embodiments, one or more magnetic materials may be placed on a projection surface 200. In some embodiments, fiducials may be placed on a projection surface 200 in numerous configurations. For example, in some embodiments, fiducials may be positioned in association with a projection surface 200 such that they form a pattern. In some embodiments, a projection surface 200 may include one or more calibration images.

In some embodiments, a projection surface 200 may include one or more surface transmitters 204. Accordingly, in some embodiments, a projection surface 200 may be configured to transmit one or more signals. Such signals may include numerous types of information. Example of such information may include, but are not limited to, information associated with: one or more positions of one or more projection surfaces 200, one or more conformations of one or more projection surfaces 200, one or more changes in the position of one or more projection surfaces 200, one or more changes in the conformation of one or more projection surfaces 200, one or more motions associated with one or more projection surfaces 200, one or more changes in the motion of one or more projection surfaces 200, and the like.

In some embodiments, a projection surface 200 may include one or more surface receivers 206. Accordingly, in some embodiments, a projection surface 200 may be configured to receive one or more signals. For example, in some embodiments, one or more surface receivers 206 may receive one or more signals that are transmitted by one or more control unit transmitters 129.

In some embodiments, a projection surface 200 may include one or more surface processors 208. Accordingly, in some embodiments, a surface processor 208 may be configured to process information received from one or more surface sensors 202.

In some embodiments, a projection surface 200 may include surface memory 210. In some embodiments, a surface memory 210 may include one or more lookup tables that include correlation information associated with the position of one or more fiducials associated with a projection surface 200 and one or more conformations of the projection surface 200. In some embodiments, surface memory 210 may include surface instructions 212. In some embodiments, surface instructions 212 may include instructions for a projection surface 200 to transmit one or more signals that indicate that a projection surface 200 has undergone a change in conformation. In some embodiments, surface instructions 212 may include instructions for a projection surface 200 to transmit one or more signals that indicate that a projection surface 200 has undergone a change in position. In some embodiments, surface instructions 212 may include instructions for a projection surface 200 to transmit one or more signals that indicate that a projection surface 200 has undergone a change in motion.

User Interface

System 100 may include one or more user interfaces 300. In some embodiments, one or more user interfaces 300 may be configured as gestural user interfaces 300. In some embodiments, content may be projected in response to substantially specific motion that is imparted to a projection surface 200. For example, in some embodiments, a user 600 may rotate a projection surface 200 in a clockwise direction to advance the projection of a slide presentation by one frame. In some embodiments, a user 600 may advance the projection of a slide presentation by moving one more projection surfaces 200. In some embodiments, system 100 may respond to user 600 input acquired through sensor information other than motion. For example, in some embodiments, acoustic sensors 153 may be employed for response to voice commands or other auditory signals. In some embodiments, cameras 163 or other imaging detectors may use user 600 location, user 600 gestures, laser pointer location, and/or other information as an input signal. In some embodiments, system 100 may include one or more user interfaces 300 that are configured as control features. Examples of such control features include, but are not limited to, buttons, switches, track balls, and the like.

User

System 100 may be operated by one or more users 600. In some embodiments, a user 600 may be human. In some embodiments, a user 600 may be a non-human user 600. For example, in some embodiments, a user 600 may be a computer, a robot, and the like. In some embodiments, a user 600 may be proximate to system 100. In some embodiments, a user 600 may be remote from system 100.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
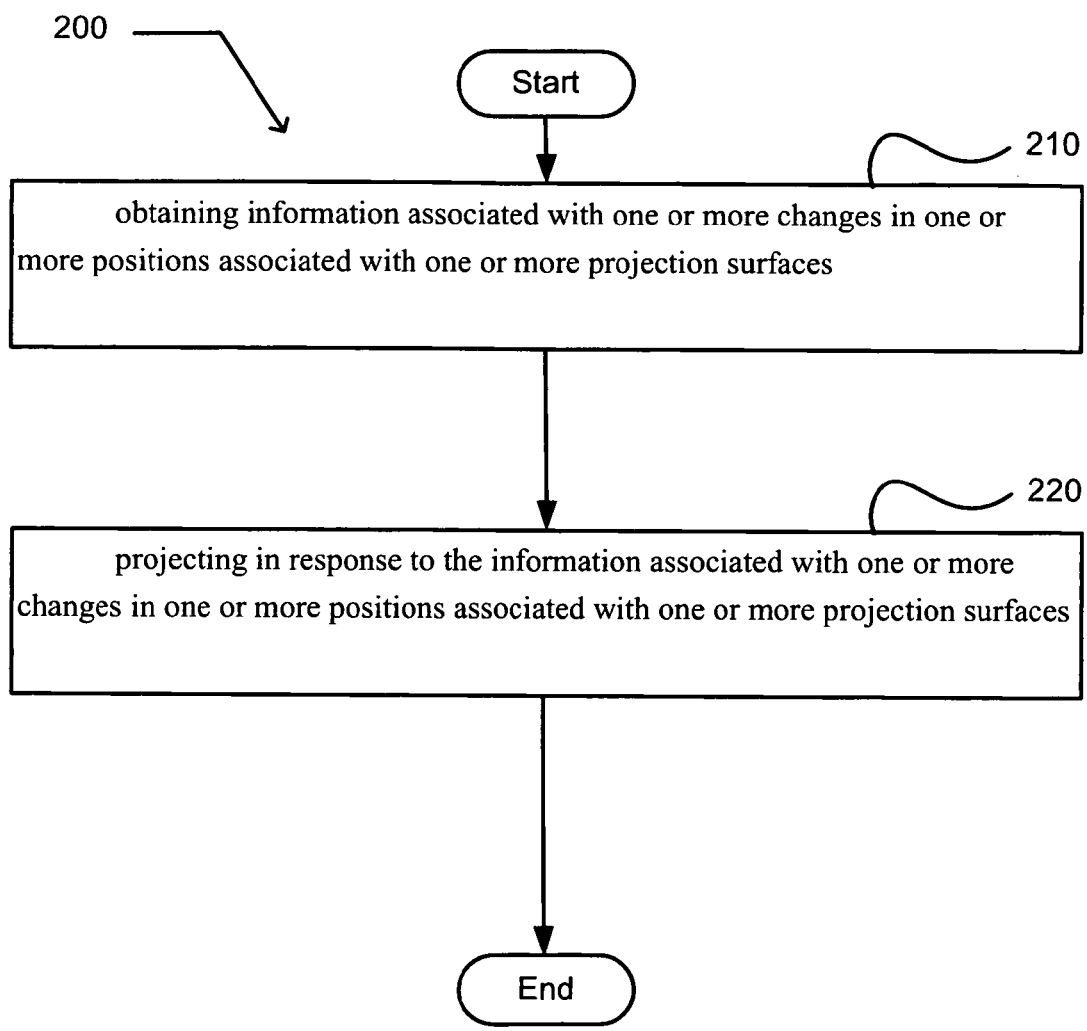
FIG. 2 illustrates an operational flow 200 representing example operations related to obtaining information associated with one or more changes in one or more positions associated with one or more projection surfaces and projecting in response to the information associated with one or more changes in one or more positions associated with one or more projection surfaces.

FIG. 2 illustrates an operational flow 200 representing examples of operations that are related to the performance of a method for obtaining information associated with one or more changes in one or more positions associated with one or more projection surfaces and projecting in response to the information associated with one or more changes in one or more positions associated with one or more projection surfaces.

In FIG. 2 and in following figures that include various examples of operations used during performance of the method, discussion and explanation may be provided with respect to any one or combination of the above-described examples of FIG. 1, and/or with respect to other examples and contexts. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 200 includes an obtaining operation 210 involving obtaining information associated with one or more changes in one or more positions associated with one or more projection surfaces. In some embodiments, one or more projector control units 120 may obtain information associated with one or more changes in one or more positions of one or more projection surfaces 200. In some embodiments, one or more projector control units 120 may obtain information associated with one or more changes in one or more positions of one or more projection surfaces 200 directly. For example, in some embodiments, one or more projector control units 120 may obtain information from one or more sensors 150. In some embodiments, one or more projector control units 120 may obtain information associated with one or more changes in one or more positions of one or more projection surfaces 200 indirectly. For example, in some embodiments, one or more projector control units 120 may obtain information from one or more external devices 400. One or more projector control units 120 may obtain numerous types of information associated with one or more changes in one or more positions of one or more projection surfaces 200. In some embodiments, one or more projector control units 120 may obtain information associated with one or more changes in one or more fiducials associated with one or more projection surfaces 200. In some embodiments, one or more projector control units 120 may obtain information associated with one or more changes in one or more marks associated with one or more projection surfaces 200. In some embodiments, one or more projector control units 120 may obtain information associated with one or more changes in one or more calibration images associated with one or more projection surfaces 200.

After a start operation, the operational flow 200 includes a projecting operation 220 involving projecting in response to the information associated with one or more changes in one or more positions associated with one or more projection surfaces. In some embodiments, one or more projectors 130 may project in response to the information associated with one or more changes in one or more positions of one or more projection surfaces 200. In some embodiments, one or more projectors 130 may project content that is selected in response to one or more changes in one or more positions of one or more projection surfaces 200. In some embodiments, one or more projectors 130 may adjust projection output in response to one or more features associated with one or more projection surfaces 200. For example, in some embodiments, one or more projectors 130 may adjust the intensity of light that is projected onto one or more projection surfaces 200. In some embodiments, one or more projectors 130 may adjust the wavelengths of light that are projected onto one or more projection surfaces 200. In some embodiments, one or more projectors 130 may project content onto two or more separate projection surfaces 200 in response to features associated with of at least one of the two or more projection surfaces 200.

Figure 3:
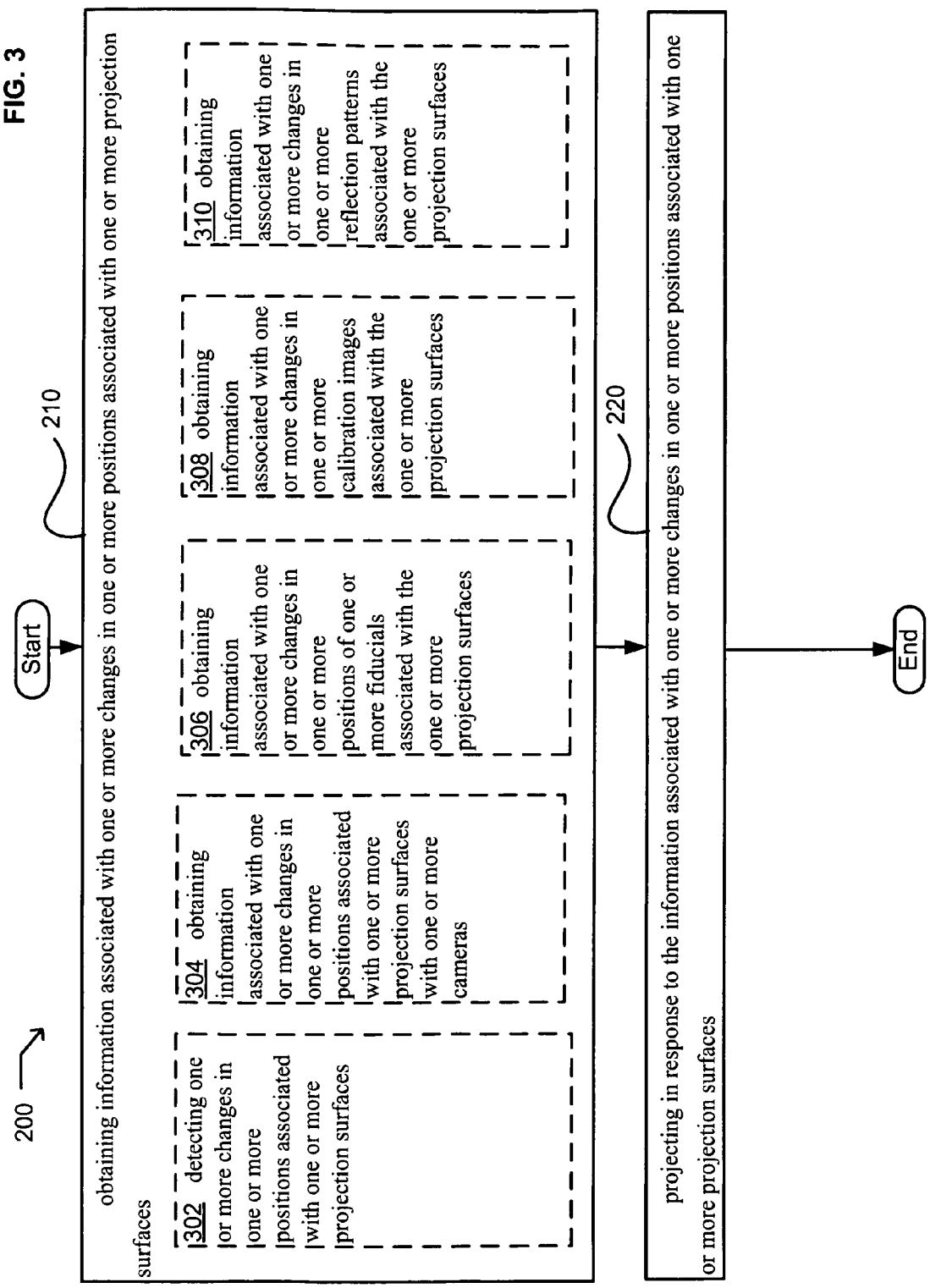
FIG. 3 illustrates alternative embodiments of the example operation flow of FIG. 2.

FIG. 3 illustrates alternative embodiments of the example operational flow 200 of FIG. 2. FIG. 3 illustrates example embodiments where the obtaining operation 210 may include at least one additional operation. Additional operations may include an operation 302, operation 304, operation 306, operation 308, and/or operation 310.

At operation 302, the obtaining operation 210 may include detecting one or more changes in one or more positions associated with one or more projection surfaces. In some embodiments, one or more projector control units 120 may be operably associated with one or more sensors 150 that detect one or more changes in one or more positions of one or more projection surfaces 200. Numerous types of sensors 150 may be used to detect one or more changes in one or more positions of one or more projection surfaces 200. For example, in some embodiments, one or more light sensors 164 may be configured to detect changes in light intensity associated with one or more projection surfaces 200 as the position of the one or more projection surfaces 200 changes. In some embodiments, one or more light sensors 164 may be configured to detect changes in reflectivity associated with one or more projection surfaces 200 as the position of the one or more projection surfaces 200 changes. In some embodiments, one or more light sensors 164 may be configured to detect changes in light absorbance associated with one or more projection surfaces 200 as the position of the one or more projection surfaces 200 changes. In some embodiments, one or more light sensors 164 may be configured to detect changes in light transmission associated with one or more projection surfaces 200 as the position of the one or more projection surfaces 200 changes. In some embodiments, one or more motion sensors 151 may be configured to detect motion associated with one or more projection surfaces 200. For example, in some embodiments, one or more motion sensors 151 may detect movement of one or more projection surfaces 200 from one area to another. In some embodiments, one or more cameras 163 may be configured to detect the position of one or more projection surfaces 200. In some embodiments, one or more cameras 163 may be configured to detect the position of one or more fiducials associated with one or more projection surfaces 200. Accordingly, in some embodiments, one or more cameras 163 may be configured to detect one or more changes in position of one or more projection surfaces 200 through determining one or more changes in the position of one or more fiducials associated with the one or more projection surfaces 200. In some embodiments, one or more cameras 163 may be configured to detect one or more changes in position of one or more projection surfaces 200 through determining one or more changes in the position of one or more calibration images associated with the one or more projection surfaces 200. In some embodiments, one or more calibration images may be associated with one or more projection surfaces 200. For example, in some embodiments, one or more calibration images may be stamped onto one or more projection surfaces 200. In some embodiments, one or more calibration images may be printed onto one or more projection surfaces 200. In some embodiments, one or more calibration images may be projected onto one or more projection surfaces 200. Accordingly, sensors 150 may be configured in numerous ways to facilitate detection of one or more changes in one or more positions of one or more projection surfaces 200.

At operation 304, the obtaining operation 210 may include obtaining information associated with one or more changes in one or more positions associated with one or more projection surfaces with one or more cameras. In some embodiments, one or more projector control units 120 may be configured to obtain information associated with one or more changes in one or more positions of one or more projection surfaces 200 with one or more cameras 163. In some embodiments, one or more cameras 163 may be configured to detect one or more changes in one or more positions of one or more projection surfaces 200. For example, in some embodiments, one or more cameras 163 may be configured to detect the position of one or more fiducials associated with one or more projection surfaces 200. Accordingly, in some embodiments, one or more cameras 163 may be configured to detect one or more changes in position of one or more projection surfaces 200 through determining one or more changes in the position of one or more fiducials associated with the one or more projection surfaces 200. In some embodiments, one or more cameras 163 may be configured to detect one or more changes in position of one or more projection surfaces 200 through determining one or more changes in the position of one or more calibration images associated with the one or more projection surfaces 200. In some embodiments, one or more calibration images may be associated with one or more projection surfaces 200. For example, in some embodiments, one or more calibration images may be stamped onto one or more projection surfaces 200. In some embodiments, one or more calibration images may be printed onto one or more projection surfaces 200. In some embodiments, one or more calibration images may be projected onto one or more projection surfaces 200. In some embodiments, one or more cameras 163 may be configured to facilitate projection onto irregular surfaces (e.g., U.S. Pat. No. 6,811,264).

At operation 306, the obtaining operation 210 may include obtaining information associated with one or more changes in one or more positions of one or more fiducials associated with the one or more projection surfaces. In some embodiments, one or more projector control units 120 may be configured to obtain information associated with one or more changes in one or more positions of one or more fiducials associated with the one or more projection surfaces 200. In some embodiments, one or more projector control units 120 may receive one or more signals that include information associated with one or more fiducials that are associated with one or more projection surfaces 200. In some embodiments, such signals may be transmitted by one or more surface transmitters 204 that are associated with one or more projection surfaces 200. Numerous types of fiducials may be used alone or in combination while associated with one or more projection surfaces 200. Examples of such fiducials include, but are not limited to, magnetic materials, fluorescent materials, quantum dots, radio-frequency tags, and the like. In some embodiments, one or more projector control units 120 may obtain information associated with one or more changes in one or more positions of one or more fiducials from one or more sensors 150. For example, in some embodiments, one or more cameras 163 may be configured to detect one or more changes in the position of one or more fiducials that are associated with one or more projection surfaces 200.

At operation 308, the obtaining operation 210 may include obtaining information associated with one or more changes in one or more calibration images associated with the one or more projection surfaces. In some embodiments, one or more projector control units 120 may be configured to obtain information associated with one or more changes in one or more calibration images associated with the one or more projection surfaces 200. In some embodiments, one or more projector control units 120 may be configured to obtain information associated with one or more changes in one or more positions of one or more calibration images that are associated with the one or more projection surfaces 200. For example, in some embodiments, one or more sensors 150 may detect one or more calibration images that are associated with one or more projection surfaces 200. The position of the one or more calibration images may be compared to the position of one or more reference points. Accordingly, changes in the position of one or more calibration images may be determined by comparing one or more first positions of the calibration images to one or more reference points and then comparing one or more second positions of the calibration images to the one or more reference points.

At operation 310, the obtaining operation 210 may include obtaining information associated with one or more changes in one or more reflection patterns associated with the one or more projection surfaces. In some embodiments, one or more projector control units 120 may be configured to obtain information associated with one or more changes in one or more reflection patterns associated with the one or more projection surfaces 200. In some embodiments, one or more projector control units 120 may be configured to determine one or more changes in the position of one or more projection surfaces 200 that are associated with one or more changes in one or more reflection patterns associated with the one or more projection surfaces 200. For example, in some embodiments, one or more projection surfaces 200 may be associated with one or more reflective fiducials that will produce an altered reflection pattern if the positions of one or more projection surfaces 200 that are associated with the reflective fiducials are changed.

Figure 4:
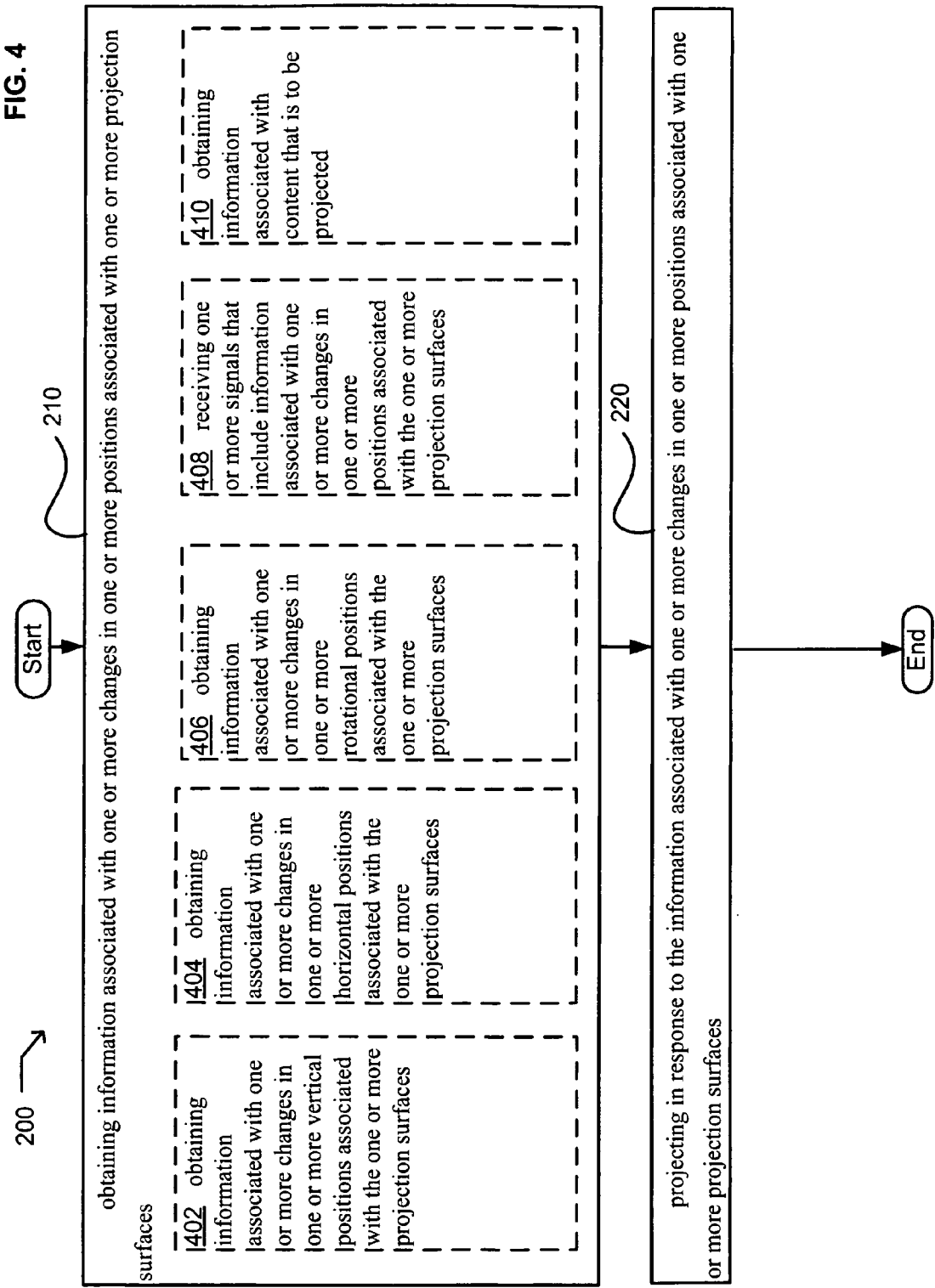
FIG. 4 illustrates alternative embodiments of the example operation flow of FIG. 2.

FIG. 4 illustrates alternative embodiments of the example operational flow 200 of FIG. 2. FIG. 4 illustrates example embodiments where the obtaining operation 210 may include at least one additional operation. Additional operations may include an operation 402, operation 404, operation 406, operation 408, and/or operation 410.

At operation 402, the obtaining operation 210 may include obtaining information associated with one or more changes in one or more vertical positions associated with the one or more projection surfaces. In some embodiments, one or more projector control units 120 may be configured to obtain information associated with one or more changes in one or more vertical positions associated with the one or more projection surfaces 200. For example, in some embodiments, one or more projector control units 120 may be configured to obtain information associated with one or more changes in the vertical position of one or more projection surfaces 200 that are mounted on one or more walls. In some embodiments, one or more projector control units 120 may be configured to obtain information associated with one or more changes in the position of one or more projection surfaces 200 that are mounted on one or more ceilings.

At operation 404, the obtaining operation 210 may include obtaining information associated with one or more changes in one or more horizontal positions associated with the one or more projection surfaces. In some embodiments, one or more projector control units 120 may be configured to obtain information associated with one or more changes in one or more horizontal positions associated with the one or more projection surfaces 200. For example, in some embodiments, one or more projector control units 120 may be configured to obtain information associated with one or more changes in the horizontal position of one or more projection surfaces 200 that are mounted on one or more countertops. In some embodiments, one or more projector control units 120 may be configured to obtain information associated with one or more changes in the position of one or more projection surfaces 200 that are mounted on one or more floors. In some embodiments, one or more projector control units 120 may be configured to obtain information associated with one or more changes in the position of one or more projection surfaces 200 that are slid across one or more countertops.

At operation 406, the obtaining operation 210 may include obtaining information associated with one or more changes in one or more rotational positions associated with the one or more projection surfaces. In some embodiments, one or more projector control units 120 may be configured to obtain information associated with one or more changes in one or more rotational positions associated with the one or more projection surfaces 200. In some embodiments, one or more projector control units 120 may be configured to obtain information associated with one or more changes in the rotational position of one or more projection surfaces 200 that are placed on one or more countertops. For example, in some embodiments, one or more projector control units 120 may be configured to detect if a projection surface 200 is rotated away from facing a first person so that it faces a second person. In some embodiments, one or more fiducials that are associated with a projection surface 200 may be used to determine if the projection surface 200 has undergone a change in rotational position. In some embodiments, one or more calibration images that are associated with a projection surface 200 may be used to determine if the projection surface 200 has undergone a change in rotational position. Accordingly, the changes in the rotational position of one or more projection surfaces 200 may be determined through use of numerous methods.

At operation 408, the obtaining operation 210 may include receiving one or more signals that include information associated with one or more changes in one or more positions associated with the one or more projection surfaces. In some embodiments, one or more projector control units 120 may be configured to receive one or more signals that include information associated with one or more changes in one or more positions associated with the one or more projection surfaces 200. In some embodiments, one or more projector control units 120 may receive one or more signals that include information associated with one or more changes in one or more positions associated with one or more projection surfaces 200 that are transmitted by one or more surface transmitters 204. In some embodiments, one or more projector control units 120 may receive one or more signals that include information associated with one or more changes in one or more positions associated with one or more projection surfaces 200 that are transmitted by one or more external devices 400. For example, in some embodiments, one or more external devices 400 may be configured to detect one or more changes in the position of one or more projection surfaces 200 and transmit one or more signals that include information associated with the one or more changes in position.

At operation 410, the obtaining operation 210 may include obtaining information associated with content that is to be projected. In some embodiments, one or more projector control units 120 may be configured to obtain information associated with content that is to be projected. For example, in some embodiments, one or more projector control units 120 may access memory to obtain content that is to be projected. In some embodiments, one or more projector control units 120 may receive one or more signals that include information associated with content that is to be projected.

Figure 5:
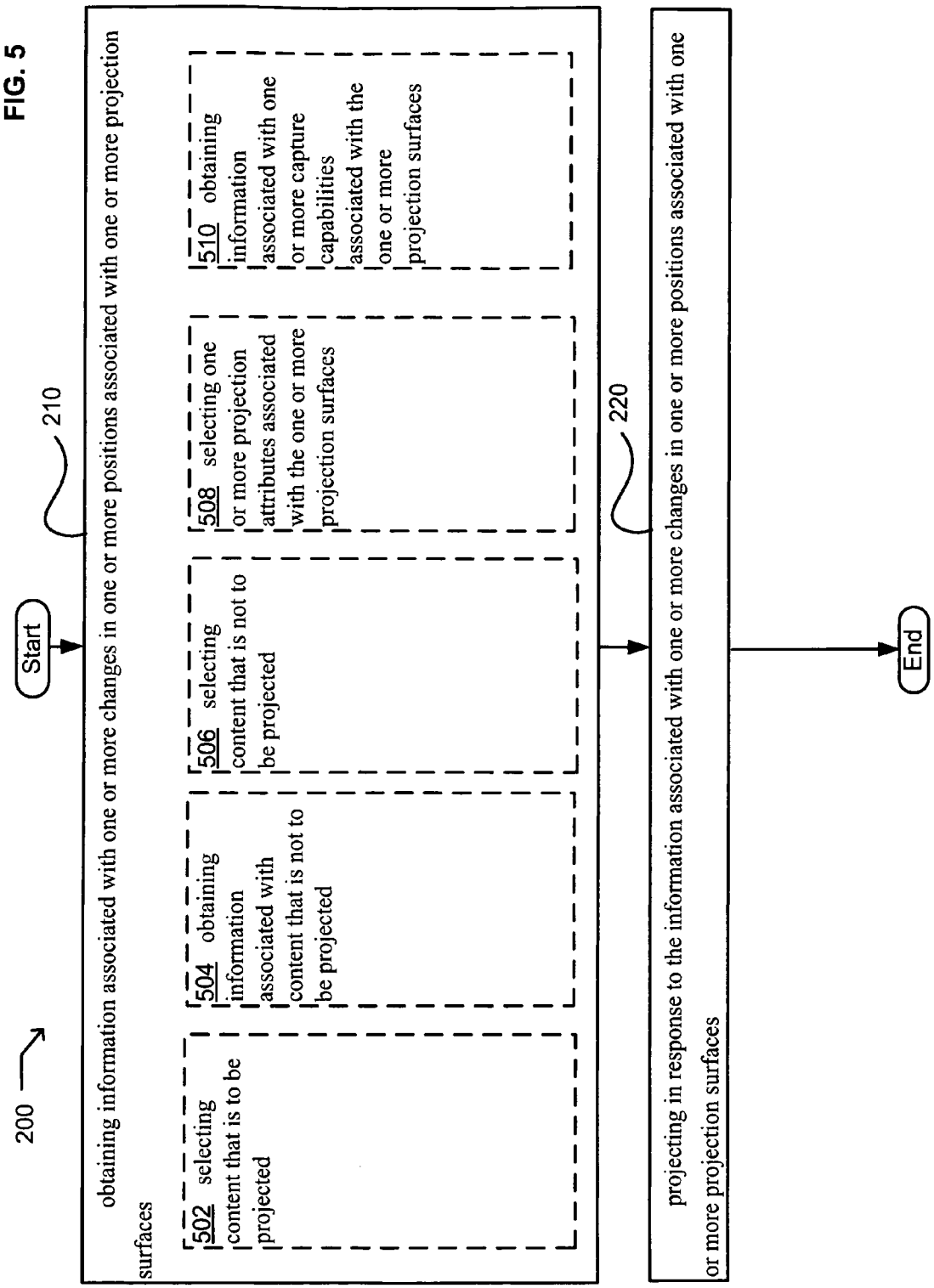
FIG. 5 illustrates alternative embodiments of the example operation flow of FIG. 2.

FIG. 5 illustrates alternative embodiments of the example operational flow 200 of FIG. 2. FIG. 5 illustrates example embodiments where the obtaining operation 210 may include at least one additional operation. Additional operations may include an operation 502, operation 504, operation 506, operation 508, and/or operation 510.

At operation 502, the obtaining operation 210 may include selecting content that is to be projected. In some embodiments, one or more projector control units 120 may be configured to select content that is to be projected. For example, in some embodiments, one or more projector control units 120 may be configured to select content that is to be projected from memory. In some embodiments, one or more projector control units 120 may be configured to select content that is to be projected in response to user 600 input. In some embodiments, one or more projector control units 120 may be configured to select content that is to be projected in response to one or more sensors 150. In some embodiments, one or more projector control units 120 may select content that is to be projected in response to one or more sensors 150 that detect one or more persons. For example, in some embodiments, one or more projector control units 120 may select content that is suitable for children if a child is detected. In some embodiments, one or more projector control units 120 may receive one or more signals that include information associated with content that is to be selected for projection.

At operation 504, the obtaining operation 210 may include obtaining information associated with content that is not to be projected. In some embodiments, one or more projector control units 120 may be configured to obtain information associated with content that is not to be projected. For example, in some embodiments, one or more projector control units 120 may access memory to obtain information associated with content that is not to be projected. In some embodiments, one or more projector control units 120 may receive one or more signals that include information associated with content that is not to be projected. For example, in some embodiments, one or more projector control units 120 may be configured to obtain information associated with confidential information that is not to be projected.

At operation 506, the obtaining operation 210 may include selecting content that is not to be projected. In some embodiments, one or more projector control units 120 may be configured to select content that is not to be projected. For example, in some embodiments, one or more projector control units 120 may be configured to access memory to select content that is not to be projected. In some embodiments, one or more projector control units 120 may be configured to select content that is not to be projected in response to user input. In some embodiments, one or more projector control units 120 may be configured to select content that is not to be projected in response to one or more sensors 150. In some embodiments, one or more projector control units 120 may select content that is not to be projected in response to one or more sensors 150 that detect one or more persons. For example, in some embodiments, one or more projector control units 120 may select content that is not suitable for children if a child is detected. In some embodiments, one or more projector control units 120 may receive one or more signals that include information associated with content that is not to be selected for projection.

At operation 508, the obtaining operation 210 may include selecting one or more projection attributes associated with the one or more projection surfaces. In some embodiments, one or more projector control units 120 may be configured to select one or more projection attributes associated with one or more projection surfaces 200. In some embodiments, one or more projector control units 120 may be configured to access memory to determine one or more projection attributes associated with one or more projection surfaces 200. In some embodiments, one or more projector control units 120 may be operably associated with one or more sensors 150 that are configured to determine one or more projection attributes associated with one or more projection surfaces 200. In some embodiments, one or more projector control units 120 may be configured to receive one or more signals that include information associated with one or more projection attributes associated with one or more projection surfaces 200. Examples of such projection attributes associated with one or more projection surfaces 200 include, but are not limited to, reflectivity, light absorbance, light reflection, light transmission, light emission, ability to record projected content, ability to transmit information associated with projected content, and the like. Accordingly, in some embodiments, one or more projector control units 120 may instruct one or more projectors 130 to project in response to one or more attributes associated with one or more projection surfaces 200. For example, in some embodiments, one or more projector control units 120 may instruct one or more projectors 130 to project content that is to be printed if a projection surface 200 is able to facilitate printing of content that is projected onto the projection surface 200. In some embodiments, one or more projector control units 120 may instruct one or more projectors 130 not to project content that is confidential if a projection surface 200 is able to facilitate printing of content that is projected onto the projection surface 200. In some embodiments, one or more projector control units 120 may instruct one or more projectors 130 to project one or more wavelengths of light in response to one or more attributes associated with a projection surface 200. For example, in some embodiments, a projection surface 200 may be made of material that transmits one or more wavelengths of light preferentially over other wavelengths of light. Accordingly, in some embodiments, a projector control unit 120 may instruct a projector 130 to emit the one or more wavelengths of light that are preferentially transmitted by a projection surface 200. Accordingly, in some embodiments, one or more projector control units 120 may control one or more projectors 130 in accordance with projection attributes associated with one or more projection surfaces 200.

At operation 510, the obtaining operation 210 may include obtaining information associated with one or more capture capabilities associated with the one or more projection surfaces. In some embodiments, one or more projector control units 120 may be configured to obtain information associated with one or more capture capabilities associated with one or more projection surfaces 200. In some embodiments, one or more projector control units 120 may be configured to access memory to determine one or more capture capabilities associated with one or more projection surfaces 200. In some embodiments, one or more projector control units 120 may be operably associated with one or more sensors 150 that are configured to determine one or more capture capabilities associated with one or more projection surfaces 200. In some embodiments, one or more projector control units 120 may be configured to receive one or more signals that include information associated with one or more capture capabilities associated with one or more projection surfaces 200. Examples of capture capabilities include, but are not limited to, printing of projected content, transmission of one or more signals that include information associated with projected content, and the like. In some embodiments, one or more projector control units 120 may control one or more projectors 130 in response to one or more capture capabilities associated with one or more projection surfaces 200. For example, in some embodiments, a projector control unit 120 may instruct one or more projectors 130 to project content that is to be printed onto one or more projection surfaces 200 that are capable of facilitating printing of the projected content. In some embodiments, a projector control unit 120 may instruct one or more projectors 130 not to project content that is confidential onto one or more projection surfaces 200 that are capable of facilitating printing of the projected content.

Figure 6:
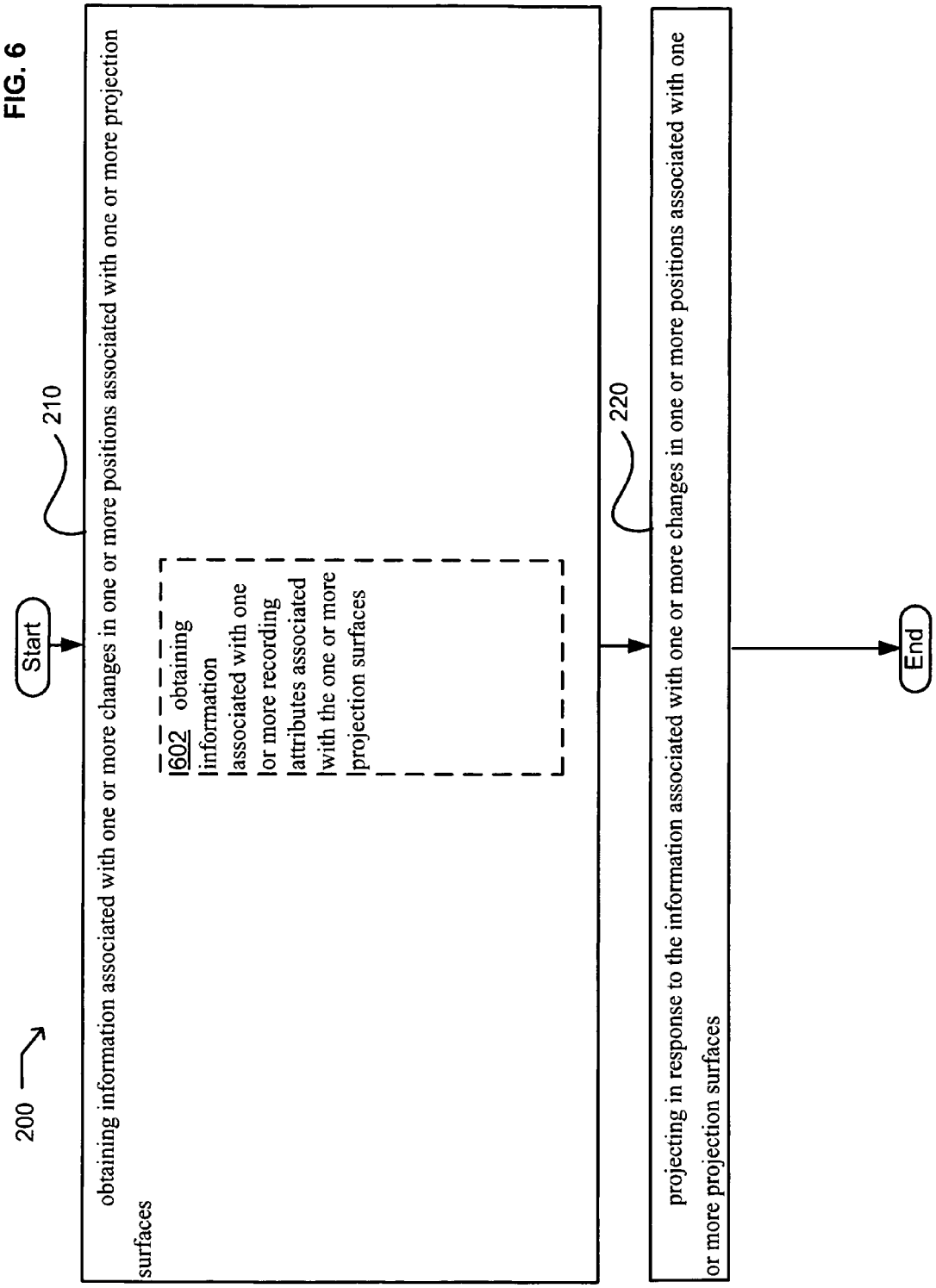
FIG. 6 illustrates alternative embodiments of the example operation flow of FIG. 2.

FIG. 6 illustrates alternative embodiments of the example operational flow 200 of FIG. 2. FIG. 6 illustrates example embodiments where the obtaining operation 210 may include at least one additional operation. Additional operations may include an operation 602.

At operation 602, the obtaining operation 210 may include obtaining information associated with one or more recording attributes associated with the one or more projection surfaces. In some embodiments, one or more projector control units 120 may be configured to obtain information associated with one or more recording attributes associated with one or more projection surfaces 200. In some embodiments, one or more projector control units 120 may be configured to access memory to determine one or more recording attributes associated with one or more projection surfaces 200. In some embodiments, one or more projector control units 120 may be operably associated with one or more sensors 150 that are configured to determine one or more recording attributes associated with one or more projection surfaces 200. In some embodiments, one or more projector control units 120 may be configured to receive one or more signals that include information associated with one or more recording attributes associated with one or more projection surfaces 200. Examples of recording attributes include, but are not limited to, permanent recordation of projected content, storage of projected content into memory, and the like. In some embodiments, one or more projector control units 120 may control one or more projectors 130 in response to one or more recording attributes associated with one or more projection surfaces 200. For example, in some embodiments, a projector control unit 120 may instruct one or more projectors 130 to project content that is to be saved into memory onto one or more projection surfaces 200 that are capable of recording projected content into memory. In some embodiments, a projector control unit 120 may instruct one or more projectors 130 not to project content that is confidential onto one or more projection surfaces 200 that are capable of saving the projected content into memory.

Figure 7:
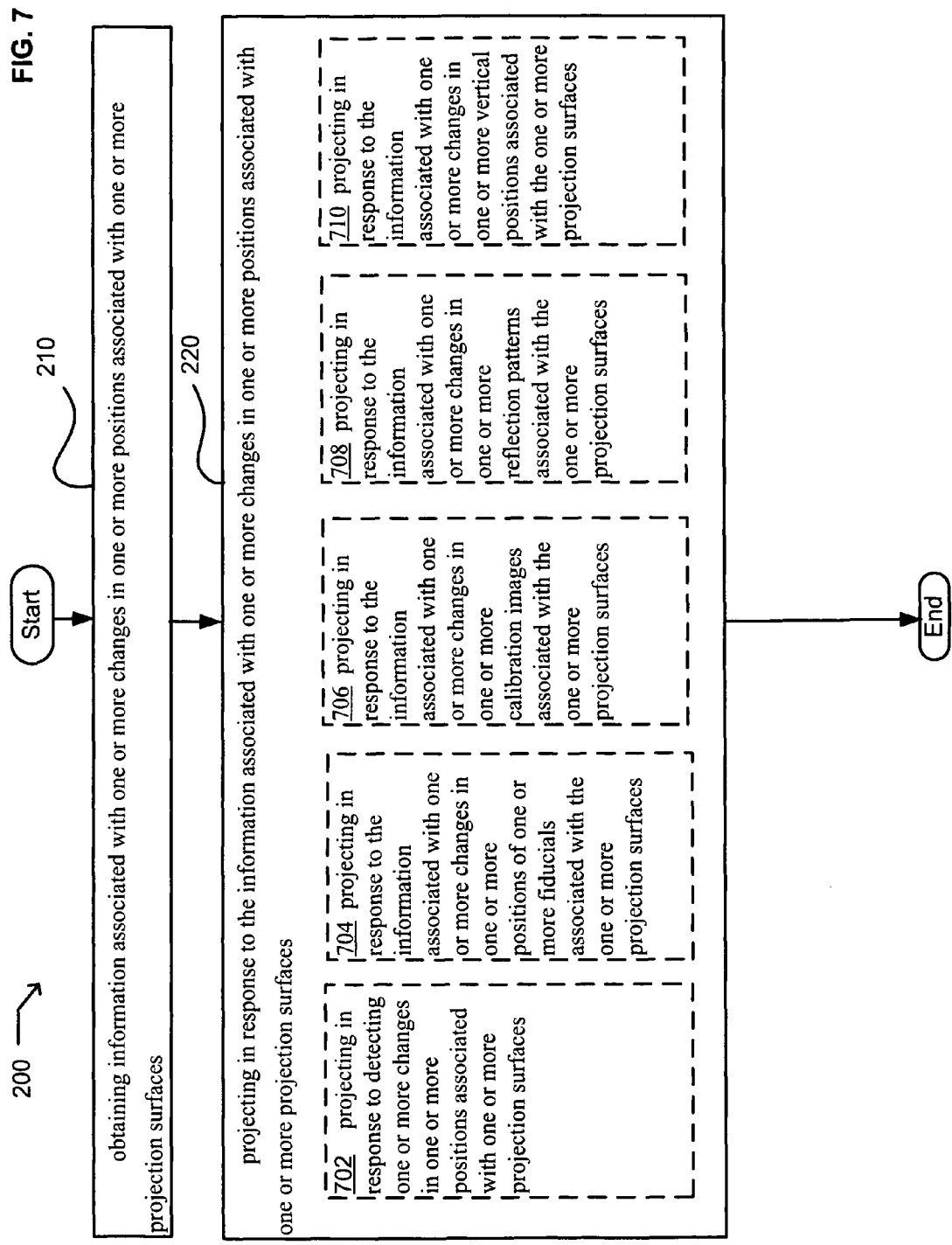
FIG. 7 illustrates alternative embodiments of the example operation flow of FIG. 2.

FIG. 7 illustrates alternative embodiments of the example operational flow 200 of FIG. 2. FIG. 7 illustrates example embodiments where the projecting operation 220 may include at least one additional operation. Additional operations may include an operation 702, operation 704, operation 706, operation 708, and/or operation 710.

At operation 702, the projecting operation 220 may include projecting in response to detecting one or more changes in one or more positions associated with one or more projection surfaces. In some embodiments, one or more projector control units 120 may instruct one or more projectors 130 to project in response to detecting one or more changes in one or more positions associated with one or more projection surfaces 200. In some embodiments, one or more projector control units 120 may instruct one or more projectors 130 to project in response to detecting one or more changes in the position of one or more marks associated with the one or more projection surfaces 200. In some embodiments, one or more projector control units 120 may instruct one or more projectors 130 to project in response to detecting one or more changes in the position of one or more fiducials associated with the one or more projection surfaces 200. In some embodiments, one or more projector control units 120 may instruct one or more projectors 130 to project in response to detecting one or more changes in the position of one or more calibration images associated with the one or more projection surfaces 200.

At operation 704, the projecting operation 220 may include projecting in response to the information associated with one or more changes in one or more positions of one or more fiducials associated with the one or more projection surfaces. In some embodiments, one or more projector control units 120 may instruct one or more projectors 130 to project in response to the information associated with one or more changes in one or more positions of one or more fiducials associated with the one or more projection surfaces 200. In some embodiments, one or more projector control units 120 may instruct one or more projectors 130 to project selected content in response to information associated with one or more changes in one or more positions of one or more fiducials. For example, in some embodiments, one or more projectors 130 may be instructed to project a first set of content when one or more fiducials are in a first position and be instructed to project a second set of content when the one or more fiducials are in a second position. In some embodiments, one or more projectors 130 may be instructed to not project a first set of content when one or more fiducials are in a first position and be instructed to project a second set of content when the one or more fiducials are in a second position. In some embodiments, one or more projectors 130 may be instructed to project a first set of content when one or more fiducials are in a first position and be instructed to not project a second set of content when the one or more fiducials are in a second position.

At operation 706, the projecting operation 220 may include projecting in response to the information associated with one or more changes in one or more calibration images associated with the one or more projection surfaces. In some embodiments, one or more projector control units 120 may instruct one or more projectors 130 to project in response to the information associated with one or more changes in one or more calibration images associated with the one or more projection surfaces 200. In some embodiments, one or more projector control units 120 may instruct one or more projectors 130 to alter their projection output in response to one or more changes in the one or more calibration images. For example, in some embodiments, one or more projector control units 120 may instruct one or more projectors 120 to increase the intensity of light output from the one or more projectors 130 in response to a decrease in reflectivity associated with one or more calibration images. In some embodiments, one or more projector control units 120 may instruct one or more projectors 130 to decrease the intensity of light output from the one or more projectors 130 in response to an increase in reflectivity associated with one or more calibration images. In some embodiments, one or more projector control units 120 may instruct one or more projectors 130 to focus output from the one or more projectors 130 in response to one or more changes in resolution associated with one or more calibration images.

At operation 708, the projecting operation 220 may include projecting in response to the information associated with one or more changes in one or more reflection patterns associated with the one or more projection surfaces. In some embodiments, one or more projector control units 120 may instruct one or more projectors 130 to project in response to the information associated with one or more changes in one or more reflection patterns associated with the one or more projection surfaces 200. In some embodiments, one or more projector control units 120 may instruct one or more projectors 130 to alter projection output in response to one or more changes in one or more reflection patterns associated with the one or more projection surfaces 200. In some embodiments, one or more changes in one or more reflection patterns may be used to calibrate projection output from one or more projectors 130. In some embodiments, one or more changes in one or more reflection patterns may be used to focus projection output from one or more projectors 130. In some embodiments, one or more changes in one or more reflection patterns may be used to adjust the intensity of projection output from one or more projectors 130.

At operation 710, the projecting operation 220 may include projecting in response to the information associated with one or more changes in one or more vertical positions associated with the one or more projection surfaces. In some embodiments, one or more projector control units 120 may instruct one or more projectors 130 to project in response to the information associated with one or more changes in one or more vertical positions associated with the one or more projection surfaces 200. For example, in some embodiments, one or more projector control units 120 may instruct one or more projectors 130 to project a first set of content when a projection surface 200 is positioned on a tabletop and to project a second set of content when a projection surface 200 is positioned on a wall.

Figure 8:
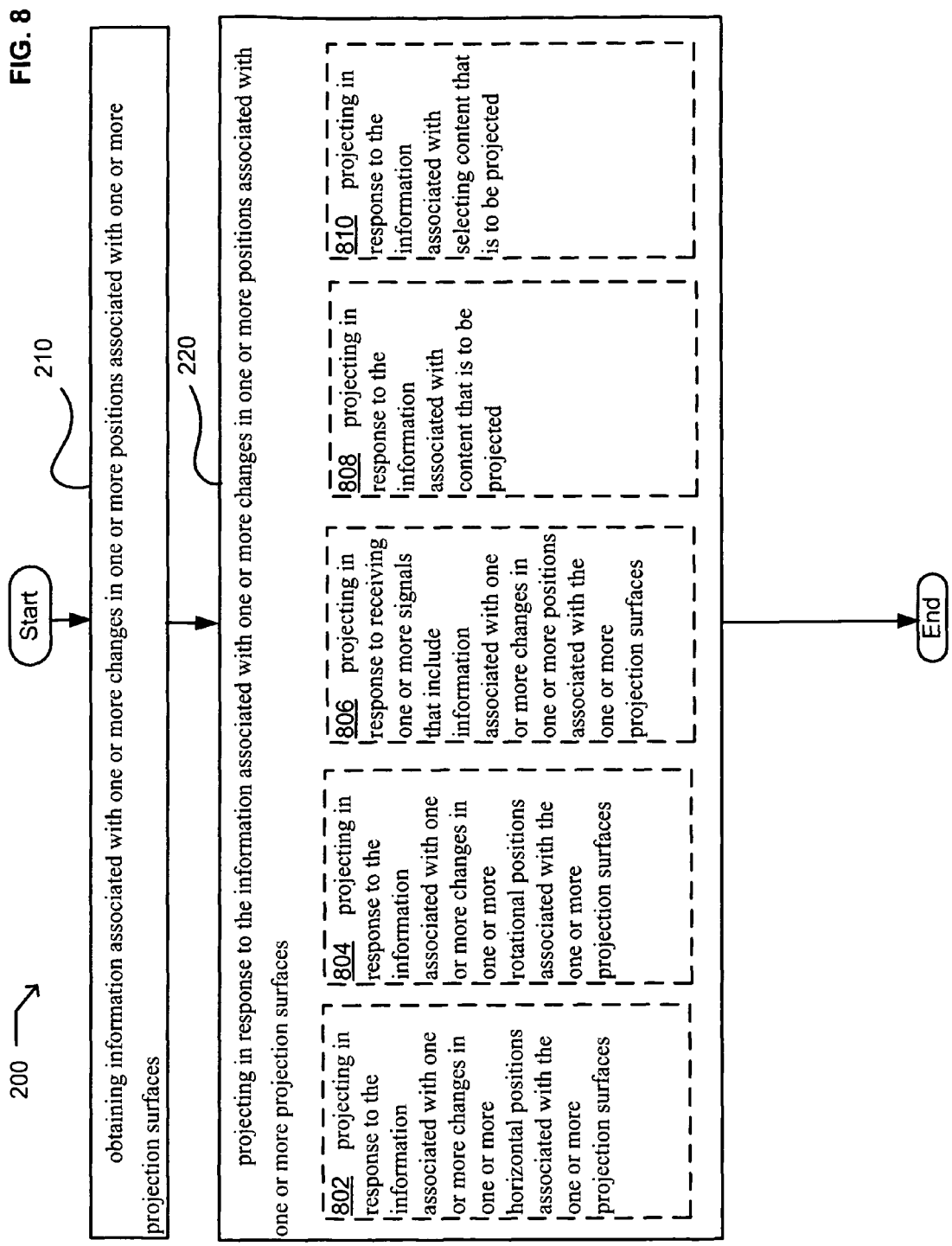
FIG. 8 illustrates alternative embodiments of the example operation flow of FIG. 2.

FIG. 8 illustrates alternative embodiments of the example operational flow 200 of FIG. 2. FIG. 8 illustrates example embodiments where the projecting operation 220 may include at least one additional operation. Additional operations may include an operation 802, operation 804, operation 806, operation 808, and/or operation 810.

At operation 802, the projecting operation 220 may include projecting in response to the information associated with one or more changes in one or more horizontal positions associated with the one or more projection surfaces. In some embodiments, one or more projector control units 120 may instruct one or more projectors 130 to project in response to the information associated with one or more changes in one or more horizontal positions associated with the one or more projection surfaces 200. In some embodiments, one or more projector control units 120 may instruct one or more projectors 130 to project a first set of content when a projection surface 200 is positioned at a first horizontal position and to project a second set of content when a projection surface 200 is positioned at a second horizontal position. For example, in some embodiments, one or more projector control units 120 may instruct one or more projectors 130 to project a first set of content when a projection surface 200 is positioned to be viewable by a first person and to project a second set of content when the projection surface 200 is positioned to be viewable by a second person.

At operation 804, the projecting operation 220 may include projecting in response to the information associated with one or more changes in one or more rotational positions associated with the one or more projection surfaces. In some embodiments, one or more projector control units 120 may instruct one or more projectors 130 to project in response to the information associated with one or more changes in one or more rotational positions associated with the one or more projection surfaces 200. In some embodiments, one or more projector control units 120 may instruct one or more projectors 130 to project in response to a projection surface 200 being rotated away from the view of a first person and rotated into view for a second person. In some embodiments, one or more projector control units 120 may instruct one or more projectors 130 to project in a manner that is relative to one or more persons viewing the projection surface 200. For example, in some embodiments, a projection surface 200 may be rotated to be viewed by persons on opposite sides of a table. Accordingly, in some such embodiments, one or more projector control units 120 may instruct one or more projectors 130 to reorient the projection output relative to the persons viewing the projection output.

At operation 806, the projecting operation 220 may include projecting in response to receiving one or more signals that include information associated with one or more changes in one or more positions associated with the one or more projection surfaces. In some embodiments, one or more projector control units 120 may instruct one or more projectors 130 to project in response to receiving one or more signals that include information associated with one or more changes in one or more positions associated with the one or more projection surfaces 200. In some embodiments, one or more control unit receivers 128 may receive one or more signals. In some embodiments, one or more control unit receivers 128 may receive one or more signals from one or more surface transmitters 204. In some embodiments, one or more control unit receivers 128 may receive one or more signals that were transmitted by one or more external devices 400. For example in some embodiments, one or more external devices 400 may be linked to a global positioning network that may detect the position of one or more projection surfaces 200. Accordingly, in some embodiments, one or more projector control units 120 may receive one or more signals that include global positioning information associated with one or more projection surfaces 200.

At operation 808, the projecting operation 220 may include projecting in response to the information associated with content that is to be projected. In some embodiments, one or more projector control units 120 may instruct one or more projectors 130 to project in response to the information associated with content that is to be projected. For example, in some embodiments, one or more projector control units 120 may access control memory 124 to access content that is to be projected. In some embodiments, one or more projector control units 120 may access projector memory 134 to access content that is to be projected. In some embodiments, one or more projector control units 120 may receive one or more signals that include information associated with content that is to be projected.

At operation 810, the projecting operation 220 may include projecting in response to the information associated with selecting content that is to be projected. In some embodiments, one or more projector control units 120 may instruct one or more projectors 130 to project in response to the information associated with selecting content that is to be projected. In some embodiments, one or more projector control units 120 may be configured to select content that is to be projected. In some embodiments, one or more projectors 130 may be configured to select content that is to be projected. For example, in some embodiments, one or more projectors 130 may be configured to select content that is to be projected from memory. In some embodiments, one or more projectors 130 may be configured to select content that is to be projected in response to user 600 input. In some embodiments, one or more projectors 130 may be configured to select content that is to be projected in response to one or more sensors 150. In some embodiments, one or more projectors 130 may select content that is to be projected in response to one or more sensors 150 that detect one or more persons. For example, in some embodiments, one or more projectors 130 may select content that is suitable for children if a child is detected. In some embodiments, one or more projector control units 120 may receive one or more signals that include information associated with content that is to be selected for projection.

Figure 9:
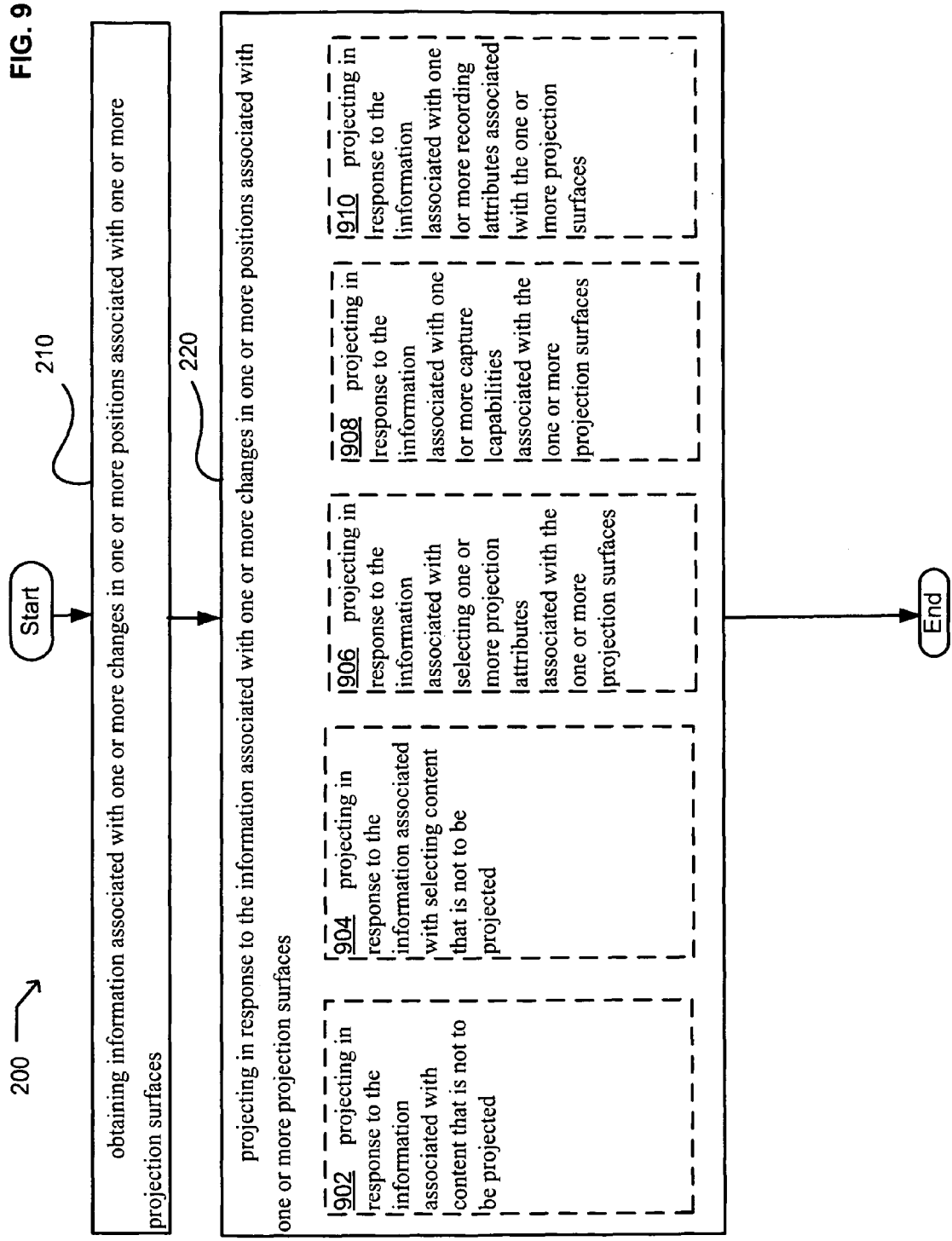
FIG. 9 illustrates alternative embodiments of the example operation flow of FIG. 2.

FIG. 9 illustrates alternative embodiments of the example operational flow 200 of FIG. 2. FIG. 9 illustrates example embodiments where the projecting operation 220 may include at least one additional operation. Additional operations may include an operation 902, operation 904, operation 906, operation 908, and/or operation 910.

At operation 902, the projecting operation 220 may include projecting in response to the information associated with content that is not to be projected. In some embodiments, one or more projector control units 120 may instruct one or more projectors 130 to project in response to the information associated with content that is not to be projected. In some embodiments, one or more projector control units 120 may be configured to designate content that is not to be projected. For example, in some embodiments, one or more projector control units 120 may access memory to designate content that is not to be projected. In some embodiments, one or more projector control units 120 may receive one or more signals that include information associated with content that is not to be projected. In some embodiments, one or more projector control units 120 may instruct one or more projectors 130 to access projector memory 134 and not project designated content.

At operation 904, the projecting operation 220 may include projecting in response to the information associated with selecting content that is not to be projected. In some embodiments, one or more projector control units 120 may instruct one or more projectors 130 to project in response to the information associated with selecting content that is not to be projected. In some embodiments, one or more projector control units 120 may be configured to select content that is not to be projected. For example, in some embodiments, one or more projector control units 120 may be configured to access memory to select content that is not to be projected. In some embodiments, one or more projector control units 120 may be configured to select content that is not to be projected in response to user input. In some embodiments, one or more projector control units 120 may be configured to select content that is not to be projected in response to one or more sensors 150. In some embodiments, one or more projector control units 120 may select content that is not to be projected in response to one or more sensors 150 that detect one or more persons. For example, in some embodiments, one or more projector control units 120 may select content that is not suitable for children if a child is detected. In some embodiments, one or more projector control units 120 may receive one or more signals that include information associated with content that is not to be selected for projection. In some embodiments, one or more projector control units 120 may be configured to instruct one or more projectors 130 to select content that is not to be projected.

At operation 906, the projecting operation 220 may include projecting in response to the information associated with selecting one or more projection attributes associated with the one or more projection surfaces. In some embodiments, one or more projector control units 120 may instruct one or more projectors 130 to project in response to the information associated with selecting one or more projection attributes associated with the one or more projection surfaces 200. In some embodiments, one or more projector control units 120 may be configured to select one or more projection attributes associated with one or more projection surfaces 200 and instruct one or more projectors 130 to project in response to the projection attributes. In some embodiments, one or more projectors 130 may be configured to project in response to accessing memory to determine one or more projection attributes associated with one or more projection surfaces 200. In some embodiments, one or more projectors 130 may be configured to project in response to one or more sensors 150 that are configured to determine one or more projection attributes associated with one or more projection surfaces 200. In some embodiments, one or more projectors 130 may be configured to project in response to receiving one or more signals that include information associated with one or more projection attributes associated with one or more projection surfaces 200. Examples of such projection attributes associated with one or more projection surfaces 200 include, but are not limited to, reflectivity, light absorbance, light reflection, light transmission, light emission, ability to record projected content, ability to transmit information associated with projected content, and the like. Accordingly, in some embodiments, one or more projector control units 120 may instruct one or more projectors 130 to project in response to one or more attributes associated with one or more projection surfaces 200. For example, in some embodiments, one or more projector control units 120 may instruct one or more projectors 130 to project content that is to be printed if a projection surface 200 is able to facilitate printing of content that is projected onto the projection surface 200. In some embodiments, one or more projector control units 120 may instruct one or more projectors 130 not to project content that is confidential if a projection surface 200 is able to facilitate printing of content that is projected onto the projection surface 200. In some embodiments, one or more projector control units 120 may instruct one or more projectors 130 to project one or more wavelengths of light in response to one or more attributes associated with a projection surface 200. For example, in some embodiments, a projection surface 200 may be made of material that transmits one or more wavelengths of light preferentially over other wavelengths of light. Accordingly, in some embodiments, a projector control unit 120 may instruct a projector to emit the one or more wavelengths of light that are preferentially transmitted by a projection surface 200. Accordingly, in some embodiments, one or more projector control units 120 may control one or more projectors 130 in accordance with projection attributes associated with one or more projection surfaces 200.

At operation 908, the projecting operation 220 may include projecting in response to the information associated with one or more capture capabilities associated with the one or more projection surfaces. In some embodiments, one or more projector control units 120 may instruct one or more projectors 130 to project in response to the information associated with one or more capture capabilities associated with the one or more projection surfaces 200. In some embodiments, one or more projector control units 120 may be configured to obtain information associated with one or more capture capabilities associated with one or more projection surfaces 200 and instruct one or more projectors 130 to project in response to the capture capabilities. In some embodiments, one or more projector control units 120 may be configured to access memory to determine one or more capture capabilities associated with one or more projection surfaces 200. In some embodiments, one or more projector control units 120 may be operably associated with one or more sensors 150 that are configured to determine one or more capture capabilities associated with one or more projection surfaces 200. In some embodiments, one or more projector control units 120 may be configured to receive one or more signals that include information associated with one or more capture capabilities associated with one or more projection surfaces 200. Examples of capture capabilities include, but are not limited to, printing of projected content, transmission of one or more signals that include information associated with projected content, and the like. In some embodiments, one or more projector control units 120 may control one or more projectors 130 in response to one or more capture capabilities associated with one or more projection surfaces 200. For example, in some embodiments, a projector control unit 120 may instruct one or more projectors 130 to project content that is to be printed onto one or more projection surfaces 200 that are capable of facilitating printing of the projected content. In some embodiments, a projector control unit 120 may instruct one or more projectors 130 not to project content that is confidential onto one or more projection surfaces 200 that are capable of facilitating printing of the projected content.

At operation 910, the projecting operation 220 may include projecting in response to the information associated with one or more recording attributes associated with the one or more projection surfaces. In some embodiments, one or more projector control units 120 may instruct one or more projectors 130 to project in response to the information associated with one or more recording attributes associated with the one or more projection surfaces 200. In some embodiments, one or more projector control units 120 may be configured to obtain information associated with one or more recording attributes associated with one or more projection surfaces 200 and to instruct one or more projectors 130 in response to the recording attributes. In some embodiments, one or more projector control units 120 may be configured to access memory to determine one or more recording attributes associated with one or more projection surfaces 200. In some embodiments, one or more projector control units 120 may be operably associated with one or more sensors 150 that are configured to determine one or more recording attributes associated with one or more projection surfaces 200. In some embodiments, one or more projector control units 120 may be configured to receive one or more signals that include information associated with one or more recording attributes associated with one or more projection surfaces 200. Examples of recording attributes include, but are not limited to, permanent recordation of projected content, storage of projected content into memory, and the like. In some embodiments, one or more projector control units 120 may control one or more projectors 130 in response to one or more recording attributes associated with one or more projection surfaces 200. For example, in some embodiments, a projector control unit 120 may instruct one or more projectors 130 to project content that is to be saved into memory onto one or more projection surfaces 200 that are capable of recording projected content into memory. In some embodiments, a projector control unit 120 may instruct one or more projectors 130 not to project content that is confidential onto one or more projection surfaces 200 that are capable of saving the projected content into memory.

Figure 10:
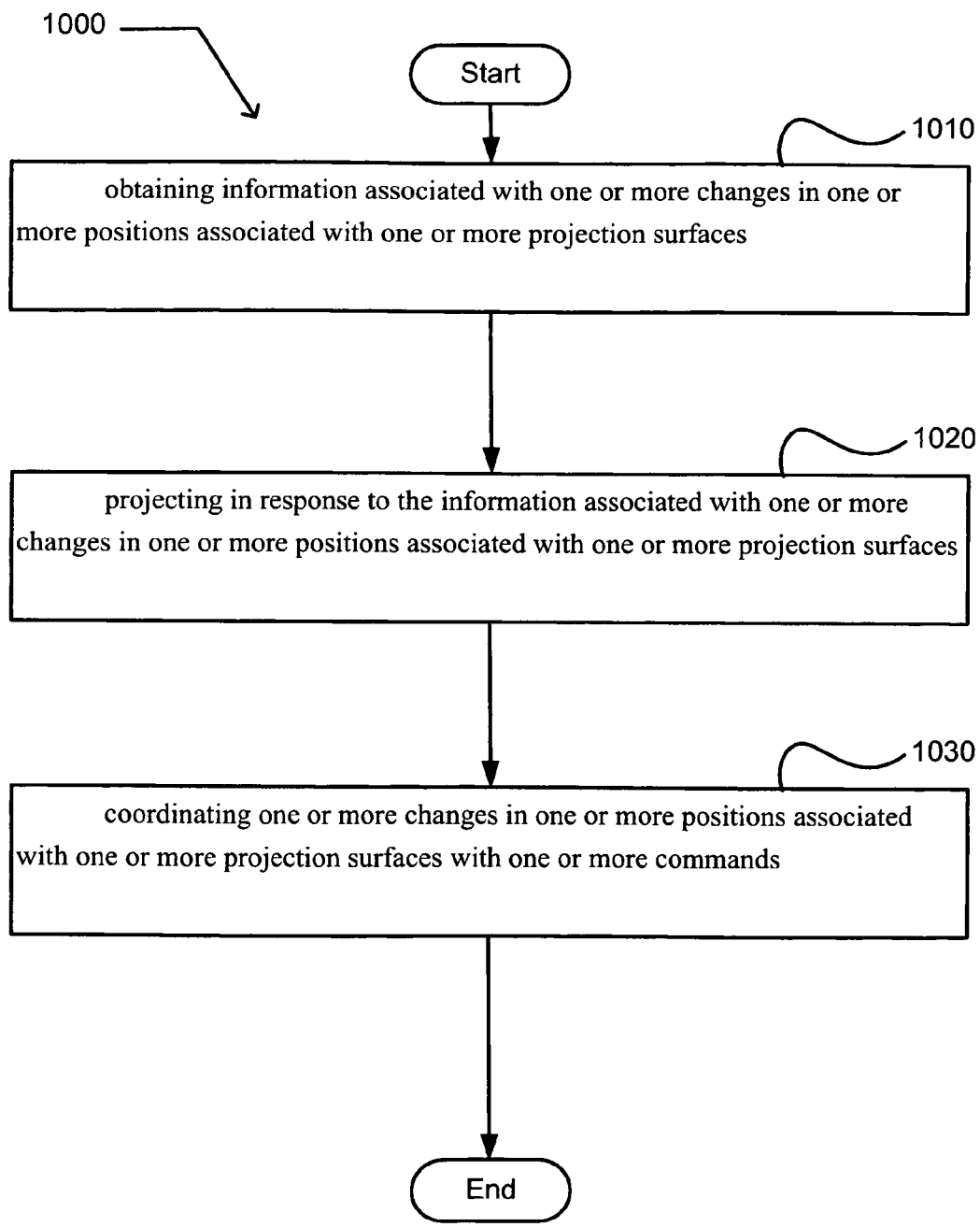
FIG. 10 illustrates an operational flow 1000 representing example operations related to obtaining information associated with one or more changes in one or more positions associated with one or more projection surfaces, projecting in response to the information associated with one or more changes in one or more positions associated with one or more projection surfaces, and coordinating one or more changes in one or more positions associated with one or more projection surfaces with one or more commands.

In FIG. 10 and in following figures that include various examples of operations used during performance of the method, discussion and explanation may be provided with respect to any one or combination of the above-described examples of FIG. 1, and/or with respect to other examples and contexts. In some embodiments, modules 210 and 220 of FIG. 2 may correspond to modules 1010 and 1020 of FIG. 10. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 1000 includes an obtaining operation 1010 involving obtaining information associated with one or more changes in one or more positions associated with one or more projection surfaces. In some embodiments, one or more projector control units 120 may obtain information associated with one or more changes in one or more positions of one or more projection surfaces 200. In some embodiments, one or more projector control units 120 may obtain information associated with one or more changes in one or more positions of one or more projection surfaces 200 directly. For example, in some embodiments, one or more projector control units 120 may obtain information from one or more sensors 150. In some embodiments, one or more projector control units 120 may obtain information associated with one or more changes in one or more positions of one or more projection surfaces 200 indirectly. For example, in some embodiments, one or more projector control units 120 may obtain information from one or more external devices 400. One or more projector control units 120 may obtain numerous types of information associated with one or more changes in one or more positions of one or more projection surfaces 200. In some embodiments, one or more projector control units 120 may obtain information associated with one or more changes in one or more fiducials associated with one or more projection surfaces 200. In some embodiments, one or more projector control units 120 may obtain information associated with one or more changes in one or more marks associated with one or more projection surfaces 200. In some embodiments, one or more projector control units 120 may obtain information associated with one or more changes in one or more calibration images associated with one or more projection surfaces 200.

After a start operation, the operational flow 1000 includes a projecting operation 1020 involving projecting in response to the information associated with one or more changes in one or more positions associated with one or more projection surfaces. In some embodiments, one or more projectors 130 may project in response to the information associated with one or more changes in one or more positions of one or more projection surfaces 200. In some embodiments, one or more projectors 130 may project content that is selected in response to one or more changes in one or more positions of one or more projection surfaces 200. In some embodiments, one or more projectors 130 may adjust projection output in response to one or more features associated with one or more projection surfaces 200. For example, in some embodiments, one or more projectors 130 may adjust the intensity of light that is projected onto one or more projection surfaces 200. In some embodiments, one or more projectors 130 may adjust the wavelengths of light that are projected onto one or more projection surfaces 200. In some embodiments, one or more projectors 130 may project content onto two or more separate projection surfaces 200 in response to features associated with of at least one of the two or more projection surfaces 200.

After a start operation, the operational flow 1000 includes a coordinating operation 1030 involving coordinating one or more changes in one or more positions associated with one or more projection surfaces with one or more commands. In some embodiments, one or more projector processors 131 may facilitate coordinating one or more changes in one or more positions associated with one or more projection surfaces 200 with one or more commands. In some embodiments, one or more projector control units 120 may obtain information associated with one or more positions of one or more projection surfaces 200 and facilitate coordination of the information with one or more commands. Examples of commands include, but are not limited to, commands to: increase light output from one or more projectors 130, decrease light output from one or more projectors 130, select one or more wavelengths of light for projection, select one or more wavelengths of light that are not to be projected, direct projection outputs, project in response to motion, project in response to changes in the position of one or more marks associated with one or more projection surfaces 200, select content for projection, select content that is not to be projected, project in response to one or more attributes associated with one or more projection surfaces 200, project in response to one or more capabilities associated with one or more projection surfaces 200, save content into memory, and the like. In some embodiments, one or more projector control units 120 may access memory. For example, in some embodiments, one or more projector control units 120 may access one or more lookup tables that include correlations of one or more changes in one or more positions of one or more projection surfaces 200 with one or more commands. In some embodiments, one or more projector control units 120 may access one or more algorithms that may be used to correlate one or more changes in one or more positions of one or more projection surfaces 200 with one or more commands.

Figure 11:
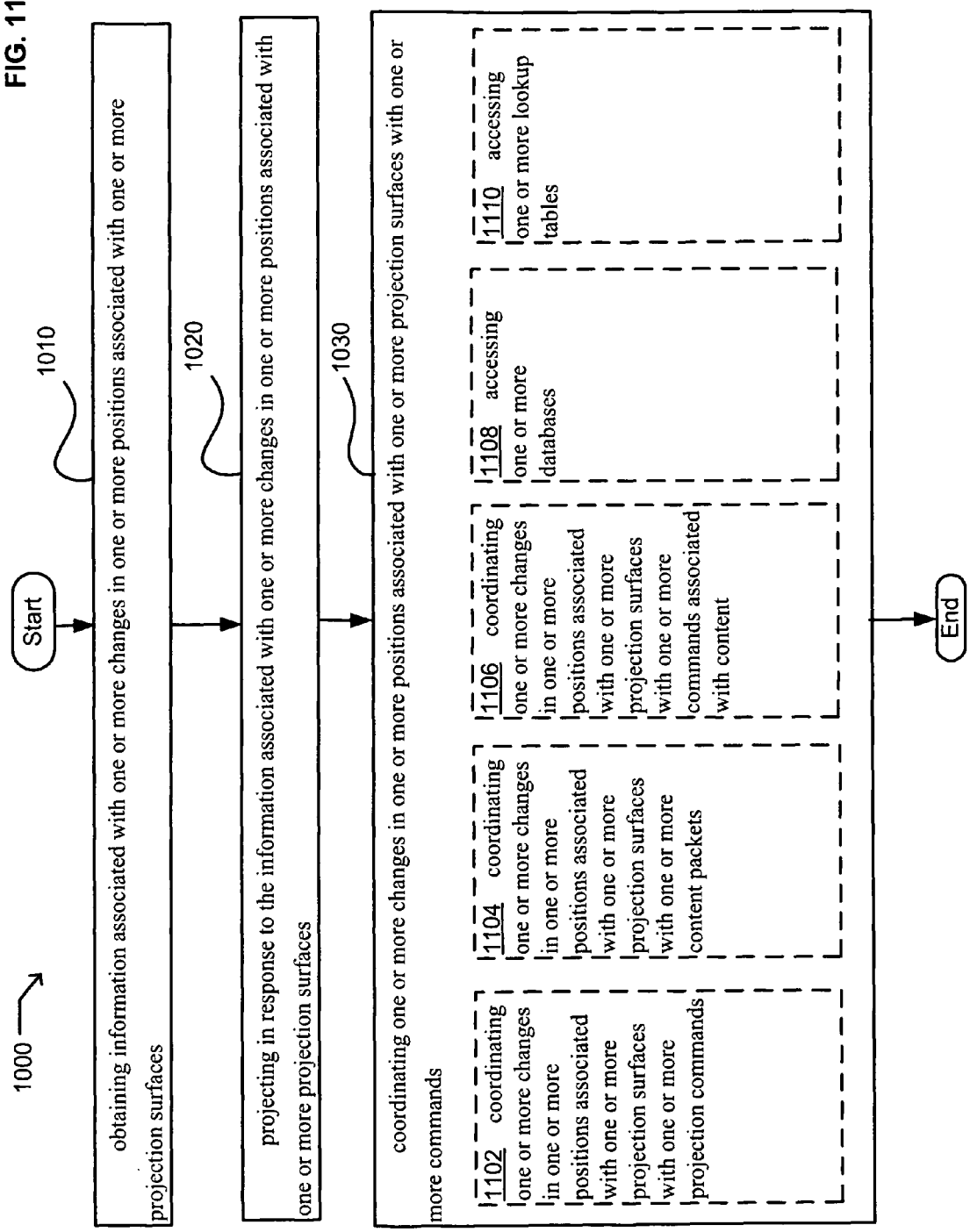
FIG. 11 illustrates alternative embodiments of the example operation flow of FIG. 10.

FIG. 11 illustrates alternative embodiments of the example operational flow 1000 of FIG. 10. FIG. 11 illustrates example embodiments where the coordinating operation 1030 may include at least one additional operation. Additional operations may include an operation 1102, operation 1104, operation 1106, operation 1108, and/or operation 1110.

At operation 1102, the coordinating operation 1030 may include coordinating one or more changes in one or more positions associated with one or more projection surfaces with one or more projection commands. In some embodiments, one or more projector control units 120 may facilitate coordinating one or more changes in one or more positions of one or more projection surfaces 200 with one or more projection commands. For example, in some embodiments, one or more projector control units 120 may facilitate coordinating one or more changes in light transmission that are associated with one or more changes in the position of one or more projection surfaces 200 with one or more projection commands. In some embodiments, one or more projector control units 120 may facilitate coordinating one or more changes in light absorbance that are associated with one or more changes in the position of one or more projection surfaces 200 with one or more projection commands. Accordingly, in some embodiments, one or more projector control units 120 may alter the intensity of light that is projected onto the one or more projection surfaces 200 in response to the altered light absorbance of the one or more projection surfaces 200. In some embodiments, one or more projector control units 120 may facilitate coordinating one or more changes in one or more positions of one or more fiducials that are associated with one or more projection surfaces 200 with one or more projection commands. In some embodiments, one or more projector control units 120 may facilitate coordinating one or more changes in one or more positions of one or more calibration images that are associated with one or more projection surfaces 200 with one or more projection commands.

At operation 1104, the coordinating operation 1030 may include coordinating one or more changes in one or more positions associated with one or more projection surfaces with one or more content packets. In some embodiments, one or more projector control units 120 may facilitate coordinating one or more changes in one or more positions associated with one or more projection surfaces 200 with one or more content packets. In some embodiments, one or more projector control units 120 may facilitate accessing one or more content packets. In some embodiments, one or more projector control units 120 may facilitate coordinating one or more changes in one or more positions of one or more projection surfaces 200 with one or more commands to access one or more content packets. In some embodiments, one or more projector control units 120 may facilitate coordinating one or more changes in one or more positions of one or more projection surfaces 200 with one or more commands to access one or more content packets that include specified information. For example, in some embodiments, one or more lookup tables may include information for coordinating one or more specified changes in the position of one or more projection surfaces 200 with one or more commands to access one or more content packets that include specified information. Accordingly, in some embodiments, one or more specified changes in position may be coordinated with specified information. In some embodiments, one or more lookup tables may include information for coordinating one or more specified changes in the position of one or more projection surfaces 200 with one or more commands to access one or more specified content packets. Accordingly, in some embodiments, one or more specified changes in position may be coordinated with one or more specified content packets.

At operation 1106, the coordinating operation 1030 may include coordinating one or more changes in one or more positions associated with one or more projection surfaces with one or more commands associated with content. In some embodiments, one or more projector control units 120 may facilitate coordinating one or more changes in one or more positions associated with one or more projection surfaces 200 with one or more commands associated with content. In some embodiments, one or more projector control units 120 may facilitate coordinating one or more changes in one or more positions of one or more projection surfaces 200 with one or more commands to select content for projection. For example, in some embodiments, sliding a projection surface 200 from one side of a table to the other side of the table may be coordinated with one or more commands to select confidential information for projection. In some embodiments, rotating a projection surface 200 in a clockwise direction may be coordinated with one or more commands to select nonconfidential information for projection. In some embodiments, a user 600 may specify one or more changes in position that may be coordinated with one or more commands to select content for projection. For example, a user 600 may specify that turning a projection surface 200 over is to be coordinated with one or more commands to select confidential information for projection. Accordingly, in some embodiments, numerous changes in the position of a projection surface 200 may be coordinated with one or more commands select content for projection At operation 1108, the coordinating operation 1030 may include accessing one or more databases. In some embodiments, one or more projector control units 120 may facilitate accessing one or more databases. In some embodiments, one or more projector control units 120 may facilitate coordinating one or more changes in one or more positions of one or more projection surfaces 200 with one or more commands to access one or more databases. For example, in some embodiments, one or more projector control units 120 may facilitate accessing one or more databases that include confidential material in response to one or more changes in the position of one or more marks that are associated with one or more projection surfaces 200. In some embodiments, moving a projection surface 200 from one position to another position may be coordinated with accessing one or more databases. Accordingly, in some embodiments, one or more projector control units 120 may facilitate accessing one or more databases in response to one or more specified changes in the position of a projection surface 200.

At operation 1110, the coordinating operation 1030 may include accessing one or more lookup tables. In some embodiments, one or more projector control units 120 may facilitate accessing one or more lookup tables. In some embodiments, one or more projector control units 120 may facilitate coordinating one or more changes in one or more positions of one or more projection surfaces 200 with one or more commands to access one or more lookup tables. In some embodiments, one or more projector control units 120 may facilitate coordinating one or more changes in one or more positions of one or more projection surfaces 200 with one or more commands to access one or more lookup tables that include information for coordinating the one or more changes in position with one or more commands. For example, in some embodiments, one or more lookup tables may include information for coordinating one or more specified changes in the position of one or more projection surfaces 200 with one or more commands to select content for projection. In some embodiments, one or more lookup tables may include information for coordinating one or more specified changes in the position of one or more projection surfaces 200 with one or more commands to select content that is not for projection. In some embodiments, one or more projector control units 120 may facilitate accessing one or more lookup tables in response to one or more changes in the position of one or more projection surfaces 200. For example, in some embodiments, moving a projection surface 200 from one position to another may be coordinated with accessing one or more lookup tables. Accordingly, in some embodiments, one or more projector control units 120 may facilitate accessing one or more lookup tables in response to one or more specified changes in the position of a projection surface 200. In some embodiments, one or more projector control units 120 may facilitate accessing one or more lookup tables in response to one or more motions associated with one or more projection surfaces 200. For example, in some embodiments, rotating a projection surface 200 may be coordinated with accessing one or more lookup tables. Accordingly, in some embodiments, one or more projector control units 120 may facilitate accessing one or more lookup tables in response to one or more specified motions associated with a projection surface 200.

Figure 12:
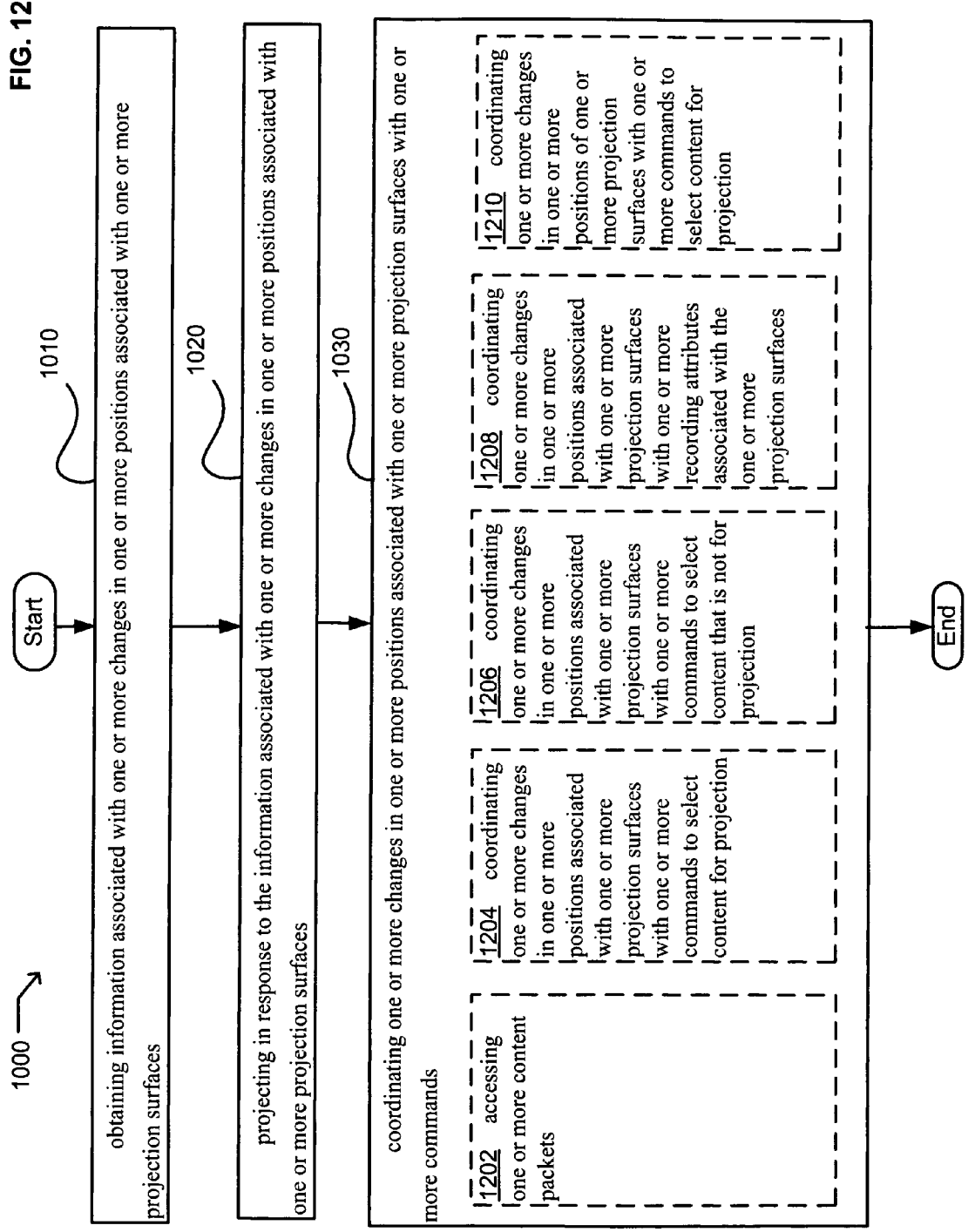
FIG. 12 illustrates alternative embodiments of the example operation flow of FIG. 10.

FIG. 12 illustrates alternative embodiments of the example operational flow 1000 of FIG. 10. FIG. 12 illustrates example embodiments where the coordinating operation 1030 may include at least one additional operation. Additional operations may include an operation 1202, operation 1204, operation 1206, operation 1208, and/or operation 1210.

At operation 1202, the coordinating operation 1030 may include accessing one or more content packets. In some embodiments, one or more projector control units 120 may facilitate accessing one or more content packets. In some embodiments, one or more projector control units 120 may facilitate coordinating one or more changes in one or more positions of one or more projection surfaces 200 with one or more commands to access one or more content packets. In some embodiments, one or more projector control units 120 may facilitate coordinating one or more changes in one or more positions of one or more projection surfaces 200 with one or more commands to access one or more content packets that include specified information. For example, in some embodiments, one or more lookup tables may include information for coordinating one or more specified changes in the position of one or more projection surfaces 200 with one or more commands to access one or more content packets that include specified information. Accordingly, in some embodiments, one or more specified changes in position may be coordinated with specified information. In some embodiments, one or more lookup tables may include information for coordinating one or more specified changes in the position of one or more projection surfaces 200 with one or more commands to access one or more specified content packets. Accordingly, in some embodiments, one or more specified changes in position may be coordinated with one or more specified content packets.

At operation 1204, the coordinating operation 1030 may include coordinating one or more changes in one or more positions associated with one or more projection surfaces with one or more commands to select content for projection. In some embodiments, one or more projector control units 120 may facilitate coordinating one or more changes in one or more positions associated with one or more projection surfaces 200 with one or more commands to select content for projection. For example, in some embodiments, rotating a projection surface 200 may be coordinated with one or more commands to select content for projection. In some embodiments, moving one or more projection surfaces 200 from one position to another position may be coordinated with one or more commands to select content for projection. Accordingly, in some embodiments, numerous changes in the conformation of a projection surface 200 may be coordinated with one or more commands select content for projection.

At operation 1206, the coordinating operation 1030 may include coordinating one or more changes in one or more positions associated with one or more projection surfaces with one or more commands to select content that is not for projection. In some embodiments, one or more projector control units 120 may facilitate coordinating one or more changes in one or more positions associated with one or more projection surfaces 200 with one or more commands to select content that is not for projection. For example, in some embodiments, changing the position of one or more projection surfaces 200 may be coordinated with one or more commands to select confidential information that is not for projection. In some embodiments, turning a projection surface 200 over may be coordinated with one or more commands to select information that is not for projection. In some embodiments, a user 600 may specify one or more changes in one or more positions of one or more projection surfaces 200 that may be coordinated with one or more commands to select content that is not for projection. For example, a user 600 may specify that rotating a projection surface 200 in a clockwise direction is to be coordinated with one or more commands to select confidential information that is not for projection. Accordingly, in some embodiments, numerous changes in the position of a projection surface 200 may be coordinated with one or more commands to select content that is not for projection.

At operation 1208, the coordinating operation 1030 may include coordinating one or more changes in one or more positions associated with one or more projection surfaces with one or more recording attributes associated with the one or more projection surfaces. In some embodiments, one or more projector control units 120 may facilitate coordinating one or more changes in one or more positions associated with one or more projection surfaces 200 with one or more recording attributes associated with the one or more projection surfaces 200. For example, in some embodiments, one or more projection surfaces 200 may be positioned with a first side up to indicate that the projection surface 200 is enabled to save content that is projected onto the projection surface 200 into memory. In some embodiments, one or more projection surfaces 200 may be positioned with a first side down to indicate that the projection surface 200 is not enabled to save content that is projected onto the projection surface 200 into memory. Accordingly, numerous positions may be coordinated with numerous recording attributes that may be associated with one or more projection surfaces 200. Examples of such recording attributes include, but are not limited to: saving projected content into memory, facilitating printing of projected content, transmitting one or more signals that include information associated with projected content, and the like.

At operation 1210, the coordinating operation 1030 may include coordinating one or more changes in one or more positions of one or more projection surfaces with one or more commands to select content for projection. In some embodiments, one or more projector control units 120 may facilitate coordinating the one or more changes in one or more positions of one or more projection surfaces 200 with one or more commands to select content for projection. For example, in some embodiments, sliding a projection surface 200 across a table may be coordinated with one or more commands to select confidential information for projection. In some embodiments, turning a projection surface 200 over may be coordinated with one or more commands to select nonconfidential information for projection. In some embodiments, a user 600 may specify one or more changes in position that may be coordinated with one or more commands to select content for projection. For example, a user 600 may specify that rotation of a projection surface 200 in a clockwise direction is to be coordinated with one or more commands to select confidential information for projection. Accordingly, in some embodiments, numerous changes in the position of a projection surface 200 may be coordinated with one or more commands to select content for projection.

Figure 13:
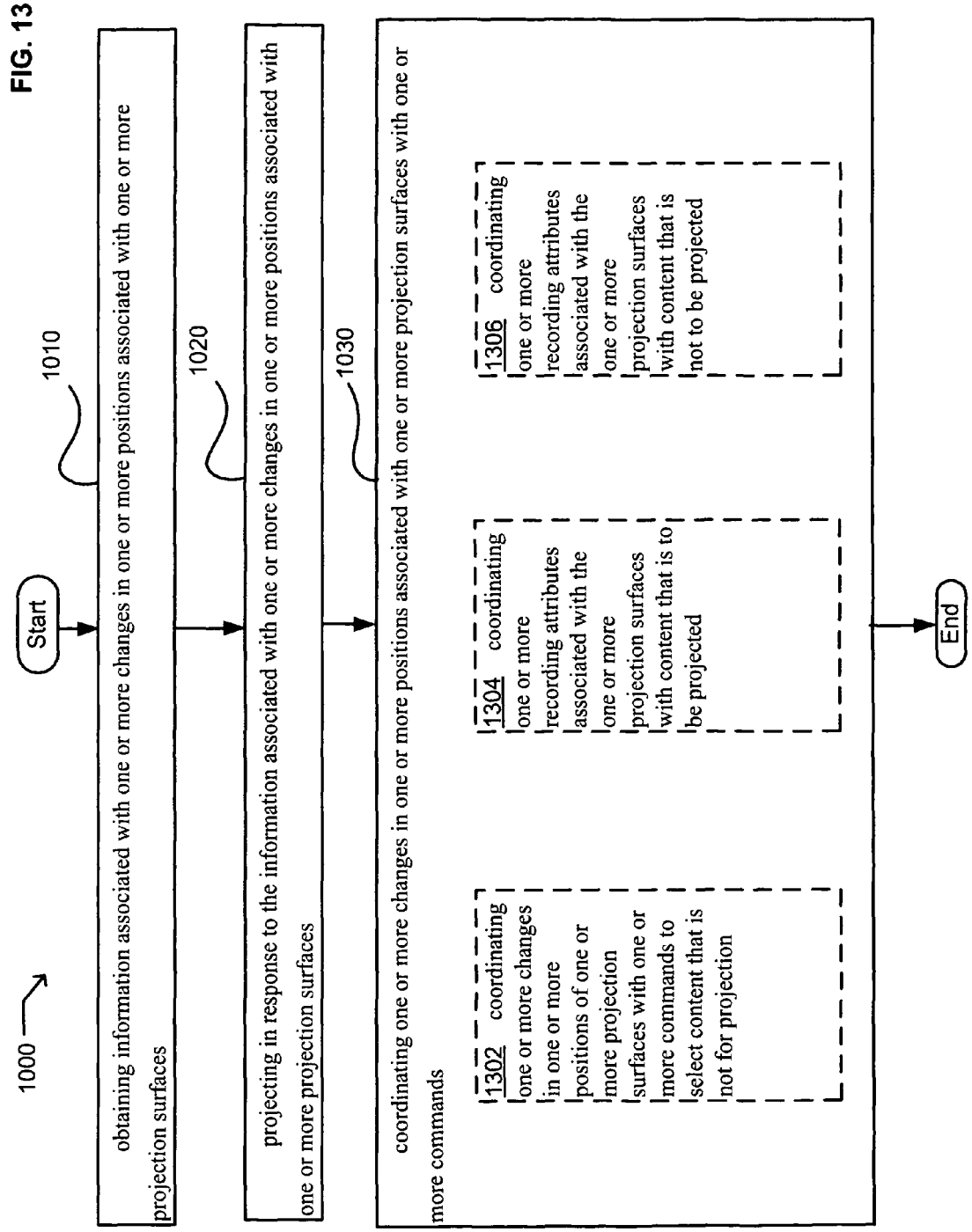
FIG. 13 illustrates alternative embodiments of the example operation flow of FIG. 10.

FIG. 13 illustrates alternative embodiments of the example operational flow 1000 of FIG. 10. FIG. 13 illustrates example embodiments where the coordinating operation 1030 may include at least one additional operation. Additional operations may include an operation 1302, operation 1304, and/or operation 1306.

At operation 1302, the coordinating operation 1030 may include coordinating one or more changes in one or more positions of one or more projection surfaces with one or more commands to select content that is not for projection. In some embodiments, one or more projector control units 120 may facilitate coordinating the one or more changes in one or more positions of one or more projection surfaces 200 with one or more commands to select content that is not for projection. In some embodiments, one or more projector control units 120 may facilitate coordinating one or more changes in one or more positions of one or more projection surfaces 200 with one or more commands to select content that is not for projection. For example, in some embodiments, turning a projection surface 200 over may be coordinated with one or more commands to select confidential information that is not for projection. In some embodiments, a user 600 may specify one or more changes in position that may be coordinated with one or more commands to select content that is not for projection. For example, a user 600 may specify that rotating a projection surface 200 in a clockwise direction is to be coordinated with one or more commands to select confidential information that is not for projection. Accordingly, in some embodiments, numerous changes in the position of a projection surface 200 may be coordinated with one or more commands to select content that is not for projection.

At operation 1304, the coordinating operation 1030 may include coordinating one or more recording attributes associated with the one or more projection surfaces with content that is to be projected. In some embodiments, one or more projector control units 120 may facilitate coordinating one or more recording attributes associated with one or more projection surfaces 200 with content that is to be projected. In some embodiments, one or more projector control units 120 may facilitate coordinating one or more recording attributes associated with one or more projection surfaces 200 with content that is to be recorded into memory. For example, in some embodiments, the ability of one or more projection surfaces 200 to facilitate saving content that is projected onto the projection surface 200 into memory may be coordinated with content that is to be projected on the projection surface 200 and saved into memory. In some embodiments, one or more projector control units 120 may facilitate coordinating one or more recording attributes associated with one or more projection surfaces 200 with content that is to be printed. For example, in some embodiments, the ability of one or more projection surfaces 200 to facilitate printing of content that is projected onto the projection surface 200 may be coordinated with content that is to be projected onto the projection surface 200 and printed.

At operation 1306, the coordinating operation 1030 may include coordinating one or more recording attributes associated with the one or more projection surfaces with content that is not to be projected. In some embodiments, one or more projector control units 120 may facilitate coordinating one or more recording attributes associated with one or more projection surfaces 200 with content that is not to be projected. In some embodiments, one or more projector control units 120 may facilitate coordinating one or more recording attributes associated with one or more projection surfaces 200 with content that is not to be recorded into memory. For example, in some embodiments, the ability of one or more projection surfaces 200 to facilitate saving content that is projected onto the projection surface 200 into memory may be coordinated with content that is not to be projected onto the projection surface 200. In some embodiments, one or more projector control units 120 may facilitate coordinating one or more recording attributes associated with one or more projection surfaces 200 with content that is not to be printed. For example, in some embodiments, the ability of one or more projection surfaces 200 to facilitate printing of content that is projected onto the projection surface 200 may be coordinated with content that is to be projected onto the projection surface 200.

Figure 14:
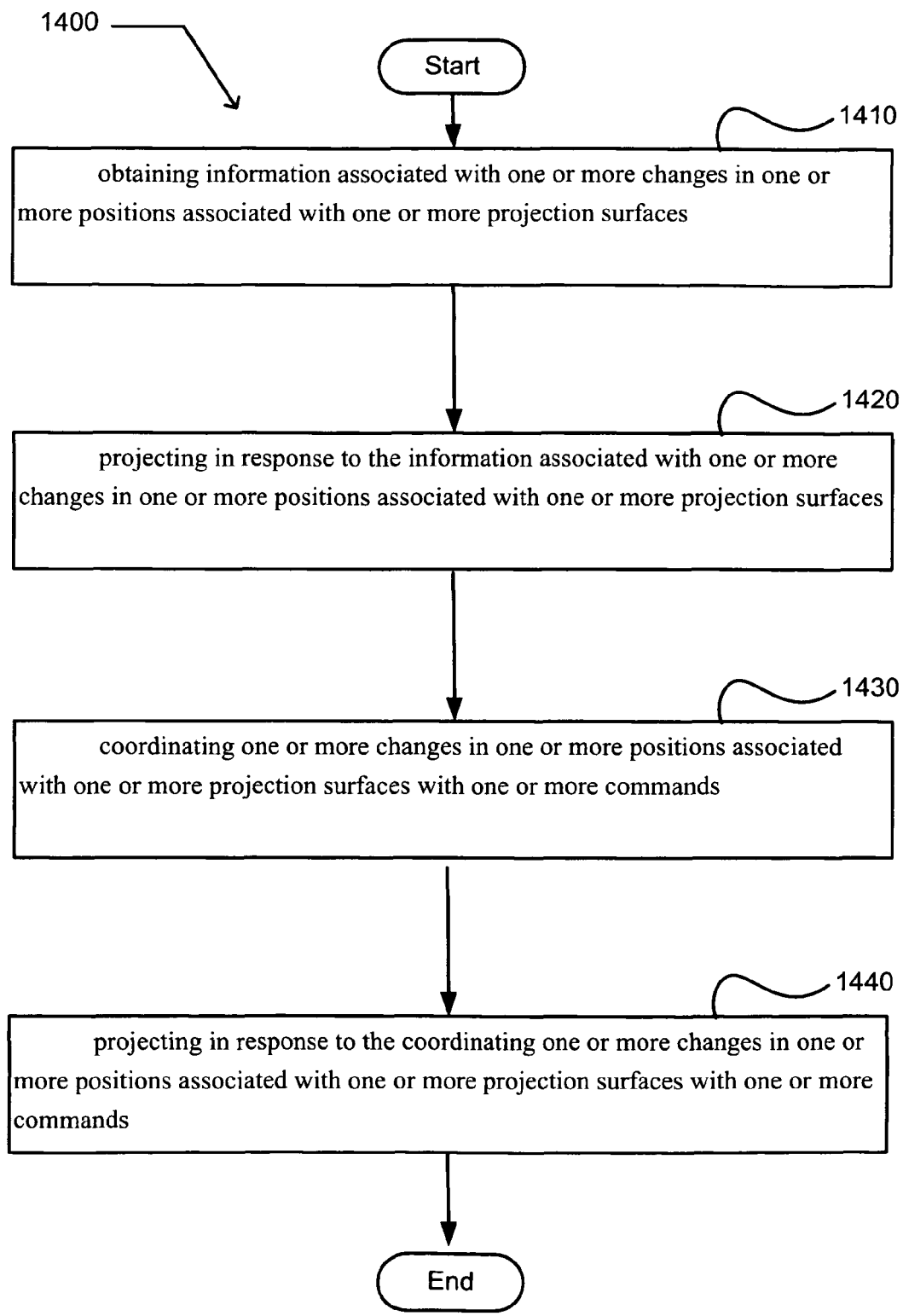
FIG. 14 illustrates an operational flow 1400 representing example operations related to obtaining information associated with one or more changes in one or more positions associated with one or more projection surfaces, projecting in response to the information associated with one or more changes in one or more positions associated with one or more projection surfaces, coordinating one or more changes in one or more positions associated with one or more projection surfaces with one or more commands, and projecting in response to the coordinating one or more changes in one or more positions associated with one or more projection surfaces with one or more commands.

In FIG. 14 and in following figures that include various examples of operations used during performance of the method, discussion and explanation may be provided with respect to any one or combination of the above-described examples of FIG. 1, and/or with respect to other examples and contexts. In some embodiments, modules 1010, 1020 and 1030 of FIG. 10 may correspond to modules 1410, 1420, and 1430 of FIG. 14. However, it should be understood that the operations may be executed in a number of other environments and contexts, and/or modified versions of FIG. 1. Also, although the various operations are presented in the sequence(s) illustrated, it should be understood that the various operations may be performed in other orders than those which are illustrated, or may be performed concurrently.

After a start operation, the operational flow 1400 includes an obtaining operation 1410 involving obtaining information associated with one or more changes in one or more positions associated with one or more projection surfaces. In some embodiments, one or more projector control units 120 may obtain information associated with one or more changes in one or more positions of one or more projection surfaces 200. In some embodiments, one or more projector control units 120 may obtain information associated with one or more changes in one or more positions of one or more projection surfaces 200 directly. For example, in some embodiments, one or more projector control units 120 may obtain information from one or more sensors 150. In some embodiments, one or more projector control units 120 may obtain information associated with one or more changes in one or more positions of one or more projection surfaces 200 indirectly. For example, in some embodiments, one or more projector control units 120 may obtain information from one or more external devices 400. One or more projector control units 120 may obtain numerous types of information associated with one or more changes in one or more positions of one or more projection surfaces 200. In some embodiments, one or more projector control units 120 may obtain information associated with one or more changes in one or more fiducials associated with one or more projection surfaces 200. In some embodiments, one or more projector control units 120 may obtain information associated with one or more changes in one or more marks associated with one or more projection surfaces 200. In some embodiments, one or more projector control units 120 may obtain information associated with one or more changes in one or more calibration images associated with one or more projection surfaces 200.

After a start operation, the operational flow 1400 includes a projecting operation 1420 involving projecting in response to the information associated with one or more changes in one or more positions associated with one or more projection surfaces. In some embodiments, one or more projectors 130 may project in response to the information associated with one or more changes in one or more positions of one or more projection surfaces 200. In some embodiments, one or more projectors 130 may project content that is selected in response to one or more changes in one or more positions of one or more projection surfaces 200. In some embodiments, one or more projectors 130 may adjust projection output in response to one or more features associated with one or more projection surfaces 200. For example, in some embodiments, one or more projectors 130 may adjust the intensity of light that is projected onto one or more projection surfaces 200. In some embodiments, one or more projectors 130 may adjust the wavelengths of light that are projected onto one or more projection surfaces 200. In some embodiments, one or more projectors 130 may project content onto two or more separate projection surfaces 200 in response to features associated with of at least one of the two or more projection surfaces 200.

After a start operation, the operational flow 1400 includes a coordinating operation 1430 involving coordinating one or more changes in one or more positions associated with one or more projection surfaces with one or more commands. In some embodiments, one or more projector processors 131 may facilitate coordinating one or more changes in one or more positions associated with one or more projection surfaces 200 with one or more commands. In some embodiments, one or more projector control units 120 may obtain information associated with one or more positions of one or more projection surfaces 200 and facilitate coordination of the information with one or more commands. Examples of commands include, but are not limited to, commands to: increase light output from one or more projectors 130, decrease light output from one or more projectors 130, select one or more wavelengths of light for projection, select one or more wavelengths of light that are not to be projected, direct projection outputs, project in response to motion, project in response to changes in the position of one or more marks associated with one or more projection surfaces 200, select content for projection, select content that is not to be projected, project in response to one or more attributes associated with one or more projection surfaces 200, project in response to one or more capabilities associated with one or more projection surfaces 200, save content into memory, and the like. In some embodiments, one or more projector control units 120 may access memory. For example, in some embodiments, one or more projector control units 120 may access one or more lookup tables that include correlations of one or more changes in one or more positions of one or more projection surfaces 200 with one or more commands. In some embodiments, one or more projector control units 120 may access one or more algorithms that may be used to correlate one or more changes in one or more positions of one or more projection surfaces 200 with one or more commands.

After a start operation, the operational flow 1400 includes a projecting operation 1440 involving projecting in response to the coordinating one or more changes in one or more positions associated with one or more projection surfaces with one or more commands. In some embodiments, one or more projector control units 120 may instruct one or more projectors 130 to project in response to coordinating one or more changes in one or more positions associated with one or more projection surfaces 200 with one or more commands. In some embodiments, one or more projector control units 120 may instruct one or more projectors 130 to project content in response to coordinating one or more changes in one or more positions of one or more projection surfaces 200 with one or more commands to select the content. In some embodiments, one or more projector control units 120 may instruct one or more projectors 130 to project content that was selected in response to coordinating one or more changes in one or more positions of one or more projection surfaces 200 with one or more commands to select and project the content. In some embodiments, one or more projector control units 120 may instruct one or more projectors 130 to not project content in response to coordinating one or more changes in one or more positions of one or more projection surfaces 200 with one or more commands to select content that is not for projection.

Figure 15:
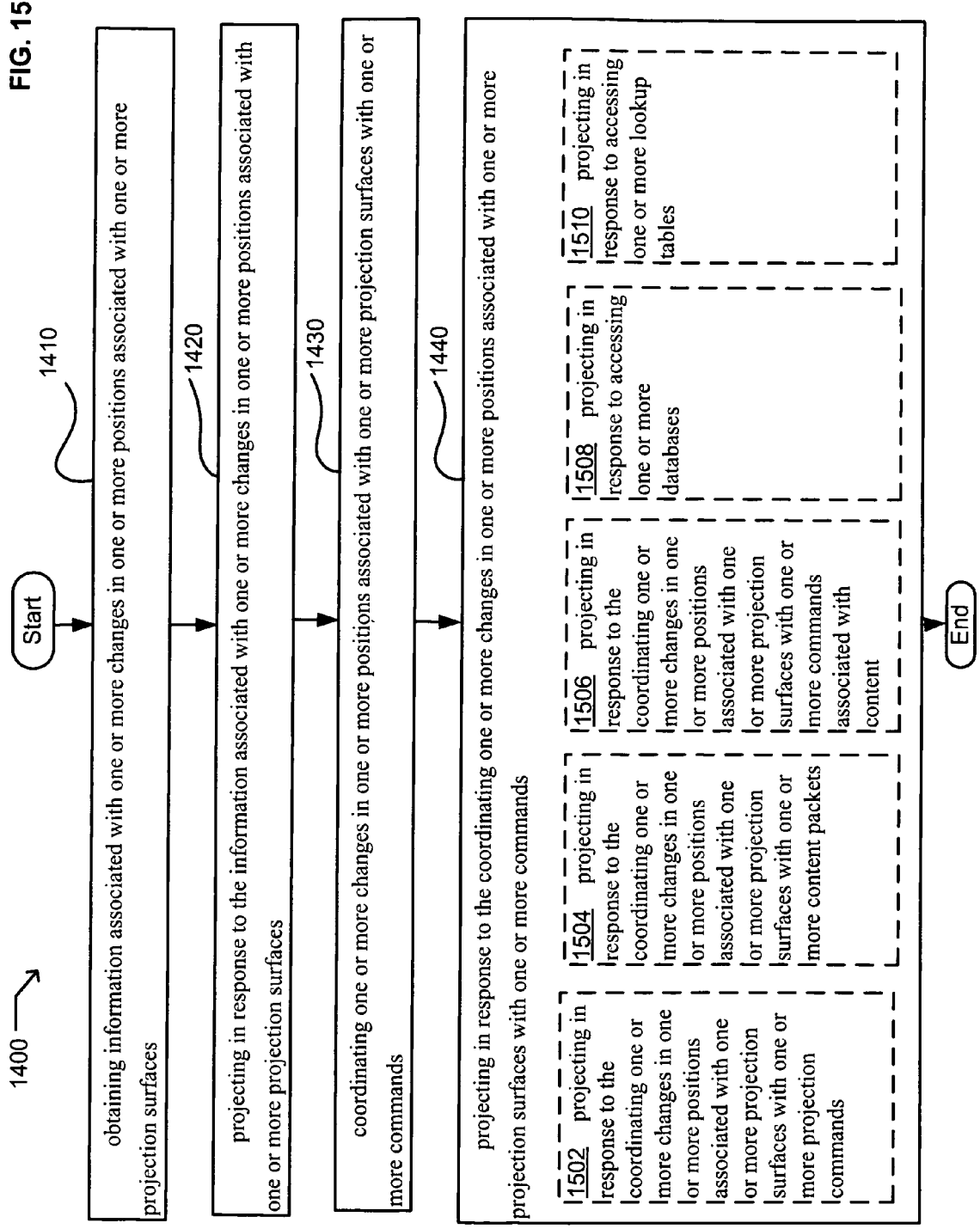
FIG. 15 illustrates alternative embodiments of the example operation flow of FIG. 14.

FIG. 15 illustrates alternative embodiments of the example operational flow 1400 of FIG. 14. FIG. 15 illustrates example embodiments where the projecting operation 1440 may include at least one additional operation. Additional operations may include an operation 1502, operation 1504, operation 1506, operation 1508, and/or operation 1510.

At operation 1502, the projecting operation 1440 may include projecting in response to the coordinating one or more changes in one or more positions associated with one or more projection surfaces with one or more projection commands. In some embodiments, one or more projector control units 120 may instruct one or more projectors 130 to project in response to coordinating one or more changes in one or more positions associated with one or more projection surfaces 200 with one or more projection commands. For example, in some embodiments, one or more projector control units 120 may instruct one or more projectors 130 to increase the intensity of light projected by one or more projectors 130 in response to coordinating one or more changes in illumination of one or more projection surfaces 200 with one or more commands to alter the intensity of projected light. In some embodiments, one or more projector control units 120 may instruct one or more projectors 130 to direct projection output onto one or more projection surfaces 200 in response to coordinating one or more changes in the position of the one or more projection surfaces 200 with one or more commands to direct the projection output onto the one or more projection surfaces 200. In some embodiments, one or more projector control units 120 may instruct one or more projectors 130 to project one or more wavelengths of light in response to coordinating one or more changes in light transmission of one or more projection surfaces 200 with one or more commands to select one or more wavelengths of light for projection that are matched to the light transmission characteristics of the one or more projection surfaces 200.

At operation 1504, the projecting operation 1440 may include projecting in response to the coordinating one or more changes in one or more positions associated with one or more projection surfaces with one or more content packets. In some embodiments, one or more projector control units 120 may instruct one or more projectors 130 to project in response to coordinating one or more changes in one or more positions associated with one or more projection surfaces 200 with one or more content packets. In some embodiments, one or more projector control units 120 may instruct one or more projectors 130 to access one or more content packets in response to one or more changes in the position of one or more projection surfaces 200. In some embodiments, one or more projector control units 120 may instruct one or more projectors 130 to project content included within one or more content packets in response to one or more changes in the position of one or more projection surfaces 200.

At operation 1506, the projecting operation 1440 may include projecting in response to the coordinating one or more changes in one or more positions associated with one or more projection surfaces with one or more commands associated with content. In some embodiments, one or more projector control units 120 may instruct one or more projectors 130 to project in response to coordinating one or more changes in one or more positions associated with one or more projection surfaces 200 with one or more commands associated with content. In some embodiments, one or more projector control units 120 may instruct one or more projectors 130 to project specific content in response to coordinating one or more changes in the position of one or more projection surfaces 200 with the specific content. In some embodiments, one or more projector control units 120 may instruct one or more projectors 130 to access content that is included within memory. For example, in some embodiments, one or more projector control units 120 may instruct one or more projectors 130 to access projector memory 134. In some embodiments, one or more projector control units 120 may instruct one or more projectors 130 to access control memory 124. In some embodiments, one or more projector control units 120 may instruct one or more projectors 130 to access memory that is associated with an external device 400.

At operation 1508, the projecting operation 1440 may include projecting in response to accessing one or more databases. In some embodiments, one or more projector control units 120 may instruct one or more projectors 130 to project in response to accessing one or more databases. In some embodiments, one or more projector control units 120 may instruct one or more projectors 130 to project content in response to coordinating one or more changes in one or more positions of one or more projection surfaces 200 with one or more commands to access one or more databases that contain the content. In some embodiments, one or more projector control units 120 may instruct one or more projectors 130 to project confidential information in response to coordinating one or more changes in one or more positions of one or more projection surfaces 200 with one or more commands to access one or more databases that contain the confidential information.

At operation 1510, the projecting operation 1440 may include projecting in response to accessing one or more lookup tables. In some embodiments, one or more projector control units 120 may instruct one or more projectors 130 to project in response to accessing one or more lookup tables. In some embodiments, one or more projector control units 120 may instruct one or more projectors 130 to project content in response to coordinating one or more changes in one or more positions of one or more projection surfaces 200 with one or more commands to access one or more lookup tables associated with the content.

Figure 16:
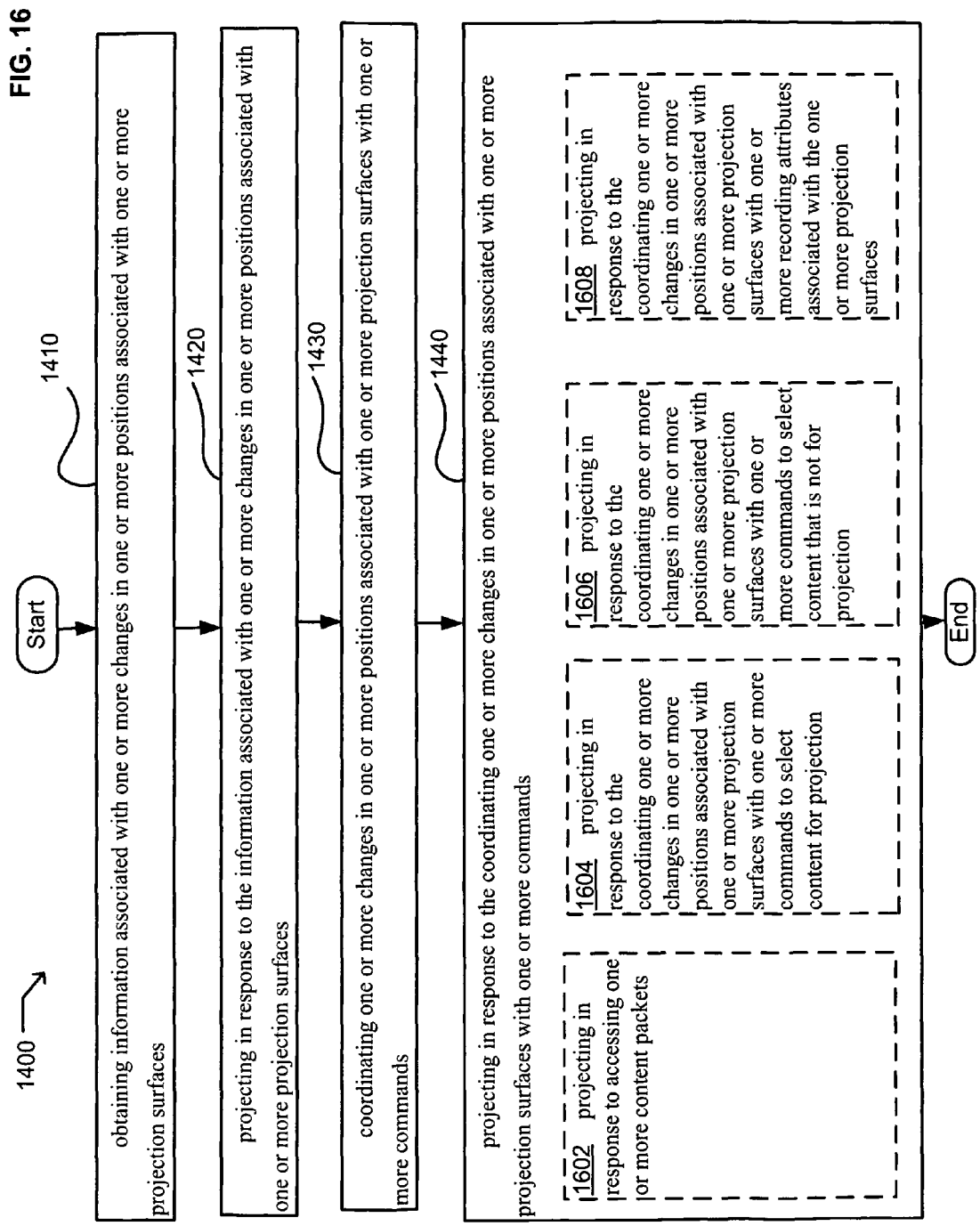
FIG. 16 illustrates alternative embodiments of the example operation flow of FIG. 14.

FIG. 16 illustrates alternative embodiments of the example operational flow 1400 of FIG. 14. FIG. 16 illustrates example embodiments where the projecting operation 1440 may include at least one additional operation. Additional operations may include an operation 1602, operation 1604, operation 1606, and/or operation 1608.

At operation 1602, the projecting operation 1440 may include projecting in response to accessing one or more content packets. In some embodiments, one or more projector control units 120 may instruct one or more projectors 130 to project in response to accessing one or more content packets. In some embodiments, one or more projector control units 120 may instruct one or more projectors 130 to project content in response to coordinating one or more changes in one or more positions of one or more projection surfaces 200 with one or more commands to access one or more content packets that include the content.

At operation 1604, the projecting operation 1440 may include projecting in response to the coordinating one or more changes in one or more positions associated with one or more projection surfaces with one or more commands to select content for projection. In some embodiments, one or more projector control units 120 may instruct one or more projectors 130 to project in response to coordinating one or more changes in one or more positions associated with one or more projection surfaces 200 with one or more commands to select content for projection. For example, in some embodiments, one or more projectors 130 may be instructed to project confidential information in response to a projection surface 200 being rotated in a clockwise direction. In some embodiments, one or more projectors 130 may be instructed to project content that is selected to be viewed by a specific individual through positioning a projection surface 200 adjacent to the specific individual. Accordingly, in some embodiments, a projector 130 may be instructed to project specific content in a manner that depends upon the position of a projection surface 200.

At operation 1606, the projecting operation 1440 may include projecting in response to the coordinating one or more changes in one or more positions associated with one or more projection surfaces with one or more commands to select content that is not for projection. In some embodiments, one or more projector control units 120 may instruct one or more projectors 130 to project in response to coordinating one or more changes in one or more positions associated with one or more projection surfaces 200 with one or more commands to select content that is not for projection.

For example, in some embodiments, one or more projectors 130 may be instructed to access one or more content packets that include confidential and nonconfidential information. Accordingly, in some embodiments, the one or more projectors 130 may be instructed not to project the confidential information. In some embodiments, one or more projector control units 120 may instruct one or more projectors 130 not to project content in response to coordinating one or more changes in one or more positions of one or more projection surfaces 200 with one or more commands to select content that is not for projection. For example, in some embodiments, one or more projectors 130 may be instructed to access one or more content packets that include confidential and nonconfidential information. Accordingly, in some embodiments, the one or more projectors 130 may be instructed not to project the confidential information.

At operation 1608, the projecting operation 1440 may include projecting in response to the coordinating one or more changes in one or more positions associated with one or more projection surfaces with one or more recording attributes associated with the one or more projection surfaces. In some embodiments, one or more projector control units 120 may instruct one or more projectors 130 to project in response to coordinating one or more changes in one or more positions associated with one or more projection surfaces 200 with one or more recording attributes associated with the one or more projection surfaces 200. In some embodiments, one or more projection surfaces 200 may be configured to record content that is projected onto the projection surface 200 when the projection surface 200 is in a specified position. For example, in some embodiments, a projection surface 200 may be able to record content that is projected onto the projection surface 200 when the projection surface 200 is positioned with a recording side exposed to one or more projectors 130. However, in some embodiments, the projection surface 200 may not be able to record content that is projected onto the projection surface 200 when the projection surface 200 is positioned with a recording side unavailable to one or more projectors 130. Accordingly, in some embodiments, one or more projector control units 120 may instruct one or more projectors 130 to project in response to recording attributes associated with one or more projection surfaces 200.

Figure 17:
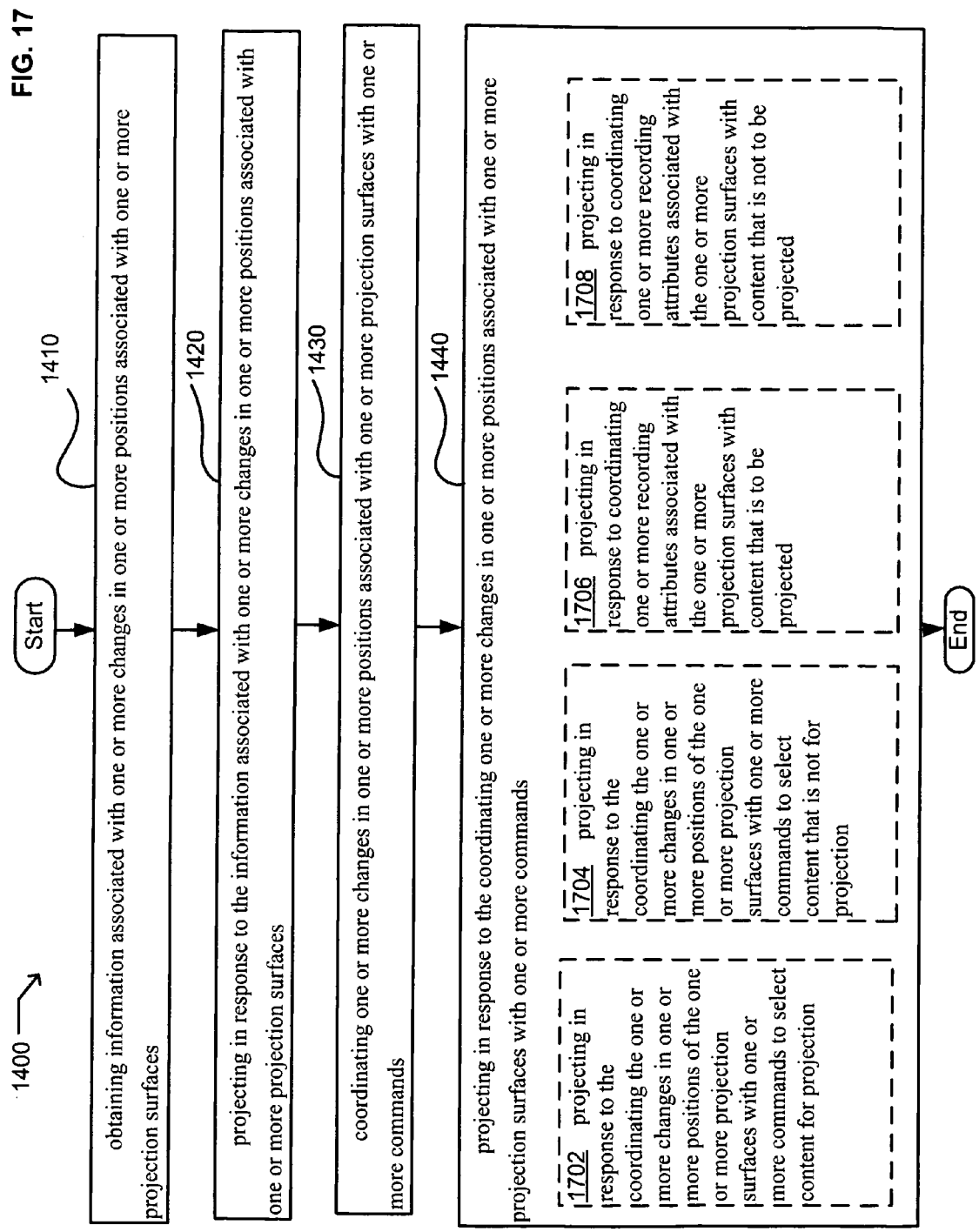
FIG. 17 illustrates alternative embodiments of the example operation flow of FIG. 14.

FIG. 17 illustrates alternative embodiments of the example operational flow 1400 of FIG. 14. FIG. 17 illustrates example embodiments where the projecting operation 1440 may include at least one additional operation. Additional operations may include an operation 1702, operation 1704, operation 1706, and/or operation 1708.

At operation 1702, the projecting operation 1440 may include projecting in response to the coordinating one or more changes in one or more positions of one or more projection surfaces with one or more commands to select content for projection. In some embodiments, one or more projector control units 120 may instruct one or more projectors 130 to project in response to coordinating the one or more changes in one or more positions of one or more projection surfaces 200 with one or more commands to select content for projection. For example, in some embodiments, one or more changes in the position of one or more projection surfaces 200 may be coordinated with selection of specific content. Accordingly, in some embodiments, one or more projector control units 120 may instruct one or more projectors 130 to select specific content in response to one or more changes in the position of one or more projection surfaces 200. In some embodiments, one or more projectors 130 may access memory to select content for projection.

At operation 1704, the projecting operation 1440 may include projecting in response to the coordinating one or more changes in one or more positions of one or more projection surfaces with one or more commands to select content that is not for projection. In some embodiments, one or more projector control units 120 may instruct one or more projectors 130 to project in response to coordinating the one or more changes in one or more positions of one or more projection surfaces 200 with one or more commands to select content that is not for projection. Accordingly, in some embodiments, one or more projector control units 120 may instruct one or more projectors 130 to select content that is not for projection in response to one or more changes in the position of one or more projection surfaces 200. In some embodiments, one or more projectors 130 may access memory to select content that is not for projection.

At operation 1706, the projecting operation 1440 may include projecting in response to coordinating one or more recording attributes associated with the one or more projection surfaces with content that is to be projected. In some embodiments, one or more projector control units 120 may instruct one or more projectors 130 to project in response to coordinating one or more recording attributes associated with one or more projection surfaces 200 with content that is to be projected. In some embodiments, one or more projector control units 120 may instruct one or more projectors 130 to project content in response to coordinating one or more recording attributes associated with one or more projection surfaces 200 with content that is to be recorded into memory. In some embodiments, one or more projector control units 120 may instruct one or more projectors 130 to project content in response to coordinating one or more recording attributes associated with one or more projection surfaces 200 with content that is to be printed.

At operation 1708, the projecting operation 1440 may include projecting in response to coordinating one or more recording attributes associated with the one or more projection surfaces with content that is not to be projected. In some embodiments, one or more projector control units 120 may instruct one or more projectors 130 to project in response to coordinating one or more recording attributes associated with one or more projection surfaces 200 with content that is not to be projected. In some embodiments, one or more projector control units 120 may instruct one or more projectors 130 not to project content in response to coordinating one or more recording attributes associated with one or more projection surfaces 200 with content that is not to be recorded into memory. For example, in some embodiments, one or more projectors 130 may be instructed to access one or more content packets that include confidential and nonconfidential information. Accordingly, in some embodiments, the one or more projectors 130 may be instructed not to project the confidential information. In some embodiments, one or more projector control units 120 may instruct one or more projectors 130 not to project content in response to coordinating one or more recording attributes associated with one or more projection surfaces 200 with content that is not to be printed. For example, in some embodiments, one or more projectors 130 may be instructed to access one or more content packets that include confidential and nonconfidential information. Accordingly, in some embodiments, the one or more projectors 130 may be instructed not to project the confidential information.

Figure 18:
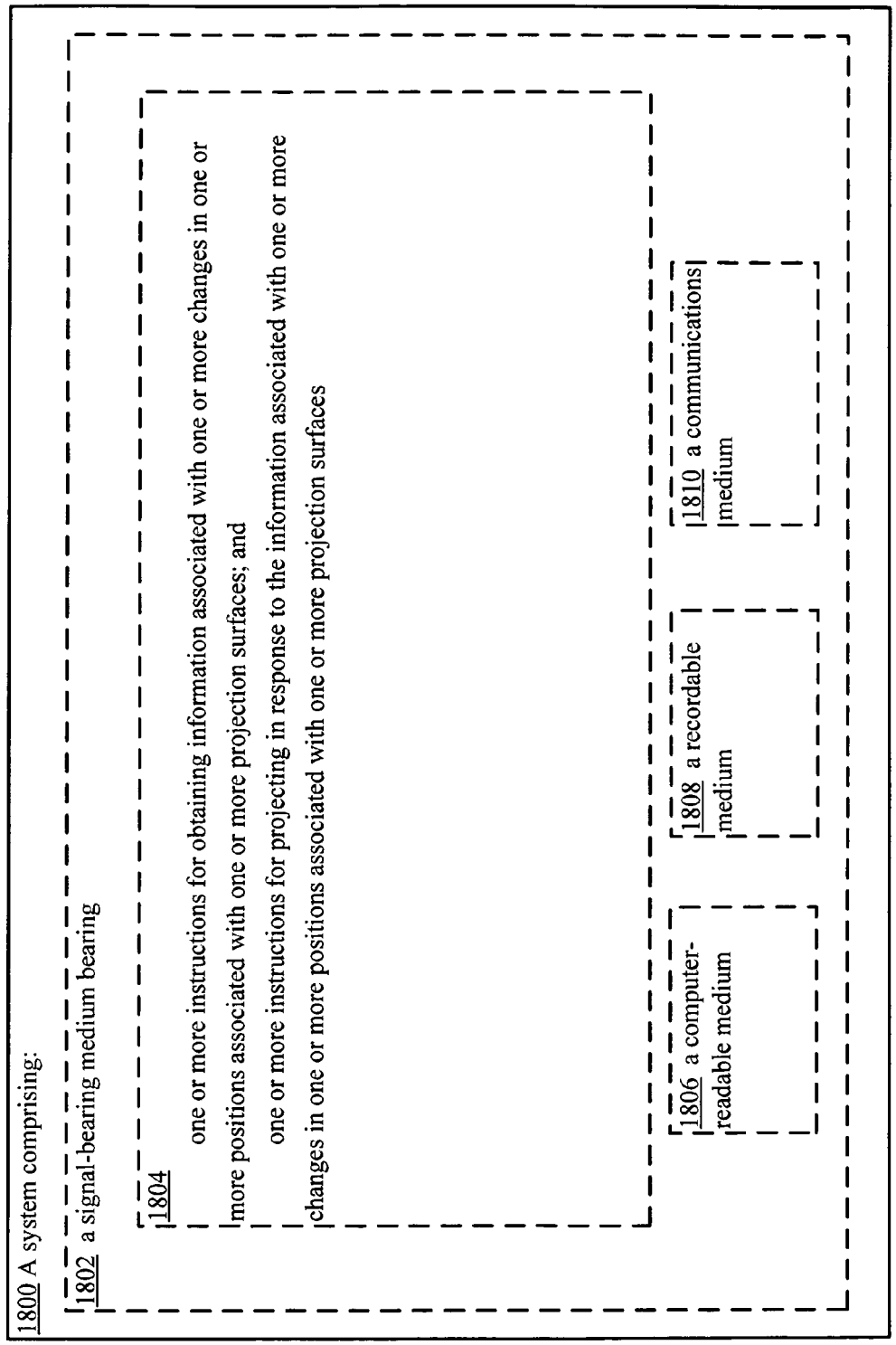
FIG. 18 illustrates a partial view of a system 1800 that includes a computer program for executing a computer process on a computing device.

FIG. 18 illustrates a partial view of a system 1800 that includes a computer program 1804 for executing a computer process on a computing device. An embodiment of system 1800 is provided using a signal-bearing medium 1802 bearing one or more instructions for obtaining information associated with one or more changes in one or more positions associated with one or more projection surfaces 200; and one or more instructions for projecting in response to the information associated with one or more changes in one or more positions associated with one or more projection surfaces 200. The one or more instructions may be, for example, computer executable and/or logic-implemented instructions. In some embodiments, the signal-bearing medium 1802 may include a computer-readable medium 1806. In some embodiments, the signal-bearing medium 1802 may include a recordable medium 1808. In some embodiments, the signal-bearing medium 1802 may include a communications medium 1810.

Figure 19:
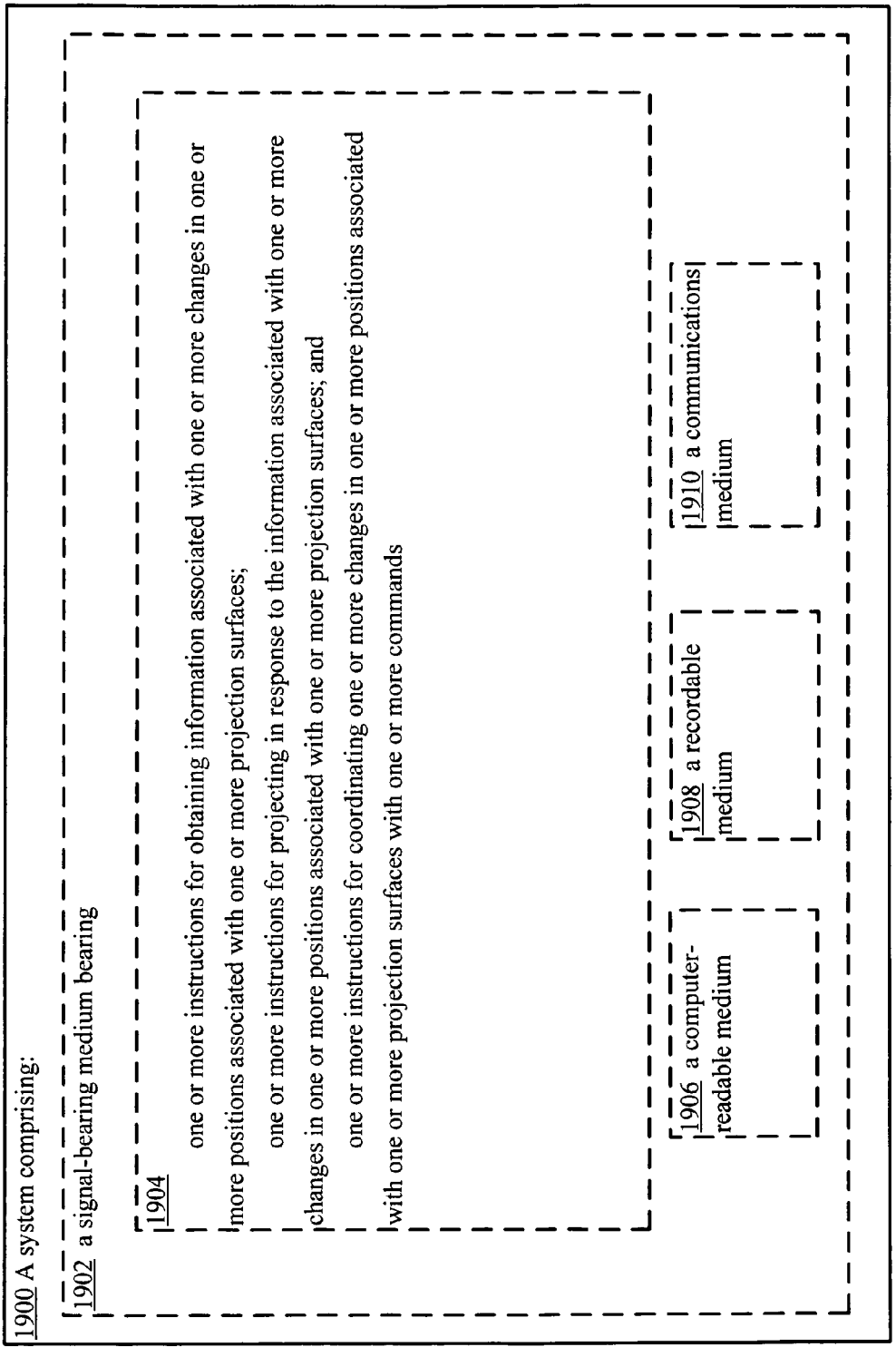
FIG. 19 illustrates a partial view of a system 1900 that includes a computer program for executing a computer process on a computing device.

FIG. 19 illustrates a partial view of a system 1900 that includes a computer program 1904 for executing a computer process on a computing device. An embodiment of system 1900 is provided using a signal-bearing medium 1902 bearing one or more instructions for obtaining information associated with one or more changes in one or more positions associated with one or more projection surfaces 200; one or more instructions for projecting in response to the information associated with one or more changes in one or more positions associated with one or more projection surfaces 200; and one or more instructions for coordinating one or more changes in one or more positions associated with one or more projection surfaces 200 with one or more commands. The one or more instructions may be, for example, computer executable and/or logic-implemented instructions. In some embodiments, the signal-bearing medium 1902 may include a computer-readable medium 1906. In some embodiments, the signal-bearing medium 1902 may include a recordable medium 1908. In some embodiments, the signal-bearing medium 1902 may include a communications medium 1910.

Figure 20:
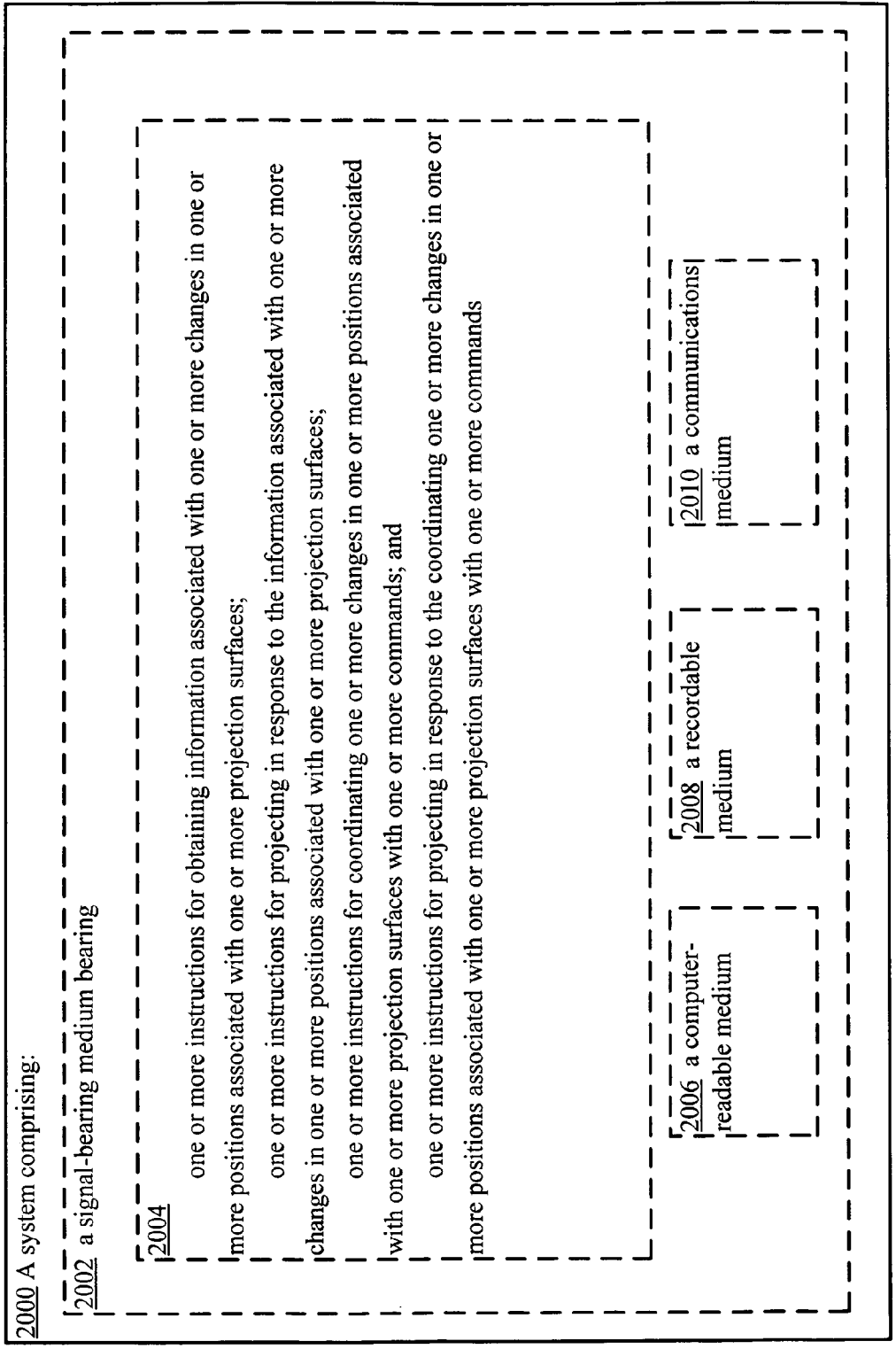
FIG. 20 illustrates a partial view of a system 2000 that includes a computer program for executing a computer process on a computing device.

FIG. 20 illustrates a partial view of a system 2000 that includes a computer program 2004 for executing a computer process on a computing device. An embodiment of system 2000 is provided using a signal-bearing medium 2002 bearing one or more instructions for obtaining information associated with one or more changes in one or more positions associated with one or more projection surfaces 200; one or more instructions for projecting in response to the information associated with one or more changes in one or more positions associated with one or more projection surfaces 200; one or more instructions for coordinating one or more changes in one or more positions associated with one or more projection surfaces 200 with one or more commands; and one or more instructions for projecting in response to the coordinating one or more changes in one or more positions associated with one or more projection surfaces 200 with one or more commands. The one or more instructions may be, for example, computer executable and/or logic-implemented instructions. In some embodiments, the signal-bearing medium 2002 may include a computer-readable medium 2006. In some embodiments, the signal-bearing medium 2002 may include a recordable medium 2008. In some embodiments, the signal-bearing medium 2002 may include a communications medium 2010.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electromechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electromechanical systems include but are not limited to a variety of consumer electronics systems, medical devices, as well as other systems such as motorized transport systems, factory automation systems, security systems, and/or communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces 300, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces 300, drivers, sensors 150, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those skilled in the art will appreciate that a user 600 may be representative of a human user 600, a robotic user 600 (e.g., computational entity), and/or substantially any combination thereof (e.g., a user may be assisted by one or more robotic agents) unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise. While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method comprising:
    obtaining information associated with one or more changes in one or more positions of one or more projection surfaces, the information being obtained at least in part, directly or indirectly, from one or more sensing devices;
    coordinating the one or more changes in one or more positions of one or more projection surfaces with one or more commands, the coordinating being performed at least in part with one or more processing devices accessing one or more lookup tables that include correlations of one or more changes in one or more positions of one or more projection surfaces with one or more commands;
    projecting in response to the coordinating the one or more changes in one or more positions of one or more projection surfaces with one or more commands, including:
        (a) selecting content for projection, wherein the selecting select content for projection includes selecting a first content for projection over at least a second content based at least in part on the one or more changes in one or more positions of one or more projection surfaces and based at least in part on a detection of one or more persons; and
        (b) retrieving the content selected for projection from memory.

2. The method of claim 1, wherein the obtaining information associated with one or more changes in one or more positions associated with one or more projection surfaces comprises:
    detecting one or more changes in one or more positions associated with one or more projection surfaces.

3. The method of claim 1, wherein the obtaining information associated with one or more changes in one or more positions associated with one or more projection surfaces comprises:
    obtaining information associated with one or more changes in one or more positions of one or more fiducials associated with the one or more projection surfaces.

4. The method of claim 1, wherein the obtaining information associated with one or more changes in one or more positions associated with one or more projection surfaces comprises:
    obtaining information associated with one or more changes in one or more calibration images associated with the one or more projection surfaces.

5. The method of claim 1, wherein the obtaining information associated with one or more changes in one or more positions associated with one or more projection surfaces comprises:
    obtaining information associated with one or more changes in one or more vertical positions associated with the one or more projection surfaces.

6. The method of claim 1, wherein the obtaining information associated with one or more changes in one or more positions associated with one or more projection surfaces comprises:
    obtaining information associated with one or more changes in one or more horizontal positions associated with the one or more projection surfaces.

7. The method of claim 1, wherein the obtaining information associated with one or more changes in one or more positions associated with one or more projection surfaces comprises:
    obtaining information associated with one or more changes in one or more rotational positions associated with the one or more projection surfaces.

8. The method of claim 1, wherein the obtaining information associated with one or more changes in one or more positions associated with one or more projection surfaces comprises:
    receiving one or more signals that include information associated with one or more changes in one or more positions associated with the one or more projection surfaces.

9. The method of claim 1, wherein the obtaining information associated with one or more changes in one or more positions associated with one or more projection surfaces comprises:
    obtaining information associated with content that is to be projected.

10. The method of claim 1, wherein the obtaining information associated with one or more changes in one or more positions associated with of one or more projection surfaces comprises:
  selecting content that is to be projected.

11. The method of claim 1, wherein the obtaining information associated with one or more changes in one or more positions associated with one or more projection surfaces comprises:
  obtaining information associated with one or more capture capabilities associated with the one or more projection surfaces.

12. The method of claim 1, wherein the obtaining information associated with one or more changes in one or more positions associated with one or more projection surfaces comprises:
  obtaining information associated with one or more recording attributes associated with the one or more projection surfaces.

13. The method of claim 1, wherein the projecting in response to the coordinating the one or more changes in one or more positions associated with one or more projection surfaces with one or more commands comprises:
  projecting in response to detecting one or more changes in one or more positions associated with one or more projection surfaces.

14. The method of claim 1, wherein the projecting in response to the coordinating the one or more changes in one or more positions associated with one or more projection surfaces with one or more commands comprises:
  projecting in response to information associated with one or more changes in one or more positions of one or more fiducials associated with the one or more projection surfaces.

15. The method of claim 1, wherein the projecting in response to the coordinating the one or more changes in one or more positions associated with one or more projection surfaces with one or more commands comprises:
  projecting in response to information associated with one or more changes in one or more calibration images associated with the one or more projection surfaces.

16. The method of claim 1, wherein the projecting in response to the coordinating the one or more changes in one or more positions associated with one or more projection surfaces with one or more commands comprises:
  projecting in response to information associated with one or more changes in one or more vertical positions associated with the one or more projection surfaces.

17. The method of claim 1, wherein the projecting in response to the coordinating the one or more changes in one or more positions associated with one or more projection surfaces with one or more commands comprises:
  projecting in response to information associated with one or more changes in one or more horizontal positions associated with the one or more projection surfaces.

18. The method of claim 1, wherein the projecting in response to the coordinating the one or more changes in one or more positions associated with one or more projection surfaces with one or more commands comprises:
  projecting in response to information associated with one or more changes in one or more rotational positions associated with the one or more projection surfaces.

19. The method of claim 1, wherein the projecting in response to the coordinating the one or more changes in one or more positions associated with one or more projection surfaces with one or more commands comprises:
  projecting in response to receiving one or more signals that include information associated with one or more changes in one or more positions associated with the one or more projection surfaces.

20. The method of claim 1, wherein the projecting in response to the coordinating the one or more changes in one or more positions associated with one or more projection surfaces with one or more commands comprises:
  projecting in response to the information associated with the content that is to be projected.

21. The method of claim 1, wherein the projecting in response to the coordinating the one or more changes in one or more positions associated with one or more projection surfaces with one or more commands comprises:
  projecting in response to information associated with one or more capture capabilities associated with the one or more projection surfaces.

22. The method of claim 1, wherein the projecting in response to the coordinating the one or more changes in one or more positions associated with one or more projection surfaces with one or more commands comprises:
  projecting in response to information associated with one or more recording attributes associated with the one or more projection surfaces.

23. The method of claim 1, wherein the coordinating one or more changes in one or more positions associated with one or more projection surfaces with one or more commands comprises:
  coordinating one or more changes in one or more positions associated with one or more projection surfaces with one or more projection commands.

24. The method of claim 1, wherein the coordinating one or more changes in one or more positions associated with one or more projection surfaces with one or more commands comprises:
  coordinating one or more changes in one or more positions associated with one or more projection surfaces with one or more commands associated with content.

25. The method of claim 1, wherein the coordinating one or more changes in one or more positions associated with one or more projection surfaces with one or more commands comprises:
  coordinating one or more changes in one or more positions associated with one or more projection surfaces with one or more recording attributes associated with the one or more projection surfaces.

26. The method of claim 1, wherein the coordinating one or more changes in one or more positions associated with one or more projection surfaces with one or more commands comprises:
  coordinating one or more changes in one or more positions of one or more projection surfaces with one or more commands to select content for projection.

27. The method of claim 1, wherein the coordinating one or more changes in one or more positions associated with one or more projection surfaces with one or more commands comprises:
  coordinating one or more recording attributes associated with the one or more projection surfaces with content that is to be projected.

28. The method of claim 1, wherein the projecting in response to the coordinating one or more changes in one or more positions associated with one or more projection surfaces with one or more commands comprises:

projecting in response to the coordinating one or more changes in one or more positions associated with one or more projection surfaces with one or more projection commands.

29. The method of claim 1, wherein the projecting in response to the coordinating one or more changes in one or more positions associated with one or more projection surfaces with one or more commands comprises:
   projecting in response to the coordinating one or more changes in one or more positions associated with one or more projection surfaces with one or more commands associated with content.

30. The method of claim 1, wherein the projecting in response to the coordinating one or more changes in one or more positions associated with one or more projection surfaces with one or more commands comprises:
   projecting in response to the coordinating one or more changes in one or more positions associated with one or more projection surfaces with one or more recording attributes associated with the one or more projection surfaces.

31. The method of claim 1, wherein the projecting in response to the coordinating one or more changes in one or more positions associated with one or more projection surfaces with one or more commands comprises:
   projecting in response to coordinating one or more recording attributes associated with the one or more projection surfaces with content that is to be projected.

32. The method of claim 1, wherein the projecting in response to the coordinating the one or more changes in one or more positions associated with one or more projection surfaces with one or more commands to select content for projection, the select content for projection includes, with a processing device, selecting a content for projection over at least a second content based at least in part on the one or more changes in one or more positions of one or more projection surfaces comprises:
   projecting with one or more handheld projectors in response to the coordinating the one or more changes in one or more positions associated with at least one of two or more projection surfaces with one or more commands to select content for projection, the select content for projection includes, with a processing device, selecting a content for projection over at least a second content based in part on the one or more changes in one or more positions of at the at least one of two or more projection surfaces and based in part on the detection of one or more persons, wherein the projecting is performed by retrieving the content selected for projection from memory.

33. A system comprising:
   circuitry for obtaining information associated with one or more changes in one or more positions of one or more projection surfaces, the circuitry for obtaining being configured for obtaining the information at least in part, directly or indirectly, from one or more sensing devices;
   circuitry for coordinating one or more changes in one or more positions of one or more projection surfaces with one or more commands, the circuitry for coordinating being configured to perform the coordinating at least in part with one or more processing devices accessing one or more lookup tables that include correlations of one or more changes in one or more positions of one or more projection surfaces with one or more commands;
   circuitry for projecting that is responsive to the circuitry for coordinating one or more changes in one or more positions of one or more projection surfaces with one or more commands, the circuitry for projecting including:
   (a) circuitry for selecting content for projection, wherein the circuitry for selecting content for projection is configured to select a first content for projection over at least a second content based at least in part on the one or more changes in one or more positions of one or more projection surfaces and based at least in part on a detection of one or more persons; and
   (b) circuitry for retrieving the content selected for projection from memory.

34. The system of claim 33, wherein the circuitry for obtaining information associated with one or more changes in one or more positions associated with one or more projection surfaces comprises:
   circuitry for detecting one or more changes in one or more positions associated with one or more projection surfaces.

35. The system of claim 33, wherein the circuitry for obtaining information associated with one or more changes in one or more positions associated with one or more projection surfaces comprises:
   circuitry for obtaining information associated with one or more changes in one or more positions of one or more fiducials associated with the one or more projection surfaces.

36. The system of claim 33, wherein the circuitry for obtaining information associated with one or more changes in one or more positions associated with one or more projection surfaces comprises:
   circuitry for obtaining information associated with one or more changes in one or more calibration images associated with the one or more projection surfaces.

37. The system of claim 33, wherein the circuitry for obtaining information associated with one or more changes in one or more positions associated with one or more projection surfaces comprises:
   circuitry for receiving one or more signals that include information associated with one or more changes in one or more positions associated with the one or more projection surfaces.

38. The system of claim 33, wherein the circuitry for projecting in response to the information associated with one or more changes in one or more positions associated with one or more projection surfaces comprises:
   circuitry for projecting in response to detecting one or more changes in one or more positions associated with one or more projection surfaces.

39. The system of claim 33, wherein the circuitry for projecting in response to the information associated with one or more changes in one or more positions associated with one or more projection surfaces comprises:
   circuitry for projecting in response to the information associated with one or more changes in one or more positions of one or more fiducials associated with the one or more projection surfaces.

40. The system of claim 33, wherein the circuitry for projecting in response to the information associated with one or more changes in one or more positions associated with one or more projection surfaces comprises:
   circuitry for projecting in response to the information associated with one or more changes in one or more calibration images associated with the one or more projection surfaces.

41. The system of claim 33, wherein the circuitry for projecting in response to the information associated with one or more changes in one or more positions associated with one or more projection surfaces comprises:
    circuitry for projecting in response to the information associated with one or more capture capabilities associated with the one or more projection surfaces.

42. The system of claim 33, wherein the circuitry for coordinating one or more changes in one or more positions associated with one or more projection surfaces with one or more commands comprises:
    circuitry for coordinating one or more changes in one or more positions associated with one or more projection surfaces with one or more projection commands.

43. The system of claim 33, wherein the circuitry for coordinating one or more changes in one or more positions associated with one or more projection surfaces with one or more commands comprises:
    circuitry for coordinating one or more changes in one or more positions associated with one or more projection surfaces with one or more commands associated with content.

44. The system of claim 33, wherein the circuitry for coordinating one or more changes in one or more positions associated with one or more projection surfaces with one or more commands comprises:
    circuitry for coordinating one or more changes in one or more positions of one or more projection surfaces with one or more commands to select content for projection.

45. The system of claim 33, wherein the circuitry for coordinating one or more changes in one or more positions associated with one or more projection surfaces with one or more commands comprises:
    circuitry for coordinating one or more recording attributes associated with the one or more projection surfaces with content that is to be projected.

46. The system of claim 33, wherein the circuitry for projecting in response to the coordinating one or more changes in one or more positions associated with one or more projection surfaces with one or more commands comprises:
    circuitry for projecting in response to the coordinating one or more changes in one or more positions associated with one or more projection surfaces with one or more projection commands.

47. The system of claim 33, wherein the circuitry for projecting in response to the coordinating one or more changes in one or more positions associated with one or more projection surfaces with one or more commands comprises:
    circuitry for projecting in response to the coordinating one or more changes in one or more positions associated with one or more projection surfaces with one or more commands associated with content.

48. A system comprising:
    means for obtaining information associated with one or more changes in one or more positions of one or more projection surfaces, the means for obtaining being configured for obtaining the information, at least in part, by receiving the information, directly or indirectly, from one or more sensing devices;
    means for coordinating one or more changes in one or more positions of one or more projection surfaces with one or more commands, the means for coordinating being configured to perform the coordinating at least in part with one or more processing devices accessing one or more lookup tables that include correlations of one or more changes in one or more positions of one or more projection surfaces with one or more commands;
    means for projecting that is responsive to the means for coordinating one or more changes in one or more positions of one or more projection surfaces with one or more commands, the means for projecting including:
    (a) means for selecting content for projection, wherein the means for selecting content for projection is configured to select a first content for projection over at least a second content based at least in part on the one or more changes in one or more positions of one or more projection surfaces and based at least in part on a detection of one or more persons; and
    (b) means for retrieving the content selected for projection from memory.

49. A system comprising:
a non-transitory machine-readable medium bearing one or more executable instructions that when executed perform a process:
    obtaining information associated with one or more changes in one or more positions of one or more projection surfaces, the information being obtained at least in part by being received, directly or indirectly, from one or more sensing devices;
    coordinating one or more changes in one or more positions of one or more projection surfaces with one or more commands, the coordinating being performed at least in part with one or more processing devices accessing one or more lookup tables that include correlations of one or more changes in one or more positions of one or more projection surfaces with one or more commands; and
    projecting in response to the coordinating one or more changes in one or more positions of one or more projection surfaces with one or more commands, including:
    (a) selecting content for projection, wherein the selecting content for projection includes selecting a first content for projection over at least a second content based at least in part on the one or more changes in one or more positions of one or more projection surfaces and based at least in part on a detection of one or more persons; and
    (b) retrieving the content selected for projection from memory.

* * * * *

UNITED STATES PATENT AND TRADEMARK OFFICE
CERTIFICATE OF CORRECTION

PATENT NO. : 8,376,558 B2
APPLICATION NO. : 12/217135
DATED : February 19, 2013
INVENTOR(S) : Edward K. Y. Jung et al.

It is certified that error appears in the above-identified patent and that said Letters Patent is hereby corrected as shown below:

In the Specifications

Col. 1, Line 23 please delete "naming Edward K.Y. Jung, Royce" and replace with
--naming Edward K.Y. Jung, Eric C. Leuthardt, Royce--

Col. 1, Lines 32-33 please delete "naming Edward K.Y. Jung, Royce" and replace with
--naming Edward K.Y. Jung, Eric C. Leuthardt, Royce--

Col. 1, Lines 41-42 please delete "naming Edward K.Y. Jung, Royce" and replace with
--naming Edward K.Y. Jung, Eric C. Leuthardt, Royce--

Col. 1, Lines 51-52 please delete "naming Edward K.Y. Jung, Royce" and replace with
--naming Edward K.Y. Jung, Eric C. Leuthardt, Royce--

Col. 1, Lines 62-63 please delete "naming Edward K.Y. Jung, Royce" and replace with
--naming Edward K.Y. Jung, Eric C. Leuthardt, Royce--

Col. 2, Lines 5-6 please delete "naming Edward K.Y. Jung, Royce" and replace with
--naming Edward K.Y. Jung, Eric C. Leuthardt, Royce--

Signed and Sealed this
Twenty-eighth Day of May, 2013

Teresa Stanek Rea
*Acting Director of the United States Patent and Trademark Office*